(12) United States Patent
Clarke et al.

(10) Patent No.: US 12,331,885 B2
(45) Date of Patent: Jun. 17, 2025

(54) SYSTEMS AND METHODS FOR STORING, TRANSPORTING, AND USING HYDROGEN

(71) Applicant: Universal Hydrogen Co., Hawthorne, CA (US)

(72) Inventors: John-Paul Clarke, Austin, TX (US); Jason Chua, Los Angeles, CA (US); Paul Eremenko, Los Angeles, CA (US); Jon Gordon, Brooklyn, NY (US)

(73) Assignee: SAS Beyond Aerospace, Cugnaux (FR)

( * ) Notice: Subject to any disclaimer, the term of this patent is extended or adjusted under 35 U.S.C. 154(b) by 0 days.

(21) Appl. No.: 18/191,822

(22) Filed: Mar. 28, 2023

(65) Prior Publication Data

US 2023/0243474 A1 Aug. 3, 2023

Related U.S. Application Data

(62) Division of application No. 17/318,993, filed on May 12, 2021, now Pat. No. 11,828,417.

(Continued)

(51) Int. Cl.
*B60L 50/72* (2019.01)
*B64D 37/04* (2006.01)
(Continued)

(52) U.S. Cl.
CPC ............ *F17C 13/083* (2013.01); *B60L 50/72* (2019.02); *B64D 37/04* (2013.01); *B64D 37/06* (2013.01);
(Continued)

(58) Field of Classification Search
CPC ............. B60L 50/72; F17C 2270/0189; F17C 2270/0184; B64D 2041/005
See application file for complete search history.

(56) References Cited

U.S. PATENT DOCUMENTS

| 4,496,073 A | 1/1985 | Silver et al. |
| 4,516,405 A | 5/1985 | Laskaris |

(Continued)

FOREIGN PATENT DOCUMENTS

| CA | 2928590 A1 | 5/2015 |
| CN | 101634397 A | 1/2010 |

(Continued)

OTHER PUBLICATIONS

International Searching Authority, International Search Report and Written Opinion, PCT Patent Application PCT/US2021/032087, mailed Aug. 25, 2021, 8 pages.

(Continued)

*Primary Examiner* — Paul J Gray
(74) *Attorney, Agent, or Firm* — CRGO Global; Steven M. Greenberg

(57) ABSTRACT

The present disclosure provides systems and methods for storing, transporting, and using hydrogen. In some embodiments, the method may comprise (a) storing hydrogen fuel in one or more fuel storage modules; (b) transporting the one or more fuel storage modules to a vehicle fueling site, wherein one or more hydrogen fuel compatible vehicles are located at or near the vehicle fueling site; (c) loading the one or more fuel storage modules into the one or more hydrogen fuel compatible vehicles, wherein the one or more fuel storage modules are configured to be releasably coupled to the one or more hydrogen fuel compatible vehicles; and (d) decoupling the one or more fuel storage modules from the one or more hydrogen fuel compatible vehicles after the one or more fuel storage modules are depleted or partially depleted.

13 Claims, 27 Drawing Sheets

Related U.S. Application Data

(60) Provisional application No. 63/070,153, filed on Aug. 25, 2020, provisional application No. 63/038,480, filed on Jun. 12, 2020, provisional application No. 63/023,713, filed on May 12, 2020.

(51) Int. Cl.

| | | |
|---|---|---|
| *B64D 37/06* | (2006.01) | |
| *B64D 37/16* | (2006.01) | |
| *B64D 37/30* | (2006.01) | |
| *B64F 1/28* | (2006.01) | |
| *B65B 31/02* | (2006.01) | |
| *F17C 13/08* | (2006.01) | |
| *H01M 8/04082* | (2016.01) | |
| *B64D 41/00* | (2006.01) | |
| *F17C 1/06* | (2006.01) | |

(52) U.S. Cl.
CPC ............ *B64D 37/16* (2013.01); *B64D 37/30* (2013.01); *B64F 1/28* (2013.01); *B65B 31/025* (2013.01); *H01M 8/04201* (2013.01); *B64D 41/00* (2013.01); *B64D 2041/005* (2013.01); *F17C 1/06* (2013.01); *F17C 2203/03* (2013.01); *F17C 2203/0621* (2013.01); *F17C 2203/0624* (2013.01); *F17C 2203/0663* (2013.01); *F17C 2203/0673* (2013.01); *F17C 2205/0107* (2013.01); *F17C 2205/013* (2013.01); *F17C 2205/0305* (2013.01); *F17C 2205/0323* (2013.01); *F17C 2205/0338* (2013.01); *F17C 2221/012* (2013.01); *F17C 2250/04* (2013.01); *F17C 2265/066* (2013.01); *F17C 2270/0189* (2013.01)

(56) References Cited

U.S. PATENT DOCUMENTS

| | | |
|---|---|---|
| 6,745,801 B1 | 6/2004 | Cohen et al. |
| 6,886,609 B2 | 5/2005 | Cohen et al. |
| 7,641,068 B2 | 1/2010 | Immel et al. |
| 8,025,721 B2 | 9/2011 | Behruzi et al. |
| 8,048,211 B2 | 11/2011 | Behruzi et al. |
| 8,381,938 B2 | 2/2013 | Behruzi et al. |
| 8,523,105 B2 | 9/2013 | Buchheit |
| 9,108,730 B2 | 8/2015 | Grossman |
| 9,118,054 B2 | 8/2015 | Gummalla et al. |
| 9,555,887 B2 | 1/2017 | Grossman |
| 9,643,656 B1 | 5/2017 | Hall et al. |
| 9,678,515 B2 | 6/2017 | Lapena-rey et al. |
| 9,777,889 B2 | 10/2017 | Leachman et al. |
| 9,873,408 B2 | 1/2018 | Capizzo |
| 9,963,241 B2 | 5/2018 | Schramm et al. |
| 10,040,569 B2 | 8/2018 | Filangi et al. |
| 10,112,718 B2 | 10/2018 | Knepple et al. |
| 10,131,430 B2 | 11/2018 | Grossman |
| 10,422,478 B2 | 9/2019 | Leachman et al. |
| 10,435,155 B2 | 10/2019 | Grossman |
| 10,583,935 B2 | 3/2020 | Hoffjann |
| 10,608,270 B2 | 3/2020 | Autrusson et al. |
| 11,420,757 B2 | 8/2022 | Clarke et al. |
| 11,525,544 B2 | 12/2022 | Clarke et al. |
| 11,718,410 B2 | 8/2023 | Clarke et al. |
| 2002/0171236 A1 | 11/2002 | Joitescu et al. |
| 2004/0163731 A1 | 8/2004 | Eichelberger et al. |
| 2004/0206762 A1 | 10/2004 | Iida et al. |
| 2005/0100767 A1 | 5/2005 | Stolmar |
| 2006/0033322 A1 | 2/2006 | Suess |
| 2007/0228048 A1 | 10/2007 | Immel et al. |
| 2008/0264551 A1 | 10/2008 | Wood |
| 2010/0018603 A1 | 1/2010 | Adler et al. |
| 2012/0048862 A1 | 3/2012 | Otsuka et al. |
| 2013/0288148 A1 | 10/2013 | Kazuno et al. |
| 2014/0166662 A1 | 6/2014 | Synder et al. |
| 2014/0263358 A1 | 9/2014 | Espinosa-loza et al. |
| 2015/0183338 A1 | 7/2015 | Lee et al. |
| 2015/0330576 A1 | 11/2015 | Zhai et al. |
| 2016/0159492 A1 | 6/2016 | Filangi, Jr. et al. |
| 2017/0268724 A1 | 9/2017 | Kanezaki et al. |
| 2017/0327091 A1 | 11/2017 | Capizzo |
| 2017/0341769 A1 | 11/2017 | Haberbusch et al. |
| 2017/0373333 A1 | 12/2017 | Kajiura et al. |
| 2018/0111475 A1 | 4/2018 | Wexler et al. |
| 2018/0134401 A1 | 5/2018 | Halsey et al. |
| 2018/0151898 A1 | 5/2018 | Knapp |
| 2018/0208463 A1 | 7/2018 | Halsey et al. |
| 2018/0252365 A1 | 9/2018 | Takami et al. |
| 2018/0346330 A1 | 12/2018 | Halsey et al. |
| 2019/0009917 A1 | 1/2019 | Anton et al. |
| 2019/0032851 A1 | 1/2019 | Adler et al. |
| 2019/0077521 A1 | 3/2019 | Kelly et al. |
| 2019/0226638 A1 | 7/2019 | Heydon et al. |
| 2019/0292973 A1 | 9/2019 | Jiang et al. |
| 2020/0133286 A1 | 4/2020 | Bellar et al. |
| 2020/0164985 A1 | 5/2020 | Grossman |
| 2020/0180774 A1 | 6/2020 | Rainville |
| 2020/0180940 A1 | 6/2020 | Rainville |
| 2020/0300397 A1* | 9/2020 | Clifford ............... F16L 27/087 |
| 2020/0354073 A1 | 11/2020 | Miftakhov |
| 2020/0355117 A1 | 11/2020 | Miftakhov |
| 2020/0358117 A1 | 11/2020 | Miftakhov et al. |
| 2020/0385127 A1 | 12/2020 | Devault |
| 2020/0395626 A1 | 12/2020 | Grishashvili |
| 2021/0054971 A1 | 2/2021 | Ernull et al. |
| 2021/0098805 A1 | 4/2021 | Poirier et al. |
| 2021/0151783 A1 | 5/2021 | Miftakhov |
| 2021/0164616 A1 | 6/2021 | Shah et al. |
| 2021/0261260 A1 | 8/2021 | Miftakhov |
| 2021/0320353 A1 | 10/2021 | Miftakhov et al. |
| 2022/0009648 A1 | 1/2022 | Clarke et al. |
| 2022/0055762 A1 | 2/2022 | Clarke et al. |
| 2022/0074548 A1 | 3/2022 | Clarke et al. |
| 2022/0136656 A1 | 5/2022 | Clarke et al. |

FOREIGN PATENT DOCUMENTS

| | | |
|---|---|---|
| CN | 102388257 A | 3/2012 |
| CN | 104752745 A | 7/2015 |
| CN | 107004887 A | 8/2017 |
| CN | 207658075 U | 7/2018 |
| CN | 108657434 A | 10/2018 |
| CN | 109178325 A | 1/2019 |
| CN | 111268144 A | 6/2020 |
| DE | 102020106848 A1 | 9/2020 |
| EP | 2418414 A1 | 2/2012 |
| EP | 3420434 A1 | 1/2019 |
| EP | 3421864 B1 | 1/2020 |
| EP | 3498664 B1 | 8/2020 |
| FR | 2921459 A1 | 3/2009 |
| GB | 914193 A | 12/1962 |
| GB | 1322251 A | 7/1973 |
| GB | 2396851 A | 7/2004 |
| WO | 2015084170 A1 | 6/2015 |
| WO | 2018175349 A1 | 9/2018 |
| WO | 2020002462 A1 | 1/2020 |
| WO | 2020060488 A1 | 3/2020 |
| WO | 2021231647 A1 | 11/2021 |
| WO | 2021231649 A1 | 11/2021 |
| WO | 2022040054 A1 | 2/2022 |
| WO | 2022094300 A1 | 5/2022 |

OTHER PUBLICATIONS

International Searching Authority, International Search Report and Written Opinion, PCT Patent Application PCT/US2021/032090, mailed Sep. 9, 2021, 9 pages.

International Searching Authority, International Search Report and Written Opinion, PCT Patent Application PCT/US2021/046027, mailed Feb. 7, 2022, 23 pages.

(56) References Cited

OTHER PUBLICATIONS

International Searching Authority, International Search Report and Written Opinion, PCT Patent Application PCT/US2021/057385, mailed Mar. 14, 2022, 15 pages.

* cited by examiner

SYSTEMS AND METHODS FOR STORING, TRANSPORTING, AND USING HYDROGEN

CROSS-REFERENCE TO RELATED APPLICATIONS

This non-provisional patent application is a divisional application of and claims the benefit of and priority to U.S. patent application Ser. No. 17/318,993, titled SYSTEMS AND METHODS FOR STORING, TRANSPORTING, AND USING HYDROGEN, filed May 12, 2021 and claims the benefit of and priority to all of the following: U.S. Provisional Patent Application No. 63/023,713, titled SYSTEMS AND METHODS FOR STORING, TRANSPORTING, AND USING HYDROGEN, filed May 12, 2020; U.S. Provisional Patent Application No. 63/038,480, titled STORAGE MODULE filed Jun. 12, 2020; and U.S. Provisional Patent Application No. 63/070,153, titled SYSTEMS AND METHODS FOR STORING, TRANSPORTING, AND USING HYDROGEN, filed Aug. 25, 2020, all of which are incorporated herein in their entireties by reference thereto.

BACKGROUND

Vehicles may be operated using a fuel source. The fuel source may have a specific energy corresponding to an amount of energy stored or extractable per unit mass of fuel. The fuel source may be provided to various vehicles to enable such vehicles to generate energy and deliver power to a propulsion system for movement and transportation.

SUMMARY

Hydrogen can be leveraged as a clean energy source to power various vehicles, including aircraft or other manned or unmanned vehicles. Hydrogen can provide a distinct advantage over other types of fuel, such as diesel, gasoline, or jet fuel, which have specific energies of about 45 megajoules per kilogram (MJ/kg), or lithium-ion batteries, which have a specific energy of about 0.95 MJ/kg. The specific energy of aviation gas or jet fuel may generally range from about 43 and about 48 MJ/kg. In contrast, hydrogen has a specific energy of over 140 MJ/kg. As such, 1 kg of hydrogen can provide the same amount of energy as about 3 kg of gasoline or kerosene. Thus, using hydrogen as a fuel source for vehicles can reduce the weight of vehicles while providing a comparable amount of energy as other traditional sources of fuel. Further, burning hydrogen for fuel may emit benign or nontoxic byproducts such as water while minimizing carbon dioxide and nitrous oxide emissions, thereby reducing the environmental impacts of various modes of transportation that use hydrogen as a fuel source.

The present disclosure provides systems and methods for storing, transporting, and using hydrogen to enable carbon-free transportation (i.e., zero carbon emissions and carbon-free fuel). The systems and methods of the present disclosure may be used to service or create a carbon-free transportation market (i.e., a carbon-free fuel and emissions aviation market). The systems and methods of the present disclosure may be implemented to facilitate the capture, storage, transportation, distribution, and use of hydrogen to fuel and power various vehicles. The systems and methods of the present disclosure may be used to safely store and transport hydrogen while buffering or shielding the hydrogen from potential changes in storage conditions (changes in temperature, pressure, etc.) and/or mitigating the impacts of such changes. The systems and methods of the present disclosure may also be used to efficiently transport hydrogen while isolating fuel storage modules from vibrations or external movements that may damage the storage modules or the hydrogen contained within.

The systems and methods of the present disclosure may be implemented to enable quick, convenient, and precise interfacing of hydrogen fuel tanks or storage modules with hydrogen production or processing equipment and vehicle or aircraft systems or subsystems, including structural components, power delivery systems, aircraft control systems, propulsion systems, transportation infrastructure, and/or recycling infrastructure. The systems and methods of the present disclosure may be used to enable efficient loading of hydrogen fuel storage modules into vehicles as well as efficient unloading and inspection of spent or partially spent hydrogen fuel storage modules from vehicles. The systems and methods of the present disclosure may be used to reduce costs, labor, and the amount or complexity of infrastructure associated with the transportation and delivery of hydrogen. The systems and methods of the present disclosure may further enable the coordination of hydrogen capture, storage, transportation, distribution, and refueling of hydrogen fuel storage modules to provide hydrogen fuel to various stakeholders or consumers, depending on each stakeholder's or consumer's present or future demand for hydrogen fuel.

The systems and methods of the present disclosure may also enable the coordination of hydrogen capture, storage, transportation, distribution, and refueling to provide hydrogen fuel to various stakeholders or consumers depending on the types of vehicles operated by each stakeholder or consumer, and the frequency or schedule of such operation of such vehicles. In some cases, the systems and methods of the present disclosure may be used to generate documents, information, and/or checklists that various stakeholders (e.g., pilots, ground operators, regulators, air traffic controllers) may need to perform one or more functions associated with managing or coordinating the delivery and/or usage of hydrogen, with minimal training.

In an aspect, the present disclosure provides systems and methods for carbon-free emissions transportation. The method may comprise (a) storing hydrogen fuel in one or more fuel storage modules; (b) transporting the one or more fuel storage modules to a vehicle fueling site, wherein one or more hydrogen fuel compatible vehicles are located or anticipated to be located at or near the vehicle fueling site; (c) loading the one or more fuel storage modules into the one or more hydrogen fuel compatible vehicles, wherein the one or more fuel storage modules are configured to be releasably coupled to the one or more hydrogen fuel compatible vehicles; and (d) decoupling the one or more fuel storage modules from the one or more hydrogen fuel compatible vehicles after the one or more fuel storage modules are depleted or partially depleted.

In some embodiments, the method may further comprise: (e) refueling the one or more depleted or partially depleted fuel storage modules for redeployment on the one or more hydrogen fuel compatible vehicles.

Embodiments of the disclosed technology provide a hydrogen fuel supply method for use by hydrogen-powered vehicles. In some embodiments, the method comprises receiving at a vehicle fueling site one or more fuel storage modules, wherein the one or more fuel storage modules are filled with hydrogen at a hydrogen supply source supply source (which may include, but is not limited to, a hydrogen production facility, pipeline or other transportation conduit, storage container or other intermediate facility or medium), and wherein each of the one or more fuel storage modules comprise a storage capsule and a fuel outlet fitting through which hydrogen fuel is dispensed from the storage capsule. A hydrogen-powered vehicle is received at the vehicle fueling site for fueling, wherein the hydrogen-powered vehicle has a fuel storage compartment, a fuel system with one or more fuel inlet fittings, and a power plant coupled to the fuel system for receiving hydrogen fuel from the fuel system of the hydrogen-powered vehicle. One or more depleted fuel storage modules are removed from the fuel storage compartment of the hydrogen-powered vehicle, and the one or more filled fuel storage modules are loaded into the fuel storage compartment. Each fuel outlet fitting is connected to a respective one of the one or more fuel inlet fitting to transfer the hydrogen fuel from the fuel storage module to the fuel system of the hydrogen-powered vehicle. The one or more depleted fuel storage modules are directed away from the vehicle fueling site for refilling at the hydrogen supply source.

The method can include accessing the depleted fuel storage modules in the hydrogen-powered vehicle, disconnecting the fuel outlet fitting of the depleted fuel storage module from the one or more fuel inlet fittings, and removing the depleted fuel storage modules from the fuel storage compartment of the hydrogen-powered vehicle. The method can include securing the fuel storage modules to the structure of the hydrogen-powered vehicle in the fuel storage compartment. The method can include loading the depleted fuel storage modules onto a transport vehicle for transportation to the hydrogen supply source for refilling with hydrogen. In some embodiments, the fuel outlet fitting and the fuel inlet fitting are quick connect fittings, and the method includes releasably interconnecting the mating quick connect fittings. The method can include monitoring the health of the fuel storage modules via sensors on the fuel storage modules.

Some embodiments provide a method of hydrogen fuel supply for hydrogen-powered aircrafts, and the method comprises providing at a vehicle fueling site the hydrogen-powered aircraft. The aircraft has a fuel storage compartment, a fuel system with one or more fuel inlet fitting, and a power plant coupled to the fuel system for receiving hydrogen fuel from the fuel system of the aircraft. A first fuel storage module that is depleted of hydrogen fuel is disconnected from the fuel system and removed from the fuel storage compartment. A second fuel storage module is loaded from the vehicle fueling site into the fuel storage compartment, wherein the second fuel storage module is previously filled with the hydrogen fuel at a remote hydrogen supply source. The second fuel storage module comprises a storage capsule and a fuel outlet fitting through which hydrogen fuel is dispensed from the storage capsule. The fuel outlet fitting of the second fuel storage module is connected to the fuel inlet fitting of the aircraft's fuel system to provide hydrogen fuel for powering the power plant. The depleted first fuel storage module is directed away from the vehicle fueling site, and the aircraft is moved away from the vehicle fueling site after the first fuel storage module is loaded onto the aircraft. The aircraft is flown along a selected route during which the hydrogen fuel is used and depleted from the first fuel storage module, and the aircraft is returned to the vehicle fueling site for refueling by loading filled fuel storage modules into the aircraft and connecting the filled fuel storage modules to the aircraft's fuel system.

In some embodiments, the step of disconnecting comprises disconnecting a plurality of depleted first fuel storage modules and removing the plurality of depleted first fuel storage modules. The loading step comprises loading a plurality of second fuel storage modules into the fuel storage compartment. The step of refueling can comprise removing the second fuel storage modules from the aircraft after hydrogen fuel is depleted therefrom, replacing the removed fuel storage modules with the filled fuel storage modules, and connecting the fuel outlet fitting of the filled fuel storage module to the fuel inlet fitting of the aircraft's fuel system. The method can comprise transporting the first fuel storage modules from the vehicle fueling facility to a hydrogen supply source for refilling with hydrogen fuel.

In some embodiments, the method may further comprise: determining a demand for the one or more fuel storage modules before transporting the one or more fuel storage modules to the vehicle fueling site. The demand may be determined based at least in part on a number of vehicles at the fueling site, a frequency of operation of the vehicles, or a distance travelled by the vehicle during a typical trip.

In some embodiments, the hydrogen may be produced at a hydrogen production facility located remote from the vehicle fueling site. The hydrogen may be processed before storage in one or more fuel storage modules. Processing the hydrogen may comprise a pressurization step, a liquefaction step, and/or a purification step. In some embodiments, the hydrogen may be processed to change a pressure, a temperature, and/or a density of the hydrogen before storage.

In some embodiments, the one or more fuel storage modules may be configured to be releasably coupled to the one or more hydrogen fuel compatible vehicles using a coupling mechanism. In some embodiments, the coupling mechanism may comprise a quick release coupling mechanism.

In some embodiments, the one or more fuel storage modules may have a size, shape, form factor, or configuration compatible with (a) equipment at a hydrogen production facility, (b) one or more transport vehicles for transporting the fuel storage modules, and (c) the one or more hydrogen fuel compatible vehicles. The one or more hydrogen fuel compatible vehicles may be converted or retrofitted to be compatible with the one or more fuel storage modules. The one or more hydrogen fuel compatible vehicles may comprise one or more hydrogen fuel cells configured to generate electricity using the hydrogen fuel stored within the one or more fuel storage modules. The one or more hydrogen fuel compatible vehicles may comprise an engine configured to combust the hydrogen fuel stored within the one or more fuel storage modules.

In some embodiments, the fuel storage modules may comprise a plurality of materials. In some embodiments, the fuel storage modules may comprise a first material configured to contain the hydrogen. In some embodiments, the first material may comprise an impermeable or semi-permeable membrane. In some embodiments, the fuel storage modules may comprise a second material configured to carry a stress exerted on one or more inner walls of the fuel storage modules by the hydrogen. In some embodiments, the second material may comprise a carbon fiber weave. In some embodiments, the fuel storage modules may comprise a third material configured to provide thermal insulation for the hydrogen. In some embodiments, the fuel storage modules may comprise a fourth material configured to provide abrasion resistance and impact resistance for the fuel storage modules. In some embodiments, the fourth material may comprise a synthetic fiber.

In some embodiments, the method may further comprise coordinating the transportation of the fuel storage modules based at least in part on (a) current and future production rates for the hydrogen, (b) current, historical, and projected energy prices, (c) expected transit times, (d) a location of one or more hydrogen production facilities, (e) a production capacity of the one or more hydrogen production facilities, (f) transport logistics for a given consumption or demand profile, (g) an availability of one or more modes of transport, (h) a location of one or more vehicle fueling sites, (i) a current or future willingness of consumers to pay for the hydrogen, or (j) a level of service guarantee. Coordinating the transportation of the fuel storage modules may minimize production and transportation costs and may maximize on-time deliveries.

In some embodiments, the method may further comprise monitoring one or more parameters associated with the one or more fuel storage modules, through a life of the fuel storage modules. In some embodiments, the one or more parameters may comprise a temperature of the hydrogen stored within the fuel storage modules, a pressure of the hydrogen stored within the fuel storage modules, a velocity or an acceleration of the hydrogen fuel storage modules, an amount of gas venting or leakage from the fuel storage modules, a load exerted on the fuel storage modules due to an acceleration or a deceleration of the fuel storage modules, a load exerted on the fuel storage modules due to one or more vibrations or shocks, or any changes thereof over a predetermined period of time.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

In some cases, there is a need to provide a lightweight hydrogen storage vessel that does not use or require epoxy to seal the vessel or make the vessel impermeable. Disclosed are one or more hydrogen vessels that are lightweight and do not require a coating of epoxy or resin. Additionally, disclosed is a method for producing the hydrogen vessel.

In an aspect, a vessel for storing a fluid is disclosed. The vessel comprises a flexible, non-rigid braided layer covering an enclosure in which the fluid is stored. The braided layer comprises a plurality of fiber patterns braided or weaved in two or more different directions to support different pressure loads exerted by the fluid against an internal surface of the enclosure along axial directions and radial directions. In some embodiments, the vessel does not require substantial use of epoxy for sealing the vessel or to reduce gas permeability. The braided layer comprises a high-modulus high-tensile strength fiber. In some embodiments, the braided layer comprises carbon fiber. In some embodiments, the vessel further comprises a barrier layer and an insulation layer adjacent to the braided layer.

In some embodiments, the vessel further comprises a load transfer interface for transferring axial loads from the fiber in the braided layer using incremental shear and frictional forces. In some embodiments, the load transfer interface comprises a pair of rings located at an opening of the vessel. In some embodiments, the load transfer interface comprises an end fitting made of metal. In some embodiments, the pair of rings are nested and concentric to each other. In some embodiments, the pair of rings are shaped and sized/profiled to transition axial loads from the fiber in the braided layer.

In some embodiments, the load transfer interface is configured to increase clamping load with increased axial loading from the braided layer. In some embodiments, the fluid is a gas or a liquid. In some embodiments, the fluid comprises hydrogen.

Aspects of the disclosed technology provide a fuel storage module for storing hydrogen fuel that comprises a protective, substantially rigid external frame structure, and a hydrogen fuel storage capsule carried by the frame structure. The capsule can comprise an inner first layer defining an interior volume that contains hydrogen fuel therein, the first layer comprising a material substantially hydrogen-impervious to prevent the hydrogen from passing through the inner layer. A fiber-reinforced woven second layer is adjacent to and radially outward of the first layer, wherein the second layer captures and supports the first layer and carries stresses from loads generated by the hydrogen fuel in the interior volume. An abrasion resistant third layer encases the second layer, with the second layer positioned between the third and first layers, wherein the third layer provides a protective coating over the second layer. An end closure is coupled to the first, second, and third layers. The end closure has a first portion secured to the second portion and fixedly capturing an end portion of the second layer between the first and second portions to resolve stresses in the fibers of the second layer when hydrogen fuel in the interior volume is under pressure. A hydrogen flow control assembly is coupled to the end closure and communicating with the hydrogen fuel in the interior volume. A fuel outlet fitting is coupled to the hydrogen flow control assembly and configured to releasably connect to a fuel input of a hydrogen-powered vehicle.

In some embodiments, the fiber-reinforced woven second layer comprises aligned fibers and is free of a matrix and/or is free of epoxy. The second layer can comprise a braided carbon fiber sleeve. The second layer can have opposing top and bottom end portions, and the end closure is a first end closure coupled to the top end portion. The storage module further can have a second end closure coupled to the bottom end portion of the second layer. Sensors can be mounted to the first or second end closure or can be positioned to detect the condition of the hydrogen fuel in the interior volume. An insulation layer can be provided adjacent to the second layer. The end closure can comprise a load transfer interface for transferring axial loads from the fiber in the second layer using incremental shear and frictional forces. In some embodiments the first and second portions of the end closure are nested and concentric to each other. The hydrogen flow control assembly can comprise a flow valve, a pressure regulator, and/or a control module coupled to the pressure regulator.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIGS. 6A, 6B, 60, 6D, 6E, and 6F schematically illustrate various packing configurations for a plurality of hydrogen fuel storage modules, in accordance with some embodiments.

DETAILED DESCRIPTION

Figure 1:
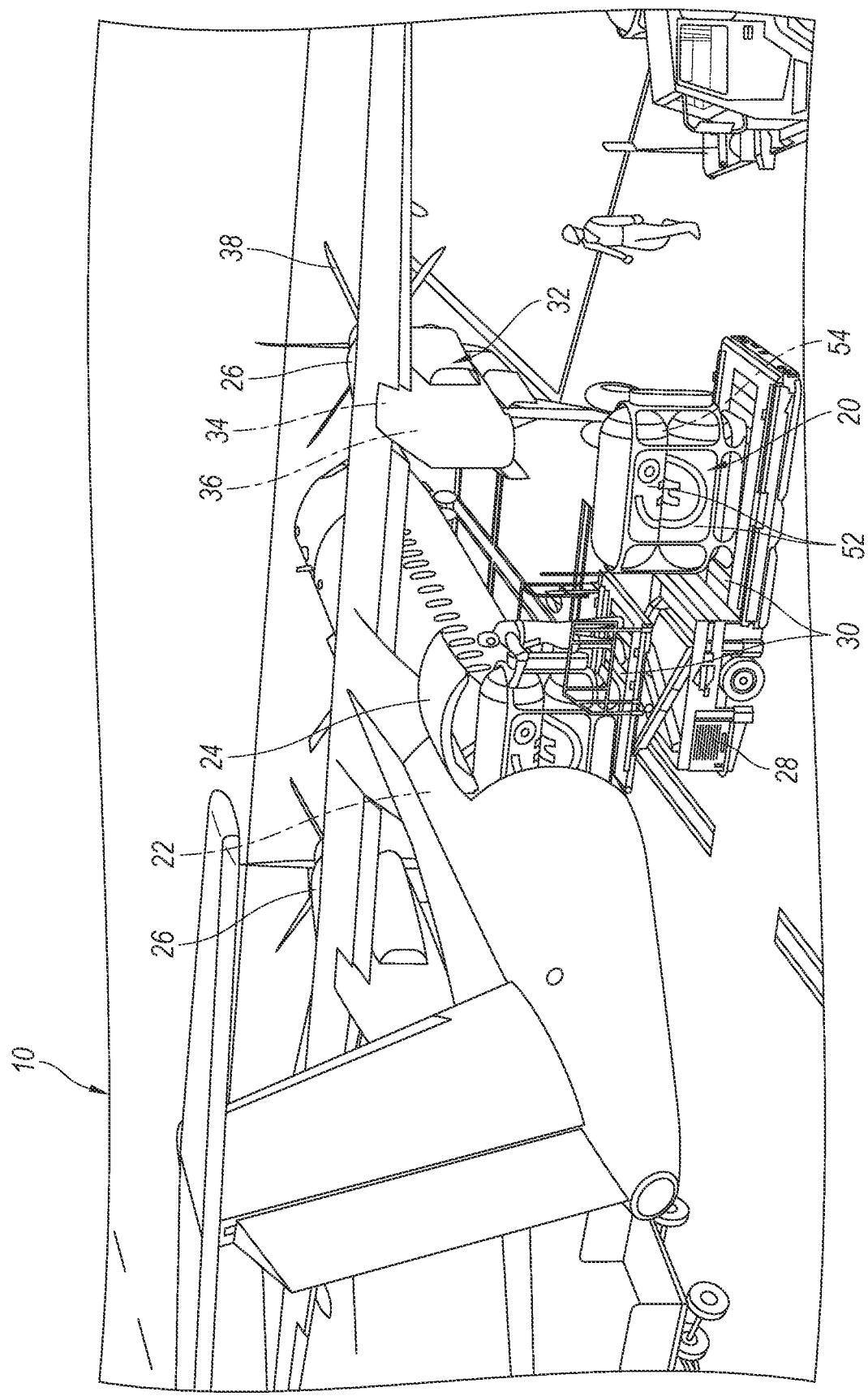
FIG. 1 is an isometric view of a hydrogen-fueled vehicle, shown as an aircraft, that receives one or more hydrogen fuel storage modules in accordance with an embodiment of the present technology.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than," or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

In an aspect, the present technology described in this disclosure provides components, systems, and methods for enabling carbon-free emissions transportation. The components, systems, and methods of the present disclosure may be used for capturing, transporting, distributing, and using hydrogen as a fuel source. The components, systems, and methods disclosed herein may provide for consistent, safe, efficient, and robust handling, transportation, distribution, and usage of hydrogen stored in fuel-storage modules. The components, systems, and methods may be used to implement an end-to-end framework for carbon-free emissions transportation. The components, systems, and methods may provide a passively safe end-to-end framework for carbon-free transportation that does not require an active agent or entity to monitor the transportation or utilization of hydrogen to ensure safety if a failure occurs. Hydrogen may be transported along the end-to-end framework in a plurality of fuel storage modules easily loadable into and out of vehicles. The fuel storage modules may not or need not require pumping of hydrogen. The fuel storage modules may be filled up at one or more hydrogen production facilities and may be easily loaded into transport vehicles (e.g., cars, trucks, trains, or ships) for transportation to one or more vehicle fueling sites for loading onto a selected vehicle. Accordingly, the system can enable a fueling process with only a single transfer of hydrogen fuel between vessels (i.e., a fuel transfer only at the production facility or other supply source into the fuel storage module, before the hydrogen is loaded onto and used to power the vehicle).

The fuel storage modules of embodiments disclosed herein are lightweight and easily stored for transport. The fuel storage modules may be configured to insulate the hydrogen and minimize changes to the temperature and/or pressure of the hydrogen contained within the storage modules. The fuel storage modules may also be configured to store the hydrogen in a controlled environment while minimizing damage (e.g., punctures, perforations, tears, etc.) to the fuel storage modules due to abrasions or impact forces that may be experienced during transport. The fuel storage modules may be modular and compatible with a variety of vehicles. The fuel storage modules may be configured to fit within aircraft dimensional and operational constraints. The fuel storage modules may allow for a minimization of an amount or a complexity of equipment needed to capture hydrogen fuel from remote sources (e.g., production facilities) and to interface the storage modules with propulsion systems of vehicles compatible or made to be compatible with such storage modules.

The fuel storage modules of embodiments disclosed herein are configured to easily couple to and/or interface with hydrogen production or hydrogen processing equipment for efficient filling of the storage modules. The fuel storage modules may be configured to easily decouple from hydrogen production and processing equipment for efficient transitioning from filling of the tanks to loading of the tanks into a transportation vehicle for delivery to one or more vehicle fueling sites. The fuel storage modules may be configured to easily couple to and/or interface with one or more quick release adapters or mechanisms that may be integrated into hydrogen fuel compatible vehicles for more efficient loading of the fuel storage modules into such vehicles. The fuel storage modules may be configured to easily decouple from one or more quick release adapters or mechanisms to enable quick removal and replacement of spent fuel storage modules. The hydrogen fuel storage modules may have a design or form factor (e.g., a size and/or a shape) compatible with one or more systems for providing hydrogen fuel, transporting hydrogen fuel, distributing hydrogen fuel, using hydrogen fuel for movement or transportation, and/or replacing or refilling spent fuel storage modules. The systems and methods of the present disclosure may provide an added benefit of reducing expenses and an amount of time required to fill the hydrogen fuel storage modules and to load and/or unload the storage modules into various hydrogen fuel compatible vehicles.

Vehicles

The systems and methods disclosed herein may be used to provide hydrogen fuel to one or more vehicles with hydrogen-powered propulsion systems. In at least one embodiment, the one or more vehicles are, for example, airplanes and/or aircraft. FIG. 1 illustrates an aircraft 10 configured to removably receive one or more hydrogen fuel storage modules 20 into a fuel module storage area 22 or other compartment through a service door 24. The hydrogen fuel storage modules 20 are connectable to the aircraft fuel system to provide the hydrogen fuel to power the aircraft's one or more power plants 26. The hydrogen fuel storage modules 20 are easily and safely loaded onto or off of the aircraft 10 by a transport or loading vehicle 28 with a conveyance assembly 30 to position the hydrogen fuel storage module 20 at and in alignment with the open service door 24 for smooth and simple movement into or out of the aircraft's fuel module storage area 22. Although the illustrated embodiment shows the vehicle as an aircraft 10, other embodiments in accordance with the present technology can include other vehicles.

In embodiments wherein the vehicle is an aircraft, the aircraft may comprise civilian turbojet aircraft of any size or category, e.g., wide-body turbojet aircraft, narrow-body turbojet aircraft, regional turbojet aircraft, and/or business turbojet aircraft. The aircraft may comprise civilian turboprop or piston powered aircraft of any size or category, e.g., regional turboprop and piston powered aircraft, commuter turboprop and piston powered aircraft, and/or any other type of turboprop or piston powered aircraft. The aircraft may comprise military turbojet aircraft of any size or category, or military turboprop and piston powered aircraft of any size or category. The aircraft may comprise aircraft configured for long-haul flights, medium-haul flights, and/or short-haul flights. In some cases, the aircraft may comprise, for example, commercial airplanes such as jumbo passenger jets, mid-size passenger jets, light passenger jets, passenger turboprops, and/or cargo airplanes. In other cases, the aircraft may comprise private jets including, for example, very light jets, light business jets, mid-size business jets, heavy business jets, or military jets. Alternatively, the aircraft may comprise private single engine planes, twin turboprop planes, aerobatic planes, or amphibious planes. In some cases, the aircraft may comprise a vertical takeoff and landing (VTOL) aircraft. In other cases, the aircraft may comprise one or more air taxis. The components, systems, and methods of the present disclosure can be modified and/or adapted for use with any type of aircraft or aerial vehicle.

In some embodiments, the aircraft may comprise a rotorcraft such as a helicopter. In some instances, the rotorcraft may be a multi-rotor craft that may include a plurality of rotors. The plurality of rotors may be capable of rotating to generate lift for the rotorcraft. The rotors may be propulsion units that may enable the rotorcraft to move about freely through the air. The rotors may rotate at the same rate and/or may generate the same amount of lift or thrust. The rotors may optionally rotate at varying rates, which may generate different amounts of lift or thrust and/or permit the rotorcraft to rotate. In some instances, one, two, three, four, five, six, seven, eight, nine, ten, or more rotors may be provided on a rotorcraft. The rotors may be arranged so that their axes of rotation are parallel to one another. In some instances, the rotors may have axes of rotation at any angle relative to one another, which may affect the motion of the rotorcraft.

The aircraft may be manned (i.e., operated by a passenger on or in the aircraft). The aircraft may be unmanned (i.e., operated by an individual who is not on or in the aircraft). The aircraft may be autonomous or semi-autonomous. In some cases, the aircraft may be capable of responding to commands from a remote controller. The remote controller may not and need not be physically connected to the aircraft, and may communicate with the aircraft wirelessly from a distance. In some instances, the aircraft may be capable of operating autonomously or semi-autonomously. The aircraft may be capable of following a set of pre-programmed instructions. In some instances, the aircraft may operate semi-autonomously by responding to one or more commands from a remote controller while otherwise operating autonomously. For instance, one or more commands from a remote controller may initiate a sequence of autonomous or semi-autonomous actions by the aircraft in accordance with one or more parameters.

In some cases, the one or more vehicles may comprise a land-bound, underground, underwater, water surface, aerial, or space-based vehicle. The one or more vehicles may be configured to move within any suitable environment, such as in air (e.g., a fixed-wing aircraft, a rotary-wing aircraft, or an aircraft having neither fixed wings nor rotary wings such as a hot air balloon or a blimp), in water (e.g., a ship or a submarine), on ground (e.g., a motor vehicle, such as a car, truck, bus, van, motorcycle, bicycle, or a train), underground (e.g., a subway), in space (e.g., a spaceplane, a satellite, or a probe), or any combination of these environments.

The one or more vehicles may be capable of moving freely within the environment with respect to six axes of freedom (e.g., three axes of freedom in translation and three axes of freedom in rotation). Alternatively, the movement of the one or more vehicles can be constrained with respect to one or more axes of freedom, such as by a predetermined path, track, or orientation. The movement can be actuated by any suitable actuation mechanism, such as an engine, a motor, or a hydrogen electric propulsion system as described below. The actuation mechanism of the one or more vehicles can be powered by any suitable energy source, such as hydrogen, or any energy source derivable from hydrogen, such as electrical energy. The one or more vehicles may be self-propelled via a propulsion system, as described elsewhere herein.

In some instances, the one or more vehicles may be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the one or more vehicles to take off from a surface, land on a surface, maintain its current position and/or orientation (e.g., hover), change orientation, and/or change position.

The propulsion system may comprise one or more propulsion mechanisms. The one or more propulsion mechanisms may comprise one or more of rotors, propellers, blades, engines, motors, wheels, axles, magnets, or nozzles. The vehicles described herein may have one or more, two or more, three or more, or four or more propulsion mechanisms. The propulsion mechanisms may all be of the same type. Alternatively, one or more propulsion mechanisms can be different types of propulsion mechanisms. The propulsion mechanisms can be mounted on the vehicle using any suitable means. The propulsion mechanisms can be mounted on any suitable portion of the vehicle, such on the top, bottom, front, back, sides, or suitable combinations thereof.

In some embodiments, the propulsion mechanisms can enable the vehicle to take off vertically from a surface or land vertically on a surface without requiring any horizontal movement of the vehicle (e.g., without traveling down a runway). The movement of the one or more vehicles can be actuated by any suitable actuation mechanism, such as an engine or a motor. The actuation mechanism of the one or more vehicles can be powered by any suitable energy source, such as electrical energy generated using one or more fuel cells. The vehicle may be self-propelled via the propulsion system. One or more of the propulsion mechanisms may be controlled independently of the other propulsion mechanisms. Alternatively, the propulsion mechanisms can be configured to be controlled simultaneously.

The one or more vehicles can be controlled remotely by a user or controlled locally by an occupant within or on the one or more vehicles. In some embodiments, the one or more vehicles may be an unmanned movable object, such as a UAV. The unmanned movable object, such as a UAV, may not have an occupant onboard the unmanned movable object. The unmanned movable object can be controlled by a human or an autonomous control system (e.g., a computer control system), or any suitable combination thereof. The unmanned movable object can be an autonomous or semi-autonomous robot, such as a robot configured with an artificial intelligence.

The one or more vehicles can have any suitable size and/or dimensions. In some embodiments, the one or more vehicles may be of a size and/or dimensions to have a human occupant within or on the vehicle. Alternatively, the one or more vehicles may be of size and/or dimensions smaller than that capable of having a human occupant within or on the vehicle. In some instances, the one or more vehicles may have a maximum dimension (e.g., length, width, height, diameter, diagonal) about 1 m, 2 m, 3 m, 4 m, 5 m, 10 m, 20 m, 30 m, 40 m, 50 m, or greater. In some embodiments, the one or more vehicles can be configured to carry a load. The load can include one or more passengers, cargo, equipment, instruments, fuel storage modules, and the like.

The one or more vehicles may be converted or retrofitted with equipment to be compatible with the hydrogen fuel storage modules described herein. Alternatively, the one or more vehicles may be based on a clean-sheet design such that the one or more vehicles are specifically designed to be compatible with the hydrogen storage modules described herein.

The one or more converted, retrofitted, or clean-sheet design vehicles may be configured to use hydrogen contained with one or more hydrogen fuel storage modules for propulsion. The vehicle 10 (FIG. 1) may comprise one or more systems or subsystems configured to operatively couple to the hydrogen fuel storage modules 20. In some cases, the vehicle may have a fuel cell system 32 which may include one or more fuel cells 34. The fuel cells 34 may generate electricity through an electrochemical reaction between fuels. In some cases, the fuels may comprise hydrogen stored and transported using the hydrogen storage modules 20 described herein. The electricity generated by the fuel cells may be used to power one or more power plants 26 (i.e., motors or engines) of the vehicle 10. In some embodiments, excess electricity generated by the fuel cells 34 may be stored in one or more energy storage units 36 (e.g., batteries) for future use. In some optional embodiments, the fuel cell system 32 may also have an electrolysis module in addition to the fuel cell. Electrolysis of a byproduct of the fuel cell electrochemical reaction (e.g., water) may allow the byproduct to be removed, through decomposition of the byproduct into its elements (e.g., oxygen and hydrogen). Electrolysis of the byproduct can also generate additional fuel for the fuel cell. The electrolysis module may be powered by a renewable energy source.

As described above, the hydrogen stored in the hydrogen fuel storage modules 20 (FIG. 1) may be provided to the vehicle 10 to power the vehicle. In some cases, the hydrogen may be used to power a fuel cell 34 to generate electricity. The electricity generated by the fuel cell may be used to drive one or more electric motors and/or one or more propellers 38. The electricity generated by the fuel cell 34 may be used to drive one or more electric motors operatively coupled to a propeller, a shrouded fan, or an un-shrouded fan. In other cases, the hydrogen can be burned in a jet engine, a turbofan engine, a turboprop engine, a turboshaft engine, a turbojet engine, or any other type of internal combustion engine compatible with any of the vehicles described herein. In some cases, the hydrogen may be provided to a $H_2$ propulsion system. The propulsion system may be configured to generate electricity and drive an electric motor and/or one or more propellers. In some cases, the hydrogen may be burned in a turbofan and/or used to drive a propeller, a shrouded fan, or an un-shrouded fan in any type of vehicle or aircraft.

Figure 2A:
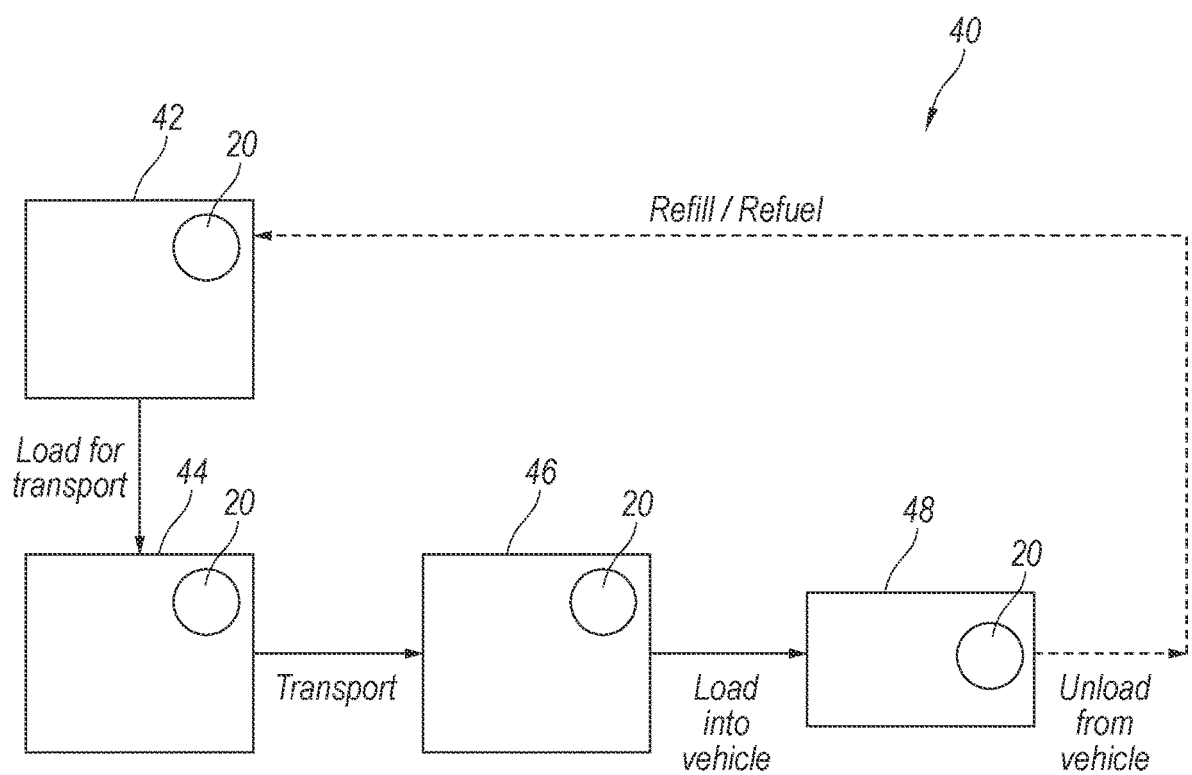
FIG. 2A schematically illustrates an end-to-end framework for enabling carbon-free transportation, in accordance with some embodiments.

The hydrogen fuel storage module 20 of the present technology is a component of an end-to-end hydrogen-fuel based system or framework to efficiently and effectively enable hydrogen-powered transportation with no carbon-based fuel and no carbon emissions. For example, FIG. 2A illustrates an end-to-end process or framework 40 for implementing carbon-free emissions transportation in accordance with aspects of the present technology. The end-to-end framework 40 of the illustrated embodiment comprises a step of interfacing one or more hydrogen fuel storage modules 20 with hydrogen production and hydrogen processing equipment located at a hydrogen supply source (which may include, but is not limited to, a hydrogen production facility, pipeline or other transportation conduit, storage container or other intermediate facility or medium). For example, the hydrogen fuel modules can be filled with hydrogen directly from a production facility 42 at highly controlled temperatures, pressures, and other operating conditions. The hydrogen may be processed (e.g., through a pressurization or liquefaction step) to increase the pressure of the hydrogen, decrease the pressure of the hydrogen, increase the temperature of the hydrogen, decrease the temperature of the hydrogen, increase the density of the hydrogen, and/or decrease the density of the hydrogen for storage and transportation purposes within the filled hydrogen fuel modules.

The illustrated end-to-end framework comprises another step of capturing and storing hydrogen produced at a hydrogen production facility 42 directly in the one or more hydrogen fuel storage modules 20. Accordingly, the illustrated end-to-end framework allows for a single hydrogen fuel transfer into the hydrogen fuel storage modules 20 at the storage vessel before the hydrogen is delivered as fuel for the propulsion system of the vehicle. This single transfer eliminates the substantially significant loss of hydrogen that can occur in the transfer of hydrogen between storage vessels. The filled hydrogen fuel storage modules 20 may be placed within a transport vehicle 44 for transport and distribution, such as based on fuel demands and forecasts at selected locations.

The illustrated end-to-end framework comprises another step of transporting and distributing the hydrogen stored in the one or more hydrogen fuel storage modules 20 to one or more vehicle fueling sites 46. The one or more vehicle fueling sites 46 may be, for example, a hydrogen fuel storage module loading station, an airport, a hangar, or any location where a hydrogen fuel compatible vehicle may be positioned for loading or unloading hydrogen fuel storage modules 20, thereby fueling or refueling the vehicle with hydrogen fuel. In some cases, the hydrogen fuel storage modules 20 may be used as onboard fuel tanks once loaded into the hydrogen fuel compatible vehicle (e.g., the aircraft 10 (FIG. 1)). One or more hydrogen fuel compatible vehicles 48, such as the aircraft 10 (FIG. 1), may be located in or near the vehicle fueling sites 46.

The illustrated end-to-end framework 40 comprises another step of loading the hydrogen storage modules 20 onto the one or more hydrogen fuel compatible vehicles 48, such as the aircraft 10 (FIG. 1). The end-to-end framework 40 may comprise another step of unloading the hydrogen fuel storage modules 20 from the vehicles 48 after the hydrogen fuel storage modules 20 are used or depleted during an operation of the vehicles 48. The end-to-end framework 40 may comprise another step of refilling and/or recycling any spent or partially spent hydrogen fuel storage modules 20. Some hydrogen fuel storage modules 20 may not require filling or refilling if used for reserve fuel purposes. In some cases, the spent or partially spent hydrogen fuel storage modules 20 may be transported back to a hydrogen production facility 42 or other storage facility for refilling or refueling.

Figure 2B:
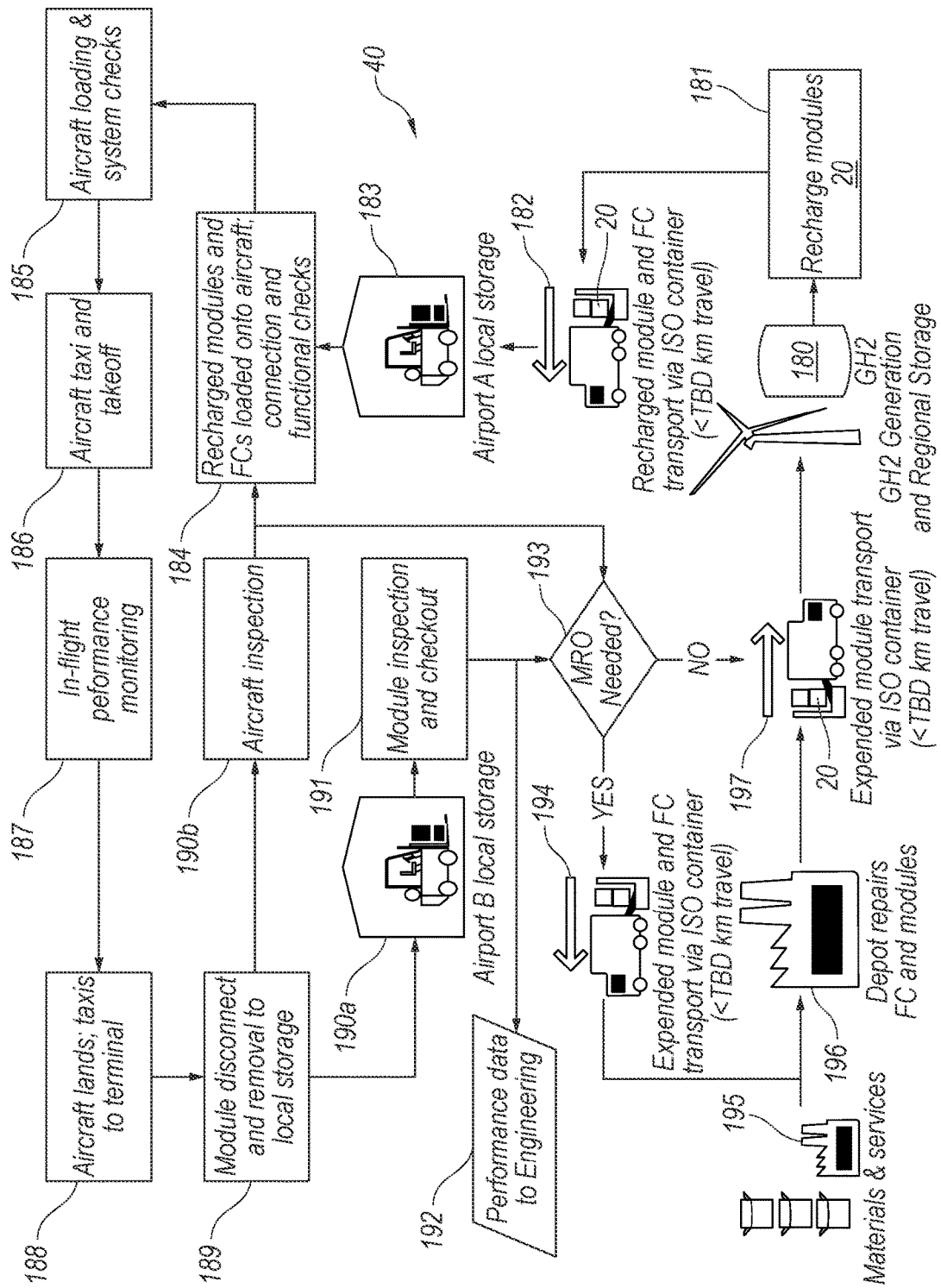
FIG. 2B schematically illustrates an example of an end-to-end framework for storing and transporting hydrogen, in accordance with some embodiments.

FIG. 2B illustrates another example of a process or framework 40 for implementing carbon-free emissions transportation in accordance with aspects of the present technology. Hydrogen gas produced and stored at a regional hydrogen production facility 180 may be used to fuel, refuel, and/or recharge 181 one or more fuel storage modules 20. The recharged fuel storage modules 20 may be transported 182 via an ISO (International Organization for Standardization) container to a first airport local storage 183. The recharged modules 20 may be loaded 184 onto a vehicle, such as an aircraft 10 (FIG. 1), and an operator may concurrently perform one or more connection and/or functional checks. After the aircraft loading, connection, and systems checks 185 are completed, the aircraft 10 may taxi and takeoff 186.

During flight wherein the hydrogen fuel is drawn from the hydrogen fuel storage modules 20 to power the aircraft's power plants 26, the aircraft may be configured to perform in-flight performance monitoring 187 of the hydrogen fuel storage modules 20 or the fuel cells operatively coupled to the hydrogen fuel storage modules 20. Upon reaching its destination, the aircraft 10 (FIG. 1) may land 188 and taxi to a terminal. The depleted hydrogen fuel storage modules 20 may be disconnected 189 for removal and placement in local storage. In some cases, the removed hydrogen fuel storage modules 20 may be moved to a second airport local storage 190a. In other cases, the aircraft 10 may undergo inspection 190b, in which case the removed hydrogen fuel storage modules 20 may also be inspected before being loaded 184 onto an aircraft 10 again. In cases where the removed hydrogen fuel storage modules 20 are moved to the second airport local storage 190a, the hydrogen fuel storage modules 20 may undergo module inspection and checkout 191.

In some cases, performance data 192 associated with the hydrogen fuel storage modules 20 may be provided to an engineering team for assessment. In some cases, there may be an assessment as to whether maintenance, repair, and/or overhaul 193 is needed. In cases where the aircraft 10 and/or the hydrogen fuel storage modules 20 undergo inspection 190b, there may also be an assessment as to whether maintenance, repair, and/or overhaul 193 is needed. If maintenance, repair, and/or overhaul 193 is needed, the expended modules 20 may be transported 194 via an intermodal freight container to a materials and services station 195 and/or a repair depot 196. After repair, the expended hydrogen fuel storage modules 20 may be transported 197 back to a hydrogen production facility 110 for refilling and/or refueling of the fuel storage modules. On the other hand, if maintenance, repair, and/or overhaul 193 is not needed, the expended hydrogen fuel storage modules 20 may be transported 197 back to a hydrogen production or supply facility for refilling and/or refueling of the hydrogen fuel storage modules 20.

Production

The hydrogen may be produced at one or more hydrogen production facilities 180 (FIG. 2A). The one or more hydrogen production facilities 180 may be configured to produce hydrogen using renewable sources of energy, and/or available grid power. In some alternative embodiments, the one or more hydrogen production facilities 180 may be configured to produce hydrogen by processing fuels such as biomass. In some cases, the hydrogen may be produced using electrolysis. During electrolysis, an electric current may split water into hydrogen and oxygen. The electric current may be produced from a renewable or carbon-free energy source. In some cases, the hydrogen may be produced by natural gas reforming and/or gasification. Natural gas reforming and/or gasification may utilize a synthesis gas (e.g., a mixture of hydrogen, carbon monoxide, and a small amount of carbon dioxide) created by reacting natural gas with high-temperature steam. Carbon monoxide may be reacted with water to produce additional hydrogen. The synthesis gas can also be created by reacting biomass with high-temperature steam and oxygen in a pressurized gasifier, which is converted into gaseous components through a gasification process. The resulting synthesis gas contains hydrogen and carbon monoxide, which is reacted with steam to separate the hydrogen. In other cases, the hydrogen may be produced using renewable liquid reforming. In such cases, renewable liquid fuels, such as ethanol, may be reacted with high-temperature steam to produce hydrogen. Alternatively, the hydrogen may be produced using fermentation. During fermentation, biomass may be converted into sugar-rich feedstocks that can be fermented to produce hydrogen.

In some cases, the hydrogen may be produced using high-temperature water splitting, whereby high temperatures generated by solar concentrators or nuclear reactors drive chemical reactions that split water to produce hydrogen. In some cases, the hydrogen may be produced using photobiological water splitting, whereby microbes, such as green algae, consume water in the presence of sunlight, producing hydrogen as a byproduct. In some cases, the hydrogen may be produced using photoelectrochemical water splitting, whereby photoelectrochemical systems produce hydrogen from water using special semiconductors and energy from sunlight.

In some cases, the hydrogen may be derived from a hydrogen-rich material, for example, organic matter such as biomass and hydrocarbons. In some embodiments, the hydrogen may be derived from one or more hydrocarbon fuels including methanol, ethanol, natural gas, or chemical hydrides. In some other embodiments, the hydrogen may be derived from non-carbon containing compounds, such as ammonia ($NH_3$) or borohydrides ($BH_4^-$).

Fueling the Storage Module

Figure 3A:
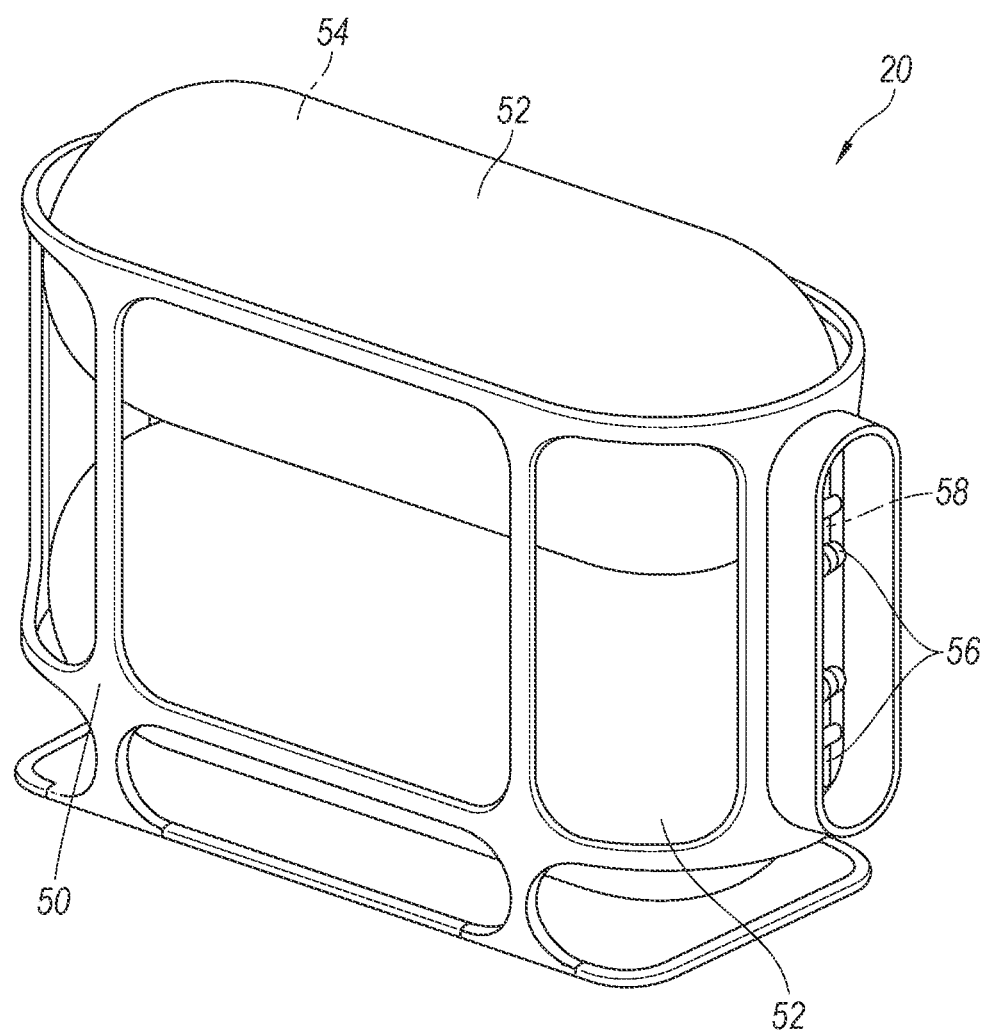
FIG. 3A is an isometric view of a hydrogen fuel storage module in accordance with some embodiments of the present technology.

In at least one embodiment, the hydrogen produced at a hydrogen production facility 180 (FIG. 2B) is transferred directly to and stored in one or more of the fuel storage modules 20 (FIGS. 2A, 2B). Prior to storage, the hydrogen may undergo one or more processing steps (e.g., pressurization, liquefaction, and/or purification in cases where the production method leaves residual impurities or introduced impurities). FIG. 3A is an isometric view of a hydrogen fuel storage module 20 in accordance with at least one embodiment of the present technology. The hydrogen fuel storage module 20 of the illustrated embodiment includes a support frame or truss 50 that securely retains one or more tanks or capsules 52 that contain the hydrogen fuel 54. The hydrogen fuel storage module 20 of the illustrated embodiment has two capsules 52 stacked vertically (i.e., one capsule 52 above the other) within the truss 50. The hydrogen fuel storage module 20 of other embodiments, however, can have a different number of capsules 52 (i.e., one or more than two). The modules 20 can also have a different storage arrangement of the capsules 52, such as horizontally side-by-side, or side-by-side horizontally and vertically, or other orientations.

The capsules 52 of the fuel storage modules 20 are filled at the hydrogen production facility 180 (FIG. 2B) via one or more fuel injection ports 56 connected to the capsules 52. The fuel injection ports 56 are configured to transfer the hydrogen fuel from an external source of hydrogen fuel into the one or more storage capsules 52 in each of the fuel storage modules 20. The one or more fuel storage modules 20 may be configured to interface with hydrogen production equipment or hydrogen processing equipment at the hydrogen production facility 180 (FIG. 2B). In some cases, the hydrogen processing equipment may comprise equipment configured for pressurization, liquefaction, or purification of hydrogen. The hydrogen may be initially supplied to the hydrogen fuel storage container via a fuel injection port until (i) the pressure of the hydrogen fuel in the fuel storage module reaches a predetermined pressure threshold or (ii) the mass of the hydrogen fuel reaches a predetermined mass threshold. The capsules 52 can also include one or more filters positioned and configured to filter the flow of hydrogen fuel prior to entering the fuel system of the aircraft or other vehicle.

In one embodiment, the capsules 52 of each hydrogen fuel storage module 20 (FIG. 3A) are configured to store the gaseous hydrogen at pressures of up to approximately 850 Bar, and with a mass of approximately 70 kg and a mass fraction in the range of 15%-20% (e.g., 17%). In this embodiment, each fuel storage module 20 weighs in the range of approximately 400 kg-450 kg. In the embodiment wherein the hydrogen fuel is liquid hydrogen, the module stores approximately 90 kg-100 kg of fuel, with mass fraction in the range of about 25%-30% (e.g., 28%), a module weight in the range of approximately 320 kg-360 kg (e.g., 343 kg), and hold time of approximately 30-50 hrs (e.g., 40 hrs.). The capsules 52 for gaseous hydrogen can be interchangeable within the truss 50 with capsules 52 for liquid hydrogen.

In one embodiment, each hydrogen fuel storage module 20 has one or more control modules 58 coupled to the storage capsules 52 and configured to monitor the pressure of the fuel and to shut off the supply of the hydrogen fuel to the fuel storage container when the pressure of the hydrogen fuel in the storage container reaches the predetermined pressure threshold. In other embodiments, the hydrogen production facility also has control modules for monitoring fuel pressures in the hydrogen fuel storage modules 52 being filled and controlling the supply or shut off of the hydrogen fuel flow during the filling process. In other embodiments, other external control or communication modules in the framework can monitor the health of the hydrogen fuel storage modules.

As described above, the hydrogen may be loaded and stored in one or more hydrogen fuel storage modules 20. As used herein, the term "hydrogen fuel storage module" may be referred to interchangeably as a "fuel storage module," a "fuel storage container," or a "fuel storage tank." The hydrogen storage module may be or include a container, tank, bladder, or vessel configured to hold hydrogen. The hydrogen storage module may be configured to hold a volume of a gaseous or a liquid fuel.

The fuel storage module 20 may be configured to store a fuel. The fuel may serve as a fuel source for a hydrogen fuel cell or a hydrogen-combusting engine. The hydrogen fuel cell may be used to generate electricity using an electrochemical reaction. The fuel may be hydrogen provided in a gaseous state or a liquid state. The fuel may be stored as a compressed gas, as a liquefied gas, or as a liquid under its own vapor pressure. In cases where the hydrogen serves as a fuel source for a hydrogen-combusting engine, the hydrogen-combusting engine may be configured to utilize the hydrogen to conduct one or more thermochemical reactions (e.g., an oxidation reaction or a combustion reaction) to move or propel a vehicle comprising the hydrogen-combusting engine.

The fuel storage module 20 may have a design or form factor configured to be compatible with various vehicles. For example, the fuel storage modules 20 of the illustrated embodiment are shaped and sized to be loaded into and securely retained in a fuel compartment of an aircraft 10 (FIG. 1) or other vehicle through the vehicle's service door 24 (FIG. 1). As described, the vehicles may be converted or retrofitted with equipment to be compatible with the fuel storage modules. Alternatively, the vehicles may be based on a clean sheet design inherently compatible with the fuel storage modules. In some cases, the fuel storage modules may have different sizes, shapes, or configurations compatible with different types or classes of vehicles. The systems and methods of the present disclosure may be implemented using a plurality of fuel storage modules. The plurality of fuel storage modules may have a similar size, shape, dimension, or configuration. Alternatively, the plurality of fuel storage modules may have different sizes, shapes, dimensions, or configurations depending on a specific type of vehicle.

The fuel storage modules may be configured to hold hydrogen for a predetermined amount of time. The fuel storage modules or containers may be lightweight to maximize a number of fuel storage modules that may be transported using a transport vehicle. The fuel storage modules or containers may be sized and/or shaped to permit efficient packing of the fuel storage modules for transport. The fuel storage modules may be resistant to abrasion or impact forces. The fuel storage modules may be resistant to changes in temperature.

The fuel storage modules of the present disclosure may be configured to hold hydrogen for a predetermined amount of time sufficient for the hydrogen to be transported from a hydrogen production facility to one or more hydrogen fuel compatible vehicles. The predetermined amount of time may be at least about 1 day, 2 days, 3 days, 4 days, 5 days, 6 days, 7 days, 8 days, 9 days, 10 days, or more. In at least one embodiment in which the vehicle is a mid-range commuter aircraft with propeller-based engines, the fuel storage modules 20 discussed in greater detail below have a construction configured to hold hydrogen virtually indefinitely (e.g., months or years) for gaseous hydrogen fuel or for approximately 30-50 hrs. for liquid hydrogen fuel. The fuel storage modules 20 disclosed herein may provide a variety of benefits, such as being lightweight, strong, robust, impermeable, and insulated so as to resist temperature changes to the hydrogen stored within the capsules 52 of the fuel storage modules 20. The fuel storage modules 20 may also be sized, shaped, and/or configured to be housed efficiently within aircraft.

The one or more fuel storage modules 20 may provide storage for a predetermined amount, or capacity, of fuel. For example, the amount of fuel stored in the fuel tanks may be, for example, at least about 10 gasoline gallon equivalent (GGE), 20 GGE, 30 GGE, 40 GGE, 50 GGE, 60 GGE, 70 GGE, 80 GGE, 90 GGE, 100 GGE, 150 GGE, 200 GGE, 250 GGE, 300 GGE, 350 GGE, 400 GGE, 450 GGE, 500 GGE, 600 GGE, 700 GGE, 800 GGE, 900 GGE, 1000 GGE, or more. In the commuter aircraft embodiment identified above, the fuel storage modules are shaped and sized to store up to approximately 70-96 GGE.

The fuel storage module 20 may have any size, shape, and/or weight. For example, each capsule 52 of the fuel storage module 20 may be larger than, smaller than, or about the same size as a 5 gallon tank, 10 gallon tank, 15 gallon tank, 20 gallon tank, 25 gallon tank, 30 gallon tank, 35 gallon tank, 40 gallon tank, 45 gallon tank, 50 gallon tank, 60 gallon tank, 70 gallon tank, 80 gallon tank, 90 gallon tank, 100 gallon tank, 200 gallon tank, 300 gallon tank, 400 gallon tank, 500 gallon tank, 600 gallon tank, 700 gallon tank, 800 gallon tank, 900 gallon tank, 1000 gallon tank, or any tank larger than a 1000 gallon tank. The fuel tank may weigh at least about 0.01 tons, 0.03 tons, 0.05 tons, 0.07 tons, 0.1 tons, 0.2 tons, 0.3 tons, 0.5 tons, 0.7 tons, 1.0 tons, or more. In the commuter aircraft embodiment identified above, each fuel storage module 20 is shaped and sized to correspond to approximately a 380-410-gallon tank and have a weight of approximately 0.3-0.4 tons.

In some cases, the fuel storage module may comprise a cross-sectional shape. The cross-sectional shape may be a circle, an ellipse, or any polygon comprising three or more sides. The polygon may comprise one or more straight sides and/or one or more curved sides. In some cases, the fuel storage module may be of a cylindrical form. In some cases, the fuel storage module may comprise a toroidal shape or any shape with multi-part cross-sections. The fuel storage module may comprise a three-dimensional enclosed volume with any suitable size, shape, or cross-section for storage and transportation of hydrogen. In some embodiments, the fuel storage module 20 has a cross-sectional shape that differs from the cross-sectional shape of the capsules. For example, the capsules 52 can be generally cylindrical tanks with a circular cross-section, but the truss 50 forming the exterior shape of the fuel storage module can have a generally rectangular shape, which allows the fuel storage modules 20 to easily and securely stack on each other. The truss 50 can also be configured to securely and releasably stack or otherwise interconnect with trusses 50 of other fuel storage modules 20.

The fuel storage module 20 may be capable of containing a fuel (e.g., hydrogen) at a predetermined pressure. In some embodiments, each capsule 52 of the fuel storage module 20 may be capable of containing a fuel having a pressure of less than or equal to about 15000 psig, 13000 psig, 12000 psig, 11000 psig, 10000 psig, 8000 psig, 7000 psig, 6500 psig, 6000 psig, 5500 psig, 5000 psig, 4750 psig, 4500 psig, 4250 psig, 4000 psig, 3750 psig, 3500 psig, 3250 psig, 3000 psig, 2750 psig, 2500 psig, 2000 psig, 1500 psig, 1000 psig, 500 psig, 300 psig, 100 psig, or less. In the commuter aircraft embodiment identified above, the capsules 52 of the fuel storage modules 20 are shaped and sized to store hydrogen fuel having a pressure in the range of up to approximately 70 psig-14500 psig. In the illustrated embodiment, each capsule 52 is configured to store gaseous hydrogen fuel at up to approximately 12314 psig (~850 Bar).

In some embodiments, the fuel storage modules 20 may comprise a fuel storage material for storing a fuel (e.g., hydrogen). The fuel storage material may be capable of absorbing and releasing the fuel and may possess favorable hydrogen storage attributes. For instance, the fuel may be stored in the bulk of the fuel storage material via absorption, and/or stored on a surface of the fuel storage material via adsorption. In some other embodiments, the fuel may be stored in the fuel storage material by chemically reacting the fuel with the fuel storage material. In some alternative embodiments, the fuel storage material may comprise a complex hydride, such as a sodium alanate. In some cases, the fuel storage material may comprise one or more liquid carriers of hydrogen.

The fuel storage modules 20 may be configured to prevent or reduce leakage of hydrogen, even when the hydrogen is stored at high pressures within the storage modules. For instance, the capsules 52 of the fuel storage modules 20 of the illustrated embodiment are provided with an inner tank layer that is substantially hydrogen-impervious. Accordingly, the capsules 52 are configured so that less than 15%, 10%, 7%, 5%, 3%, or 1% of the hydrogen may leak from the fuel storage module 20 over a period of time. The period of time may be at least about a 1 minute, 5 minute, 10 minute, 15 minute, 20 minute, 30 minute, 45 minute, 60 minute, or 120 minute period of time. The period of time may be at least about 1 day, 2 days, 3 days, 4 days, 5 days, 6 days, 7 days, 8 days, 9 days, 10 days, or more. This may be the case, even when the hydrogen is stored at a pressure exceeding 10 psi, 11 psi, 12 psi, 13 psi, 14 psi, 15 psi, 16 psi, 17 psi, 18 psi, 20 psi, 25 psi, 30 psi, 35 psi, 40 psi, 45 psi, 50 psi, 60 psi, 70 psi, 80 psi, 90 psi, 100 psi, or more.

The fuel storage module 20 may have a volume that may permit sufficient storage of hydrogen without impeding movement or flight of the vehicle and without substantially changing a mass, center of mass, center of gravity, or a volume of the vehicle. For example, in one embodiment wherein the vehicle is a passenger aircraft, a fuel storage module occupies the volume of approximately one seat row pitch (i.e., corresponding to about four passengers) and a mass of approximately 300-400 kg. The mass of four passengers is roughly about 350 kg, so the net mass difference is negligible. The fuel storage module may also have a volume and form factor allowing for appropriate weight and balance, and safe and comfortable usage of and/or access to different regions of the aircraft (e.g., the aircraft fuselage), while complying with requirements such as, for example, egress requirements.

The fuel storage module may have a volume and form factor allowing for normal aircraft usage in various facilities (e.g., airport terminals, maintenance/storage hangars, etc.). In some instances, the ratio of a volume of an individual fuel storage module to a volume within a housing of the vehicle may be less than or equal to about 1:20, 1:15, 1:10, 1:8, 1:7, 1:6, 1:5, 1:4, 1:3, or 1:2. In some cases, the ratio of the volume may be greater than any of the values described herein. In some instances, the ratio of the volume of the sum of all of the fuel storage modules to a volume within a housing of the vehicle may be less than or equal to about 1:15, 1:10, 1:8, 1:7, 1:6, 1:5, 1:4, 1:3, or 1:2. In the commuter aircraft embodiment identified above, the ratio provided by the fuel storage module 20 is approximately 1:20. In some cases, the ratio of the volume may be greater than of the values described herein.

In some embodiments, the fuel storage modules 20 may generate a lift force when the fuel is stored in the fuel storage module. As mentioned, the fuel may be hydrogen, or another fuel that may be lighter than air. In those embodiments, the density of the fuel in the fuel storage module may be substantially lower than a density of air outside the fuel storage module. The lift force can provide lift (e.g., aerostatic lift) to the vehicle. The additional lift force may reduce power consumption and may increase a flight time of the vehicle. The pressure of the fuel in the fuel storage module may be provided below a neutral buoyancy pressure such that the fuel storage module may attain a lighter-than-air state to generate the lift force. In some cases, the fuel storage modules may be stored in pods that contribute to the aerodynamics of an aircraft and generate lift. For example, the pods may be wing pods that generate lift and/or enhance the aerodynamics of the aircraft.

The pressure of the fuel may be monitored using one or more gas pressure sensors located in the fuel storage module 20. Alternatively, the pressure of the fuel may be monitored using one or more strain gauges configured to compute pressure by measuring how much deformation a wall of the fuel storage module undergoes. The fuel storage module may be configured to store the hydrogen fuel and may permit minimal fuel leakage over time. In some cases, the other sensors may be used for detecting and monitoring the module's health and potential maintenance needs.

Materials

The fuel storage modules 20 may be formed using materials having one or more material properties suitable for storing and/or transporting hydrogen. The one or more material properties may deliver the necessary mass, strength, toughness, permeability, and flammability characteristics to aid in storage and/or transport of the hydrogen stored within the fuel storage modules. In some cases, the one or more materials may comprise a metallic material. For example, the truss 50 of the fuel storage module 52 (FIG. 3A) can be made of a metallic material. The metallic material may comprise, for example, aluminum, platinum, magnesium, titanium, iron, cobalt, nickel, copper, zinc, silver, and/or gold. In some cases, the one or more materials may comprise a composite material. For example, the truss 50 can be made of a fiber-reinforced material, such as a carbon-fiber composite. As discussed in greater detail below, the capsules 52 can include metallic components and/or fiber-reinforced components. The composite material may comprise, for example, fiberglass, carbon fibers, carbon nanofibers, aramid, fiber-reinforced polymers, carbon-fiber-reinforced polymers, and/or glass-reinforced plastics.

In some embodiments, the fuel storage module 20 and/or the capsules 52 may be formed from a rigid material. For instance, the fuel storage module may comprise a structurally rigid capsule 52 having a chamber for storing the fuel. In some alternative embodiments, the fuel storage container, such as the capsules 52 of the fuel storage module 20, may comprise a non-rigid material. In some cases, the fuel storage container may comprise a fuel bag for storing the hydrogen fuel. The fuel bag may comprise an inner volume or chamber for storing the fuel. The fuel bag may be formed from a flexible material such as a fabric, bladder, elastomeric material, or any other material. One or more portions of the fuel bag may freely bend or fold. The fuel bag may or may not be formed from an expandable or stretchable material. The fuel bag may comprise a light-weight impermeable membrane. The fuel bag may be formed from a light-weight polymer. The light-weight polymer may include, for example, polyester, polyester fiber, mylar, or reinforced nylon. The fuel bag may be formed from one or more organic materials. In some instances, the entirety of the fuel bag may be formed from an organic material. When the fuel bag is not filled with the fuel, the fuel bag may have a deflated configuration. The deflated configuration may be folded, rolled, or bunched in on itself. When the fuel bag is filled with the fuel, the fuel bag may be fully inflated and stretched under tension. The fuel bag may take any shape. In some instances, the fuel bag may be substantially spherical, ellipsoidal, cylindrical, prismatic, torus-shaped, tear-drop shaped, bowl-shaped, or may be a flattened sphere, an ellipse, a solid geometric shape, or any other shape when inflated.

In some embodiments, the fuel storage module 20 may comprise both rigid and non-rigid materials. For example, the fuel storage module may comprise a first material that is rigid and a second material that is non-rigid. The first material and the second material may be provided as different layers of the fuel storage module. In some cases, the first material and the second material may be integrated into a single layer of the fuel storage module.

In some embodiments, the fuel storage module 20 and/or its components, such as the capsules 52 of the illustrated embodiment, may be made of a composite material having a tenacity of about 160 gram-force/Denier (g/D). The tenacity may correspond to a special parameter for characterizing the breakdown strength of fiber in the composite material. In some embodiments, the tenacity of the fuel storage module material may be less than 160 g/D. For example, the tenacity may be less than or equal to about: 160 g/D, 150 g/D, 140 g/D, 130 g/D, 120 g/D, 110 g/D, 100 g/D, 90 g/D, 80 g/D, 70 g/D, 60 g/D, 50 g/D, 40 g/D, 30 g/D, 20 g/D, or 10 g/D. In some other embodiments, the tenacity of the fuel storage module material may be greater than 160 g/D. For example, the tenacity may be greater than or equal to about: 160 g/D, 170 g/D, 180 g/D, 190 g/D, 200 g/D, 210 g/D, 220 g/D, 230 g/D, 240 g/D, 250 g/D, or 260 g/D. In some embodiments, the fuel storage module may have a tensile strength ranging from about 10 megapascals (MPa) to about 4,000 MPa.

The material of the fuel storage module 20, such as the material(s) of the capsules 52 of the illustrated embodiment, may be configured to withstand a stress and/or a strain within the operational parameters of the capsules 52. In some embodiments, the strain (i.e., the change in the length of the material in the direction of an applied force divided by the initial undeformed length of the material) may be at least about 1%, 2%, 3%, 4%, 5%, 6%, 7%, 8%, 9%, 10%, or more. In some embodiments, the strain may be at most about 10%, 9%, 8%, 7%, 6%, 5%, 4%, 3%, 2%, 1%, or less. In the commuter aircraft embodiment identified above, the capsules 52 of the fuel storage modules 20 are constructed with composite materials to withstand stresses up to approximately 1150-1350.

The fuel storage module 20, and particularly the capsules 52 of the illustrated embodiment, may be flame-resistant since the fuel (e.g., hydrogen) may be highly combustible. In some embodiments, the fuel storage module and/or its components may be formed of multiple layers. For example, each capsule 52 may be formed from one or more, two or more, three or more, four or more, five or more, or six or more layers. The multiple layers may comprise an inner layer and a shell layer. The inner layer of the capsule may be configured to hold and/or contain the fuel, and the shell layer may be disposed around and/or placed over the inner layer. The inner layer may be formed of a high-molecular-weight polymer and may serve as a barrier to prevent the fuel from permeating out of the fuel storage module. The shell layer may serve as a pressure load-bearing component of the fuel storage module and may provide light-weight structural reinforcement. In some embodiments, the shell layer may be made of an elastic carbon fiber-epoxy resin composite. A thickness of the shell layer may be equal to or greater than a predetermined thickness to prevent the shell layer from rupturing under high pressures. The thickness of the shell layer may be designed such that the fuel storage module remains elastic and conformable under high pressures.

Layers of Fuel Storage Module

In some cases, the fuel storage modules 20 and its components may comprise a plurality of layers and/or materials. The plurality of layers and/or materials may each be configured or optimized to perform a single function (e.g., insulation, structural integrity, impact protection, impact resistance, or carrying pressure loads). In some cases, the plurality of layers and/or materials may be configured or optimized to perform multiple functions (e.g., insulation, structural integrity, impact protection, impact resistance, and carrying pressure loads). In some cases, the fuel storage module 20 may include one or more capsules that are standard, commercially available consumer off the shelf storage tanks. In such cases, the fuel storage module may comprise a single layer or material configured to perform multiple functions.

Figure 3B:
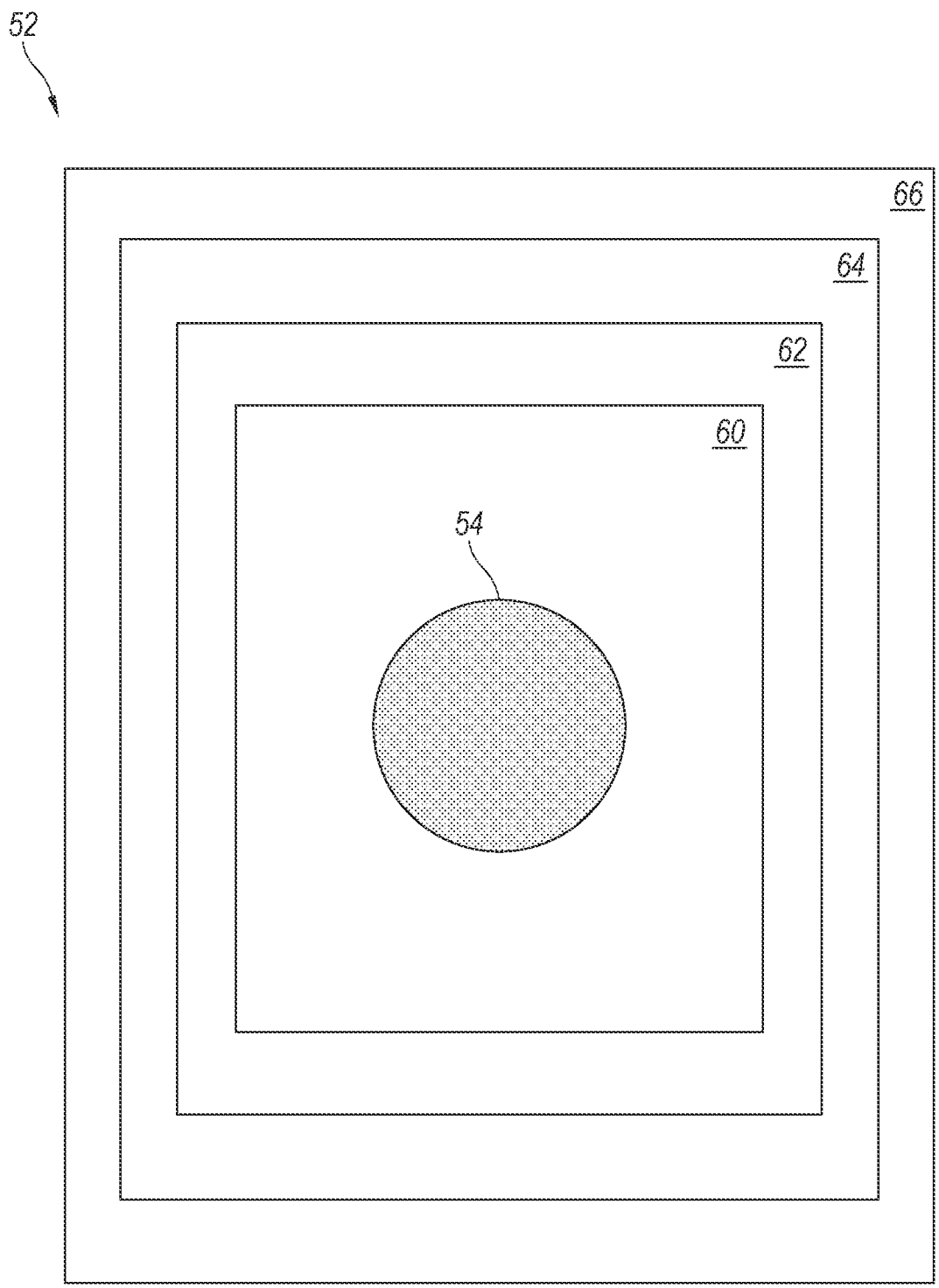
FIG. 3B schematically illustrates the hydrogen fuel storage module, in accordance with some embodiments.

In some cases, such as the capsules 52 of the fuel storage modules 20 of the illustrated embodiment shown in FIGS. 3A and 3B, may comprise a plurality of layers and/or materials configured to perform different functions. For example, the capsule 52 may comprise a first material to contain the hydrogen and reduce permeability. The first material may be a membrane made of a high-molecular-weight polymer. The capsules 52 may further comprise a second material to carry the stresses from the carried pressure load. The second material may comprise a carbon fiber weave. The second material may be a lightweight material that minimizes a weight of the fuel storage modules. The capsules 52 may further comprise a third material. The third material may comprise insulation. The insulation may comprise a cork or foam material. The insulation may be configured for temperature shielding to minimize changes in the temperature of the contents within the fuel storage modules.

While the embodiment illustrated in FIG. 3B includes the insulation layer, other embodiments do not include an intermediate layer of insulative material. In yet other embodiments, the insulation layer may be in a different position, such as between the inner layer and the carbon fiber weave, or multiple insulation layers may be used. The capsules 52 may further comprise a fourth material. The fourth material may be configured to provide abrasion resistance and impact resistance for the fuel storage modules or containers. The fourth material may comprise a synthetic fiber material, for example, an aramid material.

161643299.1-33-

In some cases, a layer of the capsules 52 and/or other components of the fuel storage module 20 may be a composite of two or more materials and may be capable of providing one or more functional benefits (e.g., selective permeability or impermeability, thermal insulation, load distribution, etc.). The layers may be arranged in any suitable order. In some cases, one or more intermediate layers may be disposed between two or more adjacent layers of the capsule. In some cases, one or more layers providing a first functional benefit may be omitted or replaced with another layer providing a second functional benefit. In some cases, a layer of the capsule may provide multiple functional benefits. In some cases, multiple functional benefits may be associated with a layer of the capsule. This may reduce manufacturing costs, enhance manufacturability of the capsule, and/or enhance a performance of the capsule.

In some cases, the fuel storage modules may comprise a truss structure. The truss structure may be configured to carry and/or distribute one or more internal loads exerted on a structural component or a portion of the fuel storage modules by the pressurized hydrogen contained within the fuel storage modules.

Figure 3C:
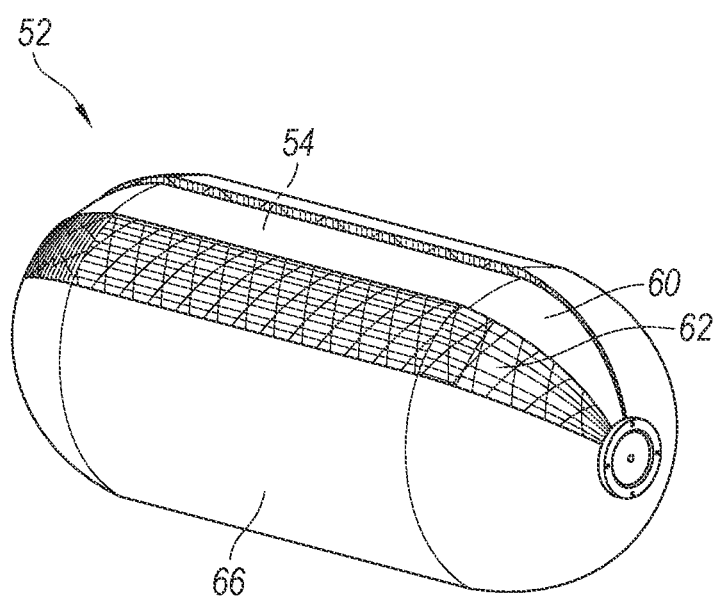
FIG. 3C is a partially cut-away isometric view of a capsule of the fuel storage module in accordance with some embodiments.

FIG. 3B is a schematic illustration of key components and layers of an exemplary capsule 52 of the fuel storage module 20. FIG. 3C is a partially cut-away isometric view of a capsule 52 on an embodiment of the present technology. The key components and layers of the capsule 52 may be selected based on a functional decomposition analysis such that each element or layer of the structure of the capsule 52 of the fuel storage module 20 is optimized for a specific function. In some cases, a container for protecting the fuel storage module 20 and its components may be provided separately or integrated as part of the fuel storage module.

As illustrated in FIGS. 3B and 3C, each capsule 52 of the fuel storage module 20 may comprise an inner-most first layer 60 comprising a selectively permeable or impermeable membrane to contain or retain the hydrogen fuel 54. In at least one embodiment, the first layer 60 is flexible, such as a polyethylene (PE), polyvinyl alcohol (PVA) or ethylene vinyl acetate (EVA), or other high-molecular-weight polymer material that is substantially impervious to hydrogen, including hydrogen gas contained at high pressures (e.g., ~850 Bar). In other embodiments, the first layer 60 can be a laminated structure formed by a PE or other hydrogen-impervious membrane material adhered to one or both sides of a carbon-fiber weave layer or other fiber-supported layer. Other embodiments can use other materials. The capsule 52 has a second layer 62 immediately adjacent to the first layer 60 to carry the stresses from the pressurized hydrogen load contained by the first layer. In some cases, the second layer 62 may comprise a carbon fiber weave, such as triaxial carbon braid or other seamless, substantially cylindrical carbon fiber weave. The second layer 62 may or may not comprise epoxy. In the illustrated embodiment, the second layer 62 is a carbon fiber weave without an epoxy or other binder or matrix, which provides a very strong, yet lightweight, stress-carrying layer surrounding the hydrogen-impervious inner-most layer.

The capsule 52 of the illustrated embodiment further comprises a third layer 64 that provides insulation from external thermal loads. In the embodiment illustrated schematically in FIG. 3B, the third layer 64 is outward of and radially adjacent to the second layer 62, so the second layer 62 is captured between the first and third layers 60 and 64. The insulative third layer 64 can be made of aerogel or other selected lightweight, high insulating value material that controls thermal transfer to or from the first and second layers 60 and 62. In some cases, the capsule 52 comprises a fourth layer 66 outward of the third layer 64, so the third layer 64 is between the second and fourth layers 62 and 66. It is noted that in some embodiments, such as the embodiment illustrated in FIG. 3C, the capsule 52 does not include the third layer of insulative material, such that the capsule has the first, second, and fourth layers 60, 62, and 66, and the second layer 62 is captured between the first and fourth layers 60 and 66.

In the illustrated embodiments, the fourth layer 66 is configured to provide abrasion resistance and impact resistance for the capsule 52 fuel storage module 20. The fourth layer 66 may be made of, for example, an aramid material (e.g., Kevlar®) or other highly durable, strong, lightweight abrasion-resistant material that forms a protective shell around the inner layers of the capsules. In some embodiments, the fuel storage modules 52 can include an additional outer layer over the fourth layer 66, for example to provide a selected textured, colored, protective, or aesthetic exterior surface.

The layers 60, 62, 64, and 66 can be stacked adjacent to each other but not fixedly adhered to each other except at their end portions. Accordingly, as conditions change within the interior of the capsule 52 during use, including filling, being transported, loaded, activated to dispense hydrogen fuel, unloaded, stored, etc., an individual layer may be able to move relative to the other layers. This provides resilient, durable, and accommodatable containers 52. In other embodiments, some or all of the layers 60, 62, 64, and 66 can be affixed or bonded to each other, so as to prevent any relevant movement between the affixed layers.

In some cases, the fuel storage module 20 comprises the truss 50 (FIG. 3A) structure for additional structural support to the one or more capsules 52 carried by the truss. The truss 50 structure of the illustrated embodiment provides a durable, protective frame, such as an open frame with a shape and form compatible with a shape or a structure of an internal volume or region of an aircraft 10 (e). In some embodiments, the truss 50 can be configured to stack vertically and/or horizontally with trusses of other fuel storage modules, so as to stack and releasably lock adjacent fuel storage modules together. The truss 50 is also configured to be moved within the fuel storage area of the aircraft 10 to fully installed positions in mating engagement with the aircraft's fuel system and locked in place to securely maintain alignment of the fuel storage modules 20 and associated capsules 50 and valving hardware within the aircraft 10 during all phases of operation. The truss 50 is also configured for installation and engagement with other vehicles, such as the transport vehicles used to transport the fuel storage modules to and from the hydrogen production facility or the storage facility. Accordingly, the form, shape, and function of the fuel storage modules 20 may be optimized for use in an aircraft or any vehicle described herein. The form and shape of the fuel storage modules 20 may permit a higher mass fraction (i.e., approximately 15%-20% or more for gaseous hydrogen fuel and approximately 25%-30% for liquid hydrogen fuel) of hydrogen to be transported or stored for fuel consumption, and may maximize an amount or a volume of hydrogen that can be transported or stored per unit mass of the fuel storage module, while meeting shape and volume constraints of an aircraft.

The construction and configuration of the fuel storage modules 20 provide a secure, safe, durable, and modular hydrogen fueling system. After the storage modules 20 are filled with hydrogen fuel at a hydrogen production facility 110 (FIG. 2A) via the single transfer process as discussed above, extraction of the hydrogen fuel may not be permitted until the fuel storage modules 20 are loaded into and operatively interconnected to the fuel system of the hydrogen-powered aircraft 10 or other hydrogen fuel compatible vehicle for consumption via the vehicle's hydrogen-fueled power plant. The fuel storage modules 20 in the illustrated embodiment are lightweight with a high mass fraction that facilitates use with the aircraft or other vehicle. The fuel storage modules 20 also minimize, mitigate, and/or reduce leaking or emission of hydrogen fuel during storage and/or transport. The fuel storage modules may be configured for low diffusion of hydrogen fuel when the hydrogen fuel is not being used or consumed by a hydrogen fuel compatible vehicle.

Transport

Figure 4A:
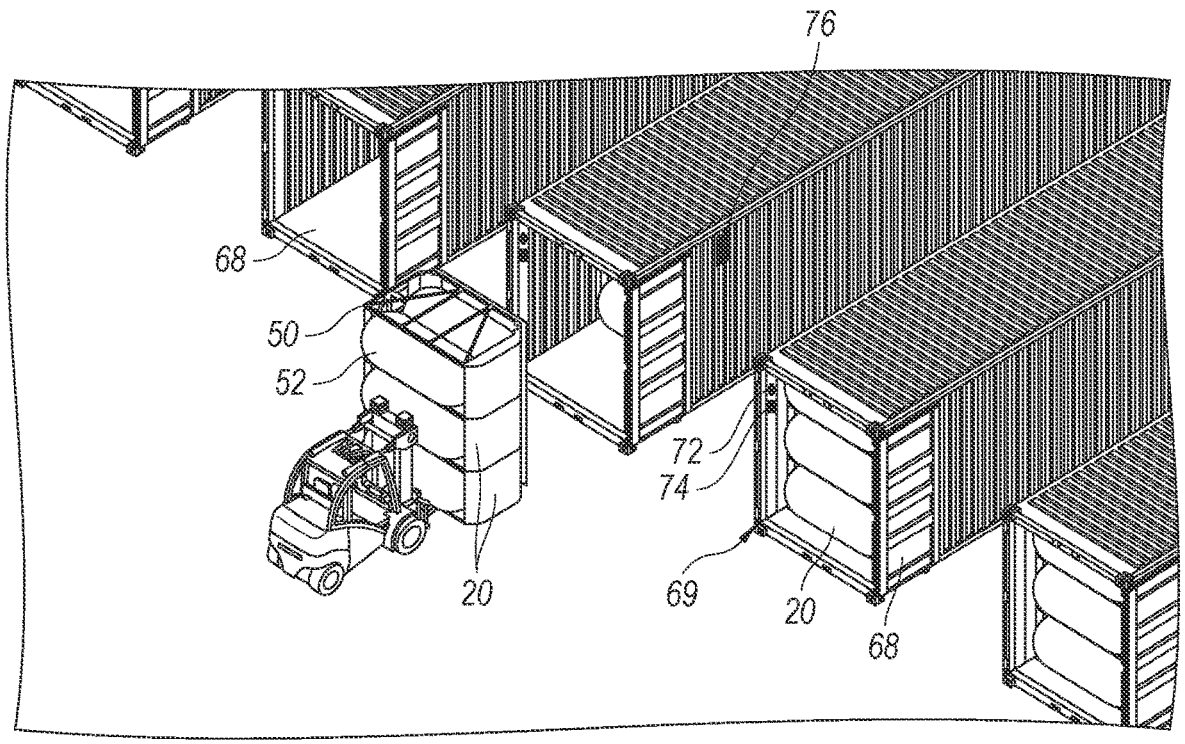
FIG. 4A illustrates fuel storage modules loading into a transport container in accordance with some embodiments.
Figure 4B:
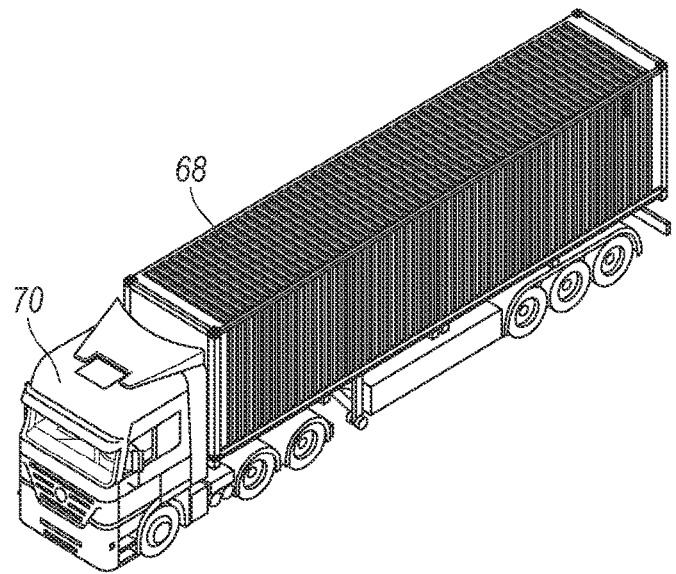
FIG. 4B illustrates a transport vehicle in accordance with some embodiments.

FIG. 4A illustrates fuel storage modules 20 loading into a transport container 68 of a fuel module storage system 69 in accordance with some embodiments. FIG. 4B illustrates a transport vehicle 70 in accordance with some embodiments for transporting the transport containers 68 and/or the fuel storage modules 20 to and from locations within the end-to-end framework 40 (FIGS. 2A, 2B). The transport container 68 can be a shipping container or other transport structure that can securely receive and contain a plurality of fuel storage modules 20 for transport in bulk. In the illustrated embodiment, the transport container 68 is loaded onto or otherwise coupled to the transport vehicle 70 for transportation and distribution to one or more fueling sites. The transport vehicle 70 may comprise any type of vehicle described herein. In other embodiments, a shipping container 68 is not used, and the fuel storage modules 20 can be secured onto the transport vehicle 70, such as on a transport bed, cargo bay, cargo car, etc.

The transport vehicle 70 may be configured to transport a plurality of fuel storage modules 20 to or from a plurality of aircraft or other hydrogen fuel compatible vehicles. In some cases, the transport vehicle 70 may comprise a terrestrial vehicle and the hydrogen fuel compatible vehicle may comprise an aerial vehicle. The transport vehicle 70 may transport the fuel storage modules 20 to one or more vehicle fueling sites configured for loading and unloading the fuel storage modules 20 onto or off of the aircraft 10 (FIG. 1) or other hydrogen fuel compatible vehicle. The transport vehicle 70 can also be a hydrogen fuel compatible vehicle that is powered by hydrogen fuel from a fuel storage module operatively installed and connected to the transport vehicle's fuel system to power its hydrogen-based power plant. The plurality of hydrogen fuel compatible vehicles may be located at or near the one or more vehicle fueling sites.

In some cases, the fuel storage modules 20 may be loaded into a plurality of transport vehicles 70 at different points along a transport route for delivery to one or more aircraft 10 (FIG. 1) or other hydrogen fuel compatible vehicles. The plurality of transport vehicles 70 may comprise at least the first vehicle. The plurality of transport vehicles 70 for transporting the fuel storage modules 20 may be different. In some cases, a first transport vehicle 70 may be configured to transport the fuel storage modules 20 a first distance along the transport route, a second transport vehicle may be configured to transport the fuel storage modules 20 a second distance along the transport route, and so on until the fuel storage modules 20 are delivered to selected aircraft or other hydrogen fuel compatible vehicles in or near one or more vehicle fueling sites. The fuel storage modules 20 may be sized and/or shaped to be compatible with each transport vehicle 70 configured to travel along the transport route for delivery of the fuel storage modules to the one or more vehicle fueling sites.

As described above, in some cases the first transport vehicle 70 may comprise a terrestrial vehicle. The terrestrial vehicle may comprise any land-based vehicle designed or used to transport passengers or cargos. Examples of a terrestrial vehicle may include cars, trucks, buses, and/or trains. A truck may include a light duty truck (e.g., class 1, class 2, or class 3), medium duty truck (e.g., class 4, class 5, or class 6), or heavy-duty truck (e.g., class 7 or class 8). In the alternative, the first vehicle may comprise a ship, boat, aircraft, or any other type of vehicle described herein.

The first transport vehicle 70 may be configured to carry a plurality of fuel storage modules 20 depending at least in part on a demand for hydrogen fuel at the one or more vehicle fueling sites. The plurality of fuel storage modules may comprise at least 1, 2, 3, 4, 5, 6, 7, 8, 9, 10, 15, 20, 25, 30, 35, 40, 45, 50, 60, 70, 80, 90, 100, 200, 300, 400, 500, 600, 700, 800, 900, 1000, or more fuel storage modules. In the commuter aircraft embodiment identified above, a transport vehicle 70 will typically carry up to approximately 14-27 fuel storage modules 20 to service up to approximately 4-9 aircraft.

In some cases, the fuel storage modules 20 may be arranged on or next to each other in a horizontal or vertical configuration. In some cases, the fuel storage modules 20 may comprise one or more flat surfaces (e.g., provided by the truss 50 of the fuel storage module 20 or other external structure) forming an exterior portion of the fuel storage modules 20. In such cases, the fuel storage modules 20 may be stacked on top of each other and/or arranged in a square packing configuration. In some cases, the fuel storage modules 20 may have a cylindrical shape. In such cases, the fuel storage modules 20 may be stacked on top of each other and/or arranged in a hexagonal packing configuration. In some cases, the fuel storage modules 20 may be placed or stacked in a honeycomb configuration. In some cases, the fuel storage modules 20 may be of different sizes and/or shapes.

Different sets of fuel storage modules 20 can be positioned or provided on different reference planes in three-dimensional space. The reference planes can be oriented in various configurations (e.g. parallel, oblique, inclined, orthogonal, intersecting, non-intersecting, etc.). In some embodiments, different sets of fuel containers may be located on different inclined reference planes that intersect with one another.

In some cases, one or more fuel storage modules 20 may be rigidly held in place on one or more transport vehicles 70 (FIG. 4B) using a transport frame structure or other support assembly and/or engagement assemblies, such as clamps, hooks, straps, tie-downs, etc. In some embodiments, the one or more sides of the fuel storage modules 20 may be affixed in the shipping container 68 and/or in contact with the support assembly, so as to increase support and minimize movement of the fuel storage modules 20 during transportation.

The fuel storage modules 20 may be loaded into a fuel module storage system 69, such as the shipping container 68 or other transport container, that may be mounted to a transport vehicle for transportation and distribution. The fuel module storage system 69 may comprise one or more support structures configured to support the end and/or side portions of the fuel storage modules. Some of the support structures may include neck grooves that form an enclosure around a neck portion of the fuel storage modules.

In some embodiments, the fuel module storage system 69 may be configured to support one or more fuel storage modules 20 with the same or different characteristics. The fuel storage modules 20 may be of any size, capacity, shape, and/or weight and may be made of any suitable material. For example, the fuel storage modules 20 may have a shape substantially cylindrical, rectangular, spherical, or the like.

The fuel module storage system 69 may be mounted or attached to any suitable portion(s) of a transport vehicle 70 for transportation. In an embodiment, the fuel module storage system may be mounted behind a cab of the transport vehicle. In another embodiment, the fuel module storage system may be mounted on one or more sides of the transport vehicle. In another embodiment, the fuel module storage system may be mounted on the top of the transport vehicle, for example, on or in the roof of the vehicle. In yet another embodiment, the fuel module storage system may be mounted on a trailer or a detachable portion of the transport vehicle. In other embodiments, a fuel storage system may be mounted to a transport vehicle using any combination of configurations. For example, the fuel module storage system may be installed in the front or back of the body of a transport vehicle. In various embodiments, the location and/or manner of attachment of the fuel module storage system to the transport vehicle may be based on a variety of factors including the capacity and type of the fuel containers, type of the vehicle, and business requirements.

In some cases, the fuel module storage system 69 may include one or more modular fuel container support assemblies (hereinafter support modules or support assemblies) used to support and/or secure one or more fuel storage modules described elsewhere herein. Such support assemblies may be used to stabilize, support or otherwise protect the fuel storage modules from damage caused by movement (such as during transit), external impact, natural elements, erosion, and the like. In some cases, the support assemblies may be configured to form a frame that supports one or more fuel storage modules 20 and minimizes movement of the fuel storage modules 20 during transportation. In some cases, the fuel module storage system 69 may comprise a plurality of sensors for module monitoring and leak detection. In some cases, the fuel module storage system 69 may comprise a fire suppression system.

The fuel storage modules 20 may be mechanically coupled to the transport vehicle 70, the fuel module storage system 69, and/or one or more support assemblies using one or more fasteners. The fasteners may be an inherent part of the support assemblies (e.g., tongue and groove, wedge and slide, joints, and the like) or external to the support members (e.g., wires, locks, adhesive, welding, and the like). Exemplary types of fasteners may include nuts and bolts, nails, locks, latches, wires, joints, soldering, welding, adhering, and the like. In other embodiments, the fuel storage modules 20 may simply be placed or stacked adjacent to one another within the transport vehicle 70 or within the fuel module storage system without any fastening mechanism.

In various embodiments, components or portions of a support assembly described herein (e.g., end support members, side frames, truss members, side support members) may be constructed using any suitable material or combination of materials. For example, the materials used may include metal such as steel, iron, aluminum, titanium, copper, brass, nickel, silver and the like, or any alloys or combinations thereof. The materials may also include a polymer or a composite material, such as carbon fiber, or fiberglass. The choice and amount of materials used may be based on various factors including cost, strength-to-weight ratios, location or position of the support assemblies in a desired configuration, aesthetic reasons and the like. In various embodiments, the dimensions of one or more components or portions of a support assembly (e.g., end support members, side frames) may be based at least in part on the characteristics of fuel containers (e.g., dimensions, capacities, type of fuel) supported therein, space considerations for the support assemblies, and the like.

Storage Units/Intermodal Freight Containers

In some embodiments, the fuel storage modules 20 may be placed within one or more storage units or containers for transport, such as the shipping container 68 (FIG. 4A). The one or more storage units may be provided on or attached to a portion of a transport vehicle 70 (FIG. 4B). In some cases, the one or more storage units may be integrated with and/or integrally connected to a housing or a body of the transport vehicle. The storage units may be configured as intermodal freight containers. In some cases, the storage unit may be an ISO 668 container.

The one or more storage units may be configured to shield or protect the fuel storage modules from vibrations, impacts, abrasions, and/or physical damage during transport to the one or more fueling sites. The one or more storage units may be configured to provide additional insulation for the hydrogen stored within the fuel storage modules. In some instances, the one or more storage units may be configured to minimize changes in the temperature of the hydrogen stored within the fuel storage modules during transport to the one or more vehicle fueling sites.

The one or more storage units may be made of a lightweight material. The one or more storage units may be formed from a rigid material. The fuel storage modules may conform to a size and/or a shape of an interior space or volume of the storage unit. In some cases, the fuel storage modules may be inserted into the storage units for transport. In some cases, the fuel storage modules may be configured to slide into the storage units. The fuel storage modules may be secured to a portion of the storage units or the transport vehicle to minimize movement during transportation. The fuel storage modules may be secured using a mechanical coupling or an adjustable strap.

In some cases, the storage unit may form an enclosed volume. The interior space of the storage unit may have a symmetric shape. In some alternative embodiments, the interior space of the storage unit may have an irregular shape. A maximum volume of the fuel storage module may be determined based on a maximum volume of the interior space of the storage unit. In some embodiments, the storage unit may be partially filled with an inert gas (e.g., helium) to reduce a risk of explosion of the fuel storage modules if the fuel is highly flammable (e.g., hydrogen).

In some cases, the fuel storage modules may be loaded into an intermodal freight container for transport. The intermodal freight container may be configured to isolate the fuel storage modules from vibrations, abrasions, or external thermal loads. In some cases, the intermodal freight container may be configured for fire suppression. In some cases, the intermodal freight container may comprise a shell configured to absorb or internalize an impact if there is an explosion of the fuel storage modules placed within the intermodal freight container. In some cases, the plurality of fuel modules may be loaded into the intermodal freight containers and secured using a plurality of wedges to provide support during transport and to minimize movement of the fuel modules. In some cases, the plurality of wedges may comprise four or more wedges insertable between gaps or spaces between the plurality of fuel modules and one or more inner walls of the intermodal freight containers.

In some cases, the fuel storage modules and/or the intermodal freight containers may be configured for inter-modal transit/freight, whereby a plurality of transport vehicles are used to transport the fuel storage modules and/or the intermodal freight containers from the hydrogen production facility to the one or more vehicle fueling sites. In some cases, the plurality of transport vehicles may comprise a first set of vehicles configured to transport the fuel storage modules to a second set of hydrogen fuel compatible vehicles located at or near the one or more fueling sites.

In some cases, the fuel storage modules or containers and/or the intermodal freight containers, such as the shipping container 68 (FIG. 4A), may comprise one or more sensors 72. The one or more sensors 72 may be configured to monitor a location of the fuel storage modules 20 or to monitor an internal temperature and/or internal pressure of the hydrogen stored within the fuel storage modules. In some cases, the fuel storage modules or containers and/or the intermodal freight containers may comprise one or more sensors selected from the group consisting of pressure gauges, strain gauges, thermocouples, and/or thermistors. In some cases, one or more measurements obtained using the one or more sensors may be used to generate a time trace history for the location of the fuel storage modules or for the internal temperatures and/or internal pressures of the fuel storage modules and/or the intermodal freight containers.

In some cases, the fuel storage modules 20 and/or the intermodal freight containers 68 may comprise an active monitoring system 74 that monitors the location of the fuel storage modules or the internal temperatures and/or internal pressures of the fuel storage modules and/or the intermodal freight containers during transport. The active monitoring system 74 may be configured to facilitate remote monitoring of the location of the fuel storage modules 20 or the internal temperatures and/or internal pressures of the fuel storage modules and/or the intermodal freight containers during transport. In some cases, the active monitoring system 74 may comprise one or more accelerometers to monitor for any vibrations, impacts, shocks, or crash events. The remote monitoring may be performed in real time and/or periodically. In some cases, an algorithm may be implemented to predict structural failures, overpressure conditions, or potential burst scenarios for the fuel storage modules and/or the intermodal freight containers, based at least in part on one or more measurements obtained using one or more sensors of the active monitoring system.

In some cases, the fuel storage modules 20 or containers and/or the intermodal freight containers 68 may comprise a venting system 69 (FIG. 4A). The venting system 76 may be configured to dissipate hydrogen in a case where hydrogen leaks from the fuel storage modules or the intermodal freight containers. Alternatively, the venting system may be configured to dissipate hydrogen in a case where hydrogen is controllably released from the fuel storage modules. The fuel storage modules or containers and/or the intermodal freight containers may be configured to vent at least a portion of the hydrogen stored in the fuel storage module or container during transport. The venting system may be configured to release hydrogen in a controlled manner. In some cases, the venting system may be configured to release and react the hydrogen with another gas contained in the intermodal freight containers to make the hydrogen inert.

Loading Fuel Storage Modules into Hydrogen Fuel Compatible Vehicles

As described elsewhere herein, the fuel storage modules 20 may be transported from the hydrogen production facility 42 (FIGS. 2A, 2B) to the one or more vehicle fueling sites 46. The fuel storage modules 20 may be transported to a first region in or near the one or more vehicle fueling sites 46. A plurality of vehicles compatible with the hydrogen storage modules may be located at a second region in or near the one or more fueling sites. The hydrogen storage modules may require additional transport from the first region to the second region. In some cases, one or more terrestrial transport vehicles may be used to transport the hydrogen storage modules 20 from the first region to the second region.

Figure 4E:
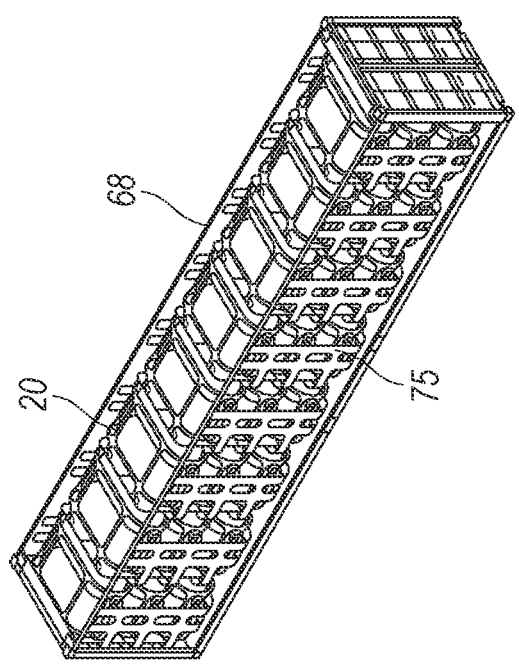
FIG. 4E is an isometric view of a plurality of loading frames and fuel storage modules in a shipping container.
Figure 4D:
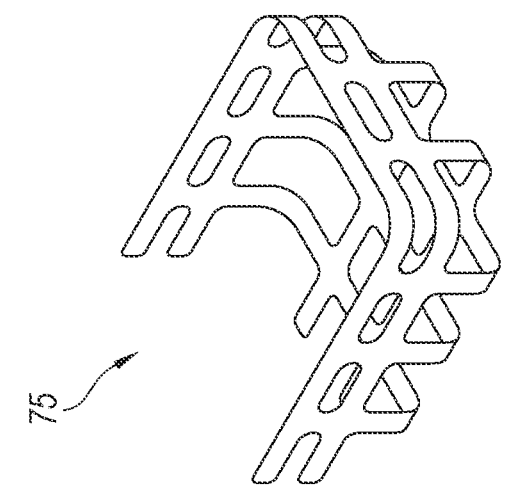
FIG. 4D is an isometric view of the loading frame of FIG. 4C shown removed from the fuel storage modules.
Figure 4C:
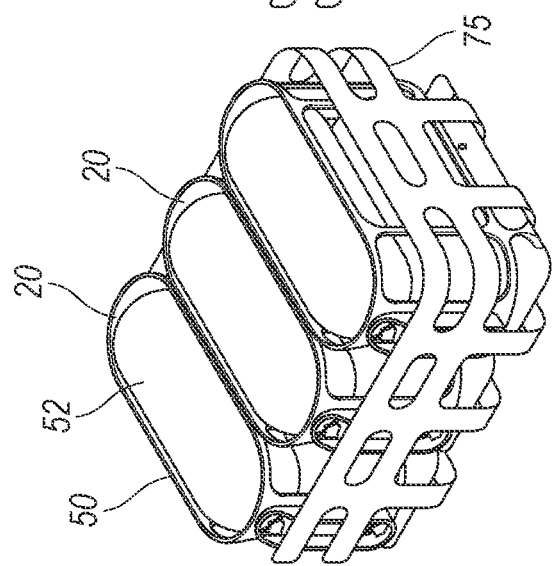
FIG. 4C is an isometric view of a loading frame containing a plurality of fuel storage modules in accordance with some embodiments.

In some cases, the fuel storage modules 20 may be loaded into or onto one or more consolidation structures, such as loading frames 75. As seen in FIGS. 4C and 4D, the loading frames 75 may be configured to receive a plurality of the fuel storage modules 20 and may be configured to arrange the plurality of modules 20 in a fixed configuration for insertion into a hydrogen fuel compatible vehicle (e.g., the aircraft 10 (FIG. 1)). The loading frames 75 may be configured to be moved from the first region to one or more hydrogen fuel compatible vehicles in the second region via ground control equipment 72 (FIG. 1), which can transport the loading frames 75 to and into the aircraft 10 or other vehicle. In some cases, the loading frames 75 may be transported from the first region to the one or more hydrogen fuel compatible vehicles in the second region using one or more other terrestrial vehicles. In some cases, a plurality of fuel storage modules 20 may be releasably coupled to the loading frame 75. In such cases, the loading frames 75 can be configured to align the fuel storage modules 20 for installation into the aircraft 10 or other hydrogen fuel compatible vehicle.

The fuel storage modules 20 may be loaded into or inserted into the loading frames. As described elsewhere herein, the loading frames 75 may be configured as an adapter (e.g., a rack, frame, holder, mount, cradle, bracket, etc.) configured to receive and arrange one or more fuel storage modules 20 in a predetermined configuration.

In some cases, the loading frame 75 may comprise a truss structure (FIG. 4D). The truss structure may be a frame that arranges and secures the fuel storage modules 20 in a desired configuration, position, and/or orientation. The frame may be a lightweight frame that supports and encompasses containers, vessels, or fuel storage modules of varying sizes. The truss structure may hold multiple fuel storage modules together in a predetermined configuration.

The loading frames 75 and/or the truss structure of the loading frames may be configured to hold fuel storage modules 20, containers, capsules 52, or other vessels of varying sizes. In some cases, the loading frame and/or the truss structure of the loading frame may be configured to hold a plurality of cylindrical fuel tanks of varying sizes. The cylindrical fuel tanks, such as the capsules 52 (FIG. 3A) may be encased by the truss structure, such as the truss 50 (FIG. 3A) that is configured as a lightweight frame. The truss structure may be configured as a cage that locks the fuel storage modules into a desired position and/or orientation while still permitting access to one or more connectors or ports of the fuel storage modules.

In some cases, the plurality of fuel storage modules 20 may be loaded into a plurality of different loading frames 75. In some cases, one or more loading frames may be configured to receive a plurality of fuel storage modules having different sizes and/or shapes. The loading frames 75 may comprise a rack configured to arrange the plurality of fuel storage modules in a plurality of predetermined positions and/or orientations such that the loading frames and the fuel storage modules 20 fit into an inner volume of the vehicle. The plurality of predetermined positions and/or orientations may be configured such that the fuel storage modules 20 may be easily connected to existing systems or subsystems of the vehicle (e.g., a fuel cell system or a propulsion system of the vehicle). The loading frames 75 may be configured to fit into various vehicles or various regions within the vehicles in a conformable way.

Figure 4F:
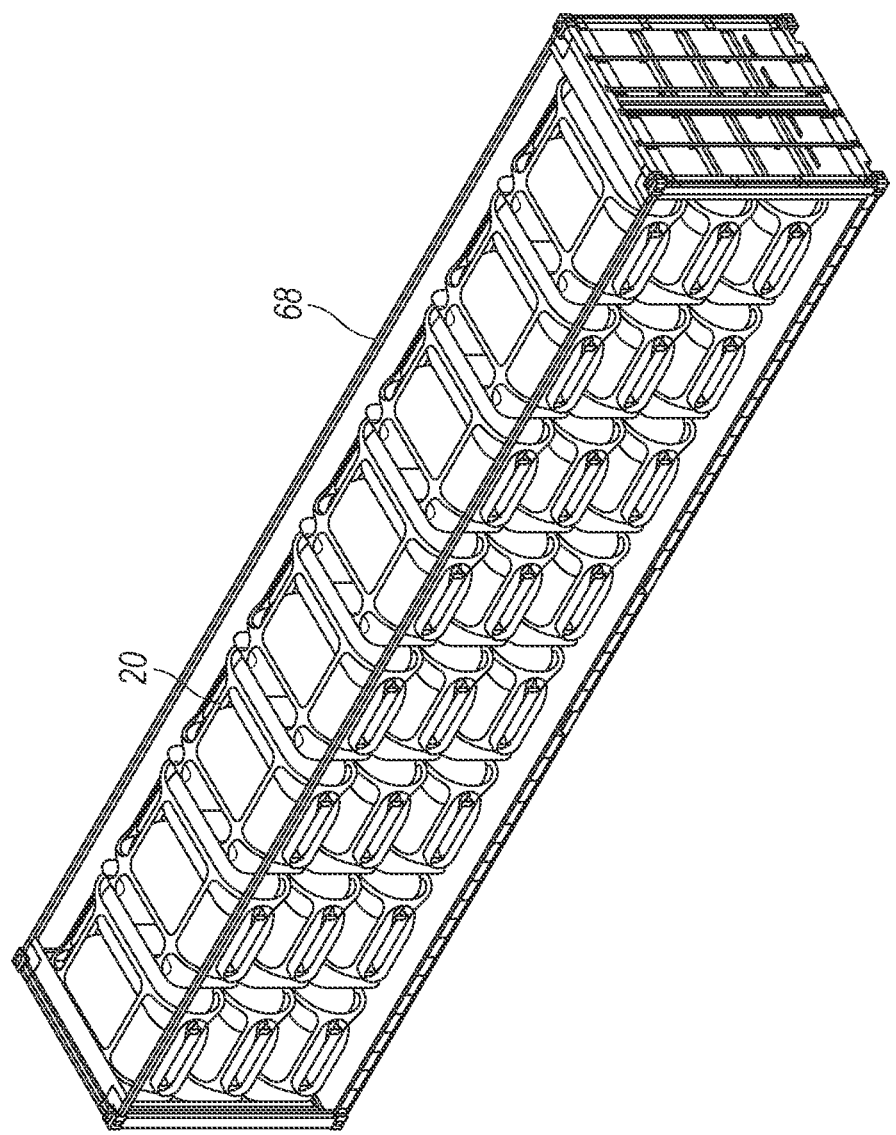
FIG. 4F is an isometric view of a plurality of fuel storage modules in a shipping container without using the loading frames.

The loading frames 75 and the plurality of fuel storage modules 20 therein may be configured to fit into various vehicles or various structural components of the vehicles in a conformable way depending on a desired purpose or a required function (e.g., for transportation and/or for loading into the vehicles for consumption). For example, FIG. 4E shows a plurality of the loading frames 75 and associated fuel storage modules 20 positioned in a shipping container 68. In other embodiments, the fuel storage modules can be arranged in the shipping container 68 without using the loading frames, as shown in FIG. 4F. The loading frames 75 may be sized, shaped, and/or configured to permit transportation and loading of the plurality of fuel storage modules 20 in a form factor consistent or compatible with the transportation vehicles or the hydrogen fuel compatible vehicles. The loading frames 75 may be sized, shaped, and/or configured such that they are conformal to direct or position the fuel storage modules 20 for movements into or within the inner volume of a hydrogen fuel compatible vehicle 10 (FIG. 1). The loading frames 75 and the plurality of fuel storage modules 20 may be sized, shaped, and/or configured such that they are conformal with a portion of a transportation vehicle used to store the loading frames and/or the fuel storage modules for transport to one or more vehicle fuel sites.

The loading frames 75 may have a modular structure for flexible insertion, loading, and arrangement of multiple fuel storage modules 20. The loading frames 75 may be configurable and/or reconfigurable to accept and handle different numbers or different types of fuel storage modules 20. The loading frames 75 may be configured to receive the plurality of fuel storage modules 20 in a variety of different positions, orientations, and/or configurations.

In some cases, the loading frames 75 may comprise one or more wheels, rollers, and/or bearings for low friction movement. The loading frames and the one or more fuel storage modules may be configured as a single integrated unit when the one or more fuel storage modules are inserted or loaded into the loading module. The loading frames can be configured to slide or otherwise position the fuel storage modules 20 into a portion of the vehicle (e.g., a fuselage region of the aircraft 10) to facilitate coupling of the fuel storage modules 20 to (i) one or more quick release connectors or (ii) one or more systems or subsystems of the vehicle (e.g., fuel cell system, propulsion system, venting system, etc.).

In some cases, the loading frames 75 and the fuel storage modules 20 may slide through a door of the vehicle and may be pushed in one or more directions (e.g., up, down, left, right, forward, and/or backwards) to secure the fuel storage modules 20 to one or more coupling mechanisms.

The one or more fuel storage modules 20 may be inserted or loaded into a hydrogen fuel compatible vehicle configured to use the hydrogen fuel stored within the fuel storage modules for propulsion or movement. The fuel storage modules 20 may be placed into or on any portion of the vehicle (e.g., a top portion, a bottom portion, a front portion, a rear portion, a wing of the vehicle, or a nacelle of the vehicle). The fuel storage modules 20 may be placed in or on any internal or external portion of the vehicle such that the aerodynamics of the vehicle are not negatively affected or substantially compromised.

The fuel storage modules may be installed or loaded into the vehicle without the use of any tools. Alternatively, the fuel storage modules may be installed or loaded into the vehicle using a minimal number of tools. The fuel storage module may or may not require specialized fixtures, devices, or mechanisms for loading and/or securing the fuel storage modules in the vehicle. The fuel storage modules may be installed or loaded into the vehicle within a set amount of time. The set amount of time may be at most about 1 hour, 30 minutes, 20 minutes, 10 minutes, 5 minutes, 1 minute, or less. The fuel storage modules may be interchangeable after the hydrogen fuel stored within the fuel storage modules is used or spent.

Figure 5A:
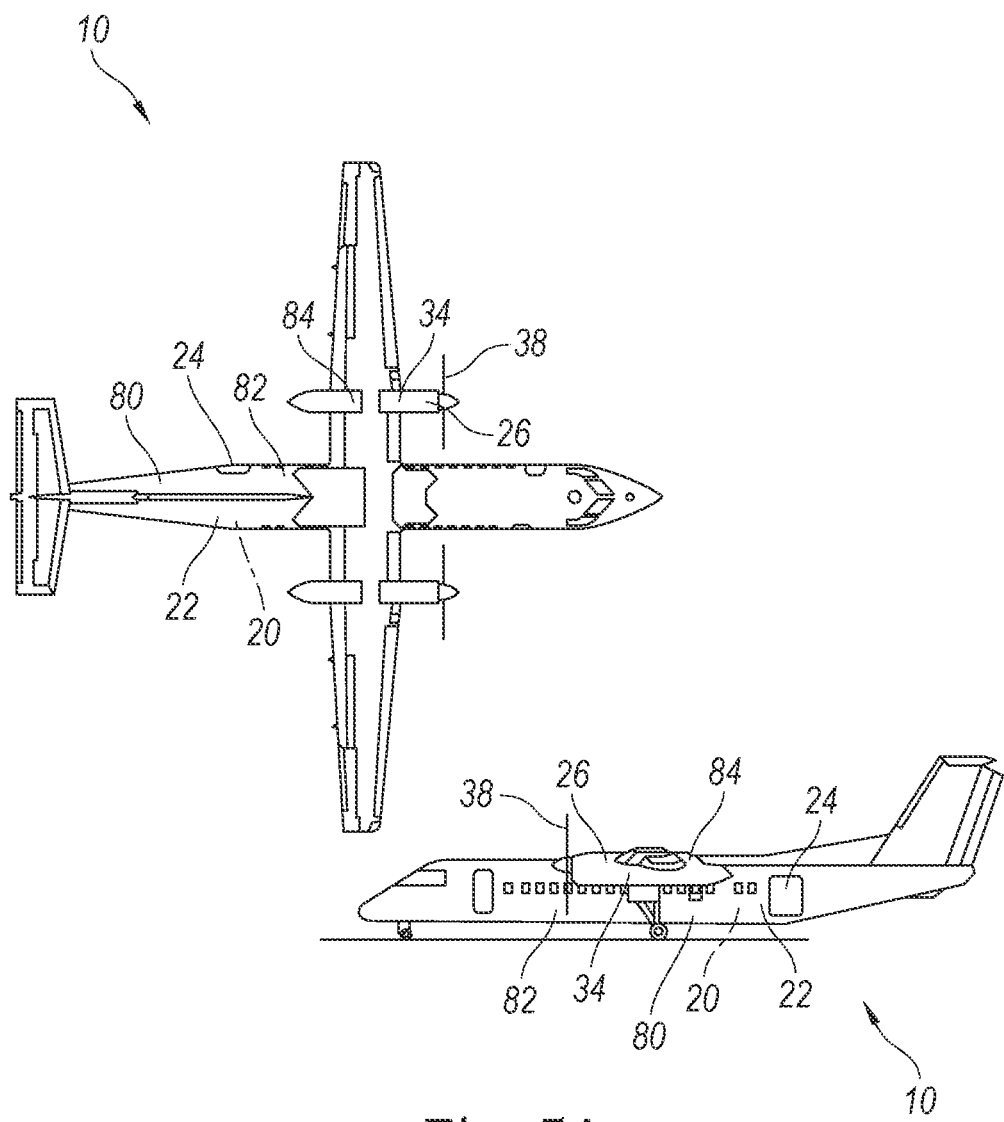
FIG. 5A schematically illustrates an example of an aircraft that may be retrofitted for carbon-free transportation, in accordance with some embodiments.
Figure 5B:
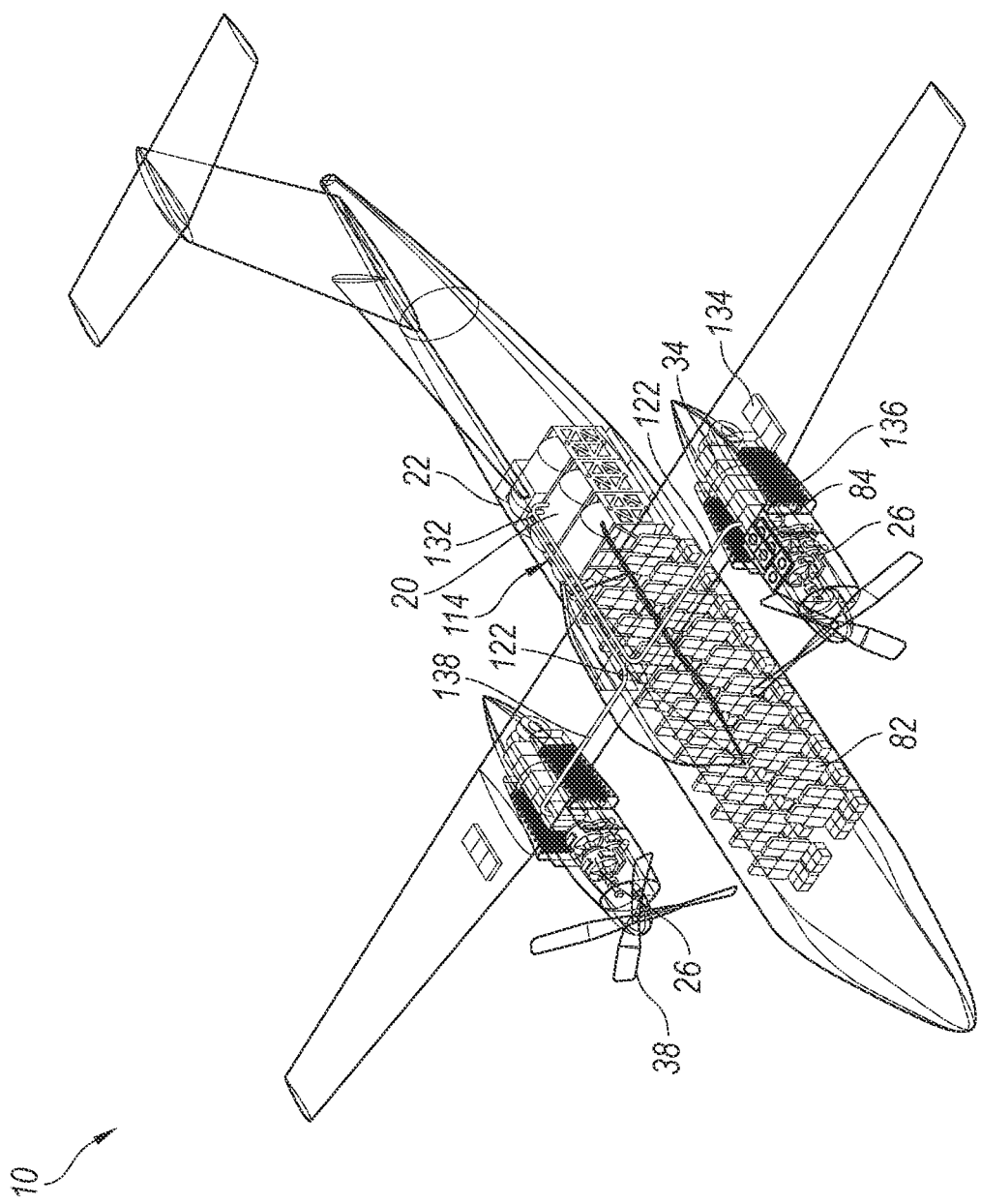
FIG. 5B is a partially transparent schematic view of the aircraft configured for use with the hydrogen fuel storage modules in accordance with embodiments of the present technology.

FIG. 5A illustrates an example of an aircraft 10, such as an aircraft that may be retrofitted to accommodate one or more hydrogen fuel storage modules 20 and one or more fuel cells 34 that may be used with the one or more hydrogen fuel storage modules 20. FIG. 5B is a partially transparent schematic view of the aircraft 10 configured for use with the hydrogen fuel storage modules 20. The one or more hydrogen fuel storage modules 20 and/or the one or more fuel cells 34 may be placed in the fuel module storage area 22, on or near various locations on the aircraft (e.g. fuel storage area or cavity, cargo hold, tail, wings, bottom of fuselage, nacelle, internal cabin, etc.). The one or more hydrogen fuel storage modules 20 and/or the one or more fuel cells 34 may be placed on a top portion, a bottom portion, a front portion, a back portion, and/or one or more side portions of the aircraft 10. In some cases, the one or more hydrogen fuel storage modules 20 and/or the one or more hydrogen fuel cells 34 may be housed within a nacelle region, a wing region, or a cabin region of the aircraft 10. The one or more hydrogen fuel storage modules 20 and/or the one or more hydrogen fuel cells 34 may be placed in any portion of the aircraft 300 not designed to carry one or more passengers or flight crew members.

In the embodiment illustrated in FIG. 5B, the fuel storage modules 20 are loaded into and securely retained in the aircraft's fuselage 80 within a fuel module storage area 22 aft of the passenger cabin 82. The fuel module storage area 22 is configured to securely retain and align the fuel storage modules 20 with connection points to the aircraft's fuel cell system 84. In some cases, the vehicle (e.g., the aircraft 300) may comprise a cabin or housing, such as the fuselage 80, that may include one or more internal cavities or storage areas, such as the fuel module storage area 22. A fuel cell system 84 comprising one or more fuel cells 34 and one or more fuel storage modules 20 may be provided or located within the storage area of the fuselage 80. The fuel cell system 84 may be provided on the vehicle and may be used to power the vehicle. The fuel storage modules 20 may be operatively connected to the fuel cells 34 via a single pipe, a plurality of pipes, or a manifold system 132 (FIG. 5B) in fluid communication with the fuel cells 34.

The fuel cell system 84 and/or the hydrogen storage modules 20 may be placed within the housing of the aircraft 10 or other vehicle. The fuel cell system 84 and/or the hydrogen fuel storage modules 20 may be within one or more internal cavities of the housing. The vehicle may include a central body comprising the cavity. The fuel cell system and/or the hydrogen storage modules 20 may be within the central body of the vehicle.

Figure 6A:
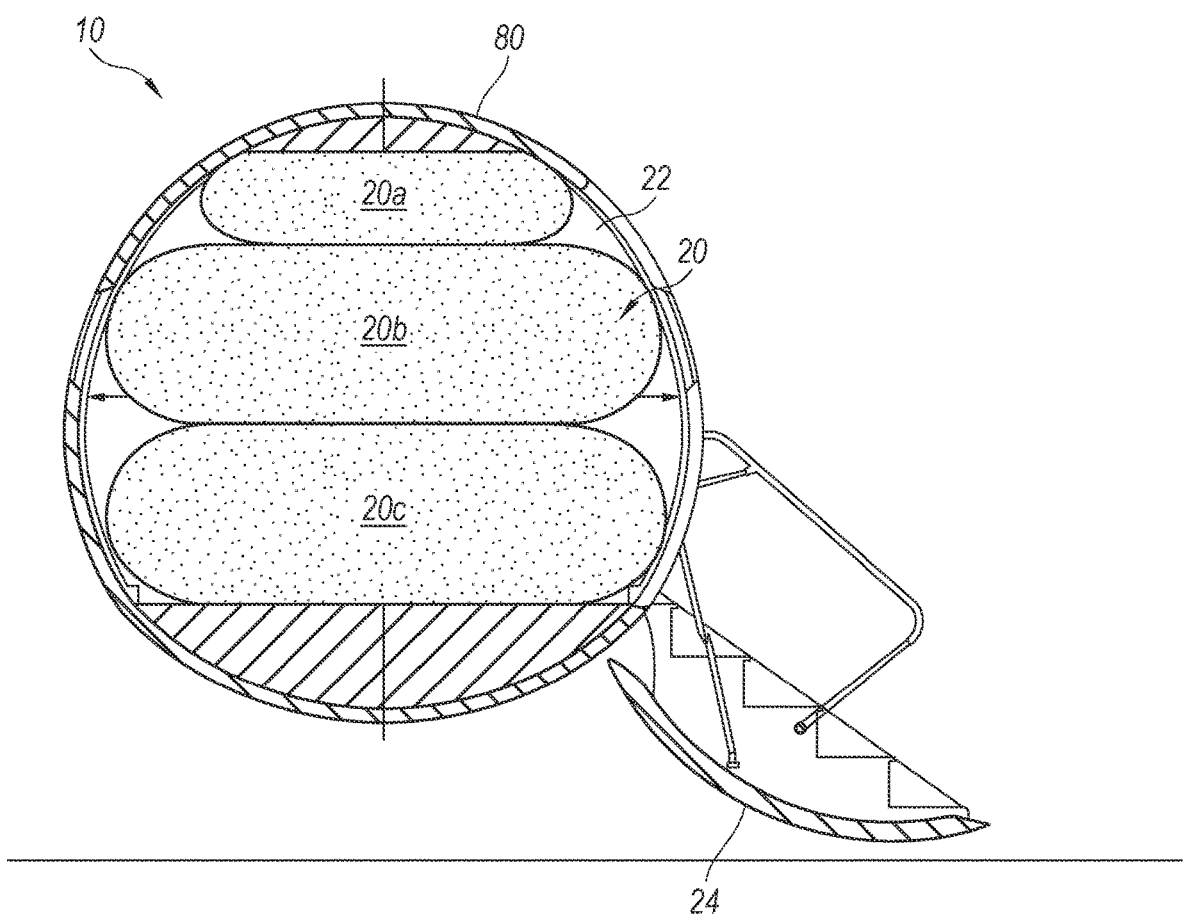

FIG. 6A illustrates an inner volume of the aircraft 10 that may be configured to receive one or more fuel storage modules 20. The one or more fuel storage modules 20 may be loaded into a fuel module storage area 22 within the inner volume of the fuselage 80 of the aircraft 10, such as behind the passenger cabin 82 (FIG. 5B), and slightly behind the center of gravity of the aircraft 10 when loaded. In some non-limiting examples, the fuel module storage area 22 of the aircraft's inner volume 22 may be configured to receive a plurality of fuel storage modules 20a, 20b, 20c. Some of the fuel storage modules 20b and 20c may be of a same size and/or shape. Some of the fuel storage modules 20a and 20b may be of different sizes and/or shapes. The fuel storage modules 20a, 20b, 20c may be sized and/or shaped so as to fit inside the inner volume in a conformal manner. The fuel storage modules 20a, 20b, 20c may be sized and/or shaped to maximize an amount of space occupied within the module storage area 22 within inner volume. In some cases, the fuel storage modules 20a, 20b, 20c may be stacked on top of each other. However, any other suitable packing configuration may be used to load the fuel storage modules 20a, 20b, 20c into the inner volume.

Figure 6B:
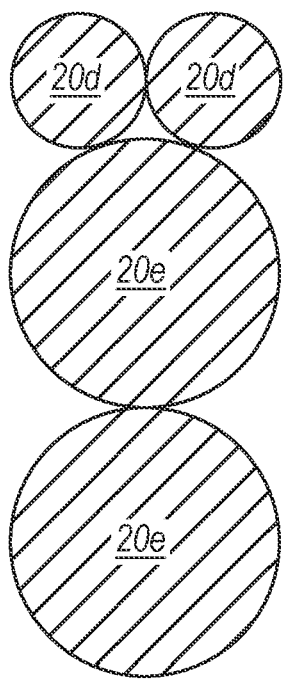
Figure 6C:
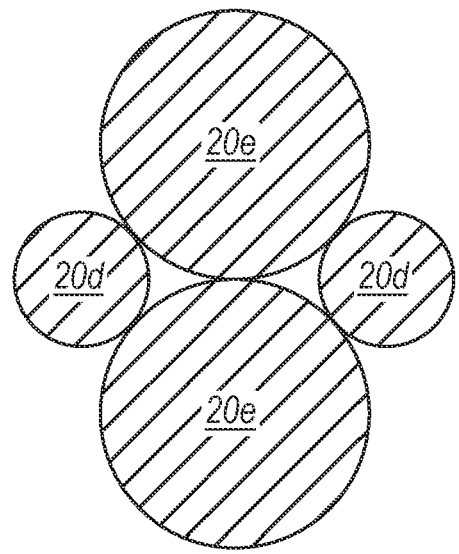
Figure 6D:
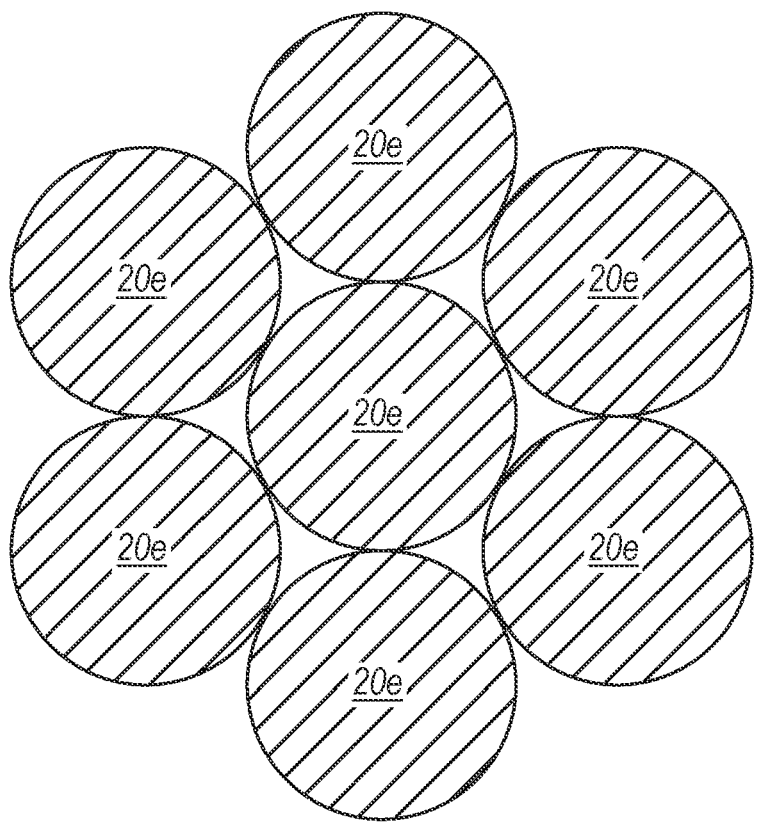
Figure 6E:
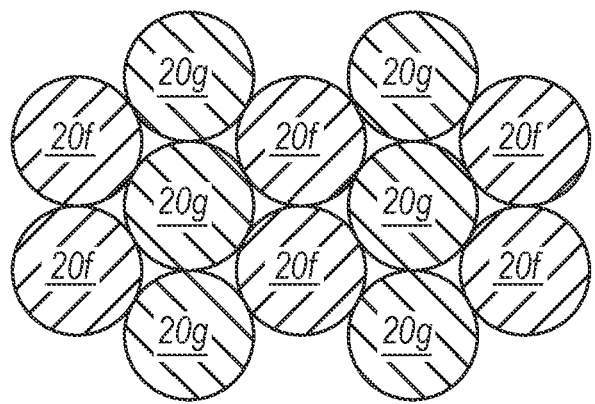
Figure 6F:
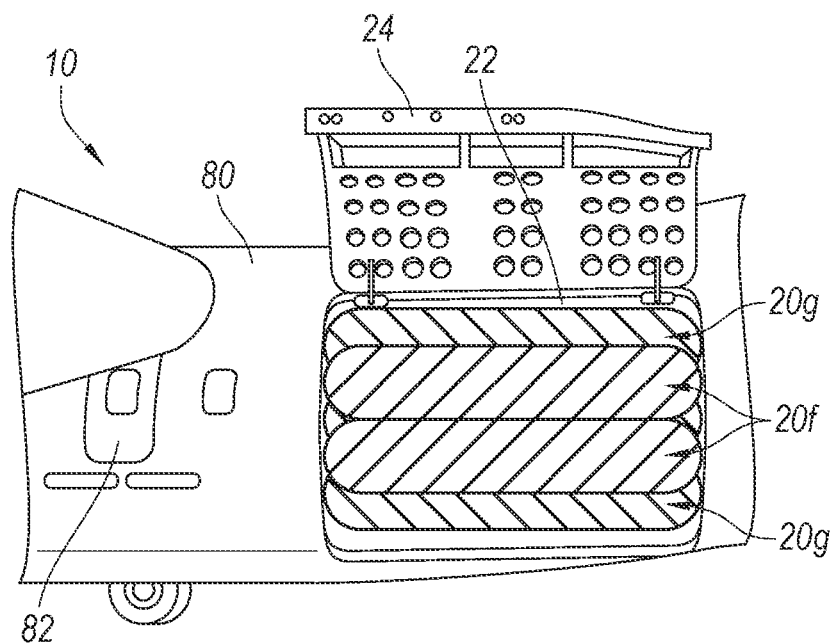

FIG. 6B illustrates another example of a possible packing configuration for a plurality of fuel storage modules. In some instances, a plurality of smaller fuel storage modules 20d may be stacked on top of a plurality of larger fuel storage modules 20e. As shown in FIG. 6C, in some instances, the plurality of larger fuel storage modules 20e may be stacked on top of each other, and the plurality of smaller fuel storage modules 20*d* may be placed in or near the gaps or spaces between the larger fuel storage modules 20*e*. Alternatively, as shown in FIG. 6D, in some cases, a plurality of fuel storage modules 20*e* may be arranged in a hexagonal packing configuration. In some cases, a plurality of smaller fuel storage modules 20*d* may be placed in or near the gaps or spaces between the larger fuel storage modules 20*e*. FIG. 6E illustrates another example of a packing configuration for a plurality of fuel storage modules 20*f* and 20*g*. As shown in FIG. 6F, the plurality of fuel storage modules 20*f* and 20*g* may be loaded into the fuel module storage area 22 within an inner volume of an aircraft while arranged in the packing configuration shown in FIG. 6E.

Couplings

Figure 7:
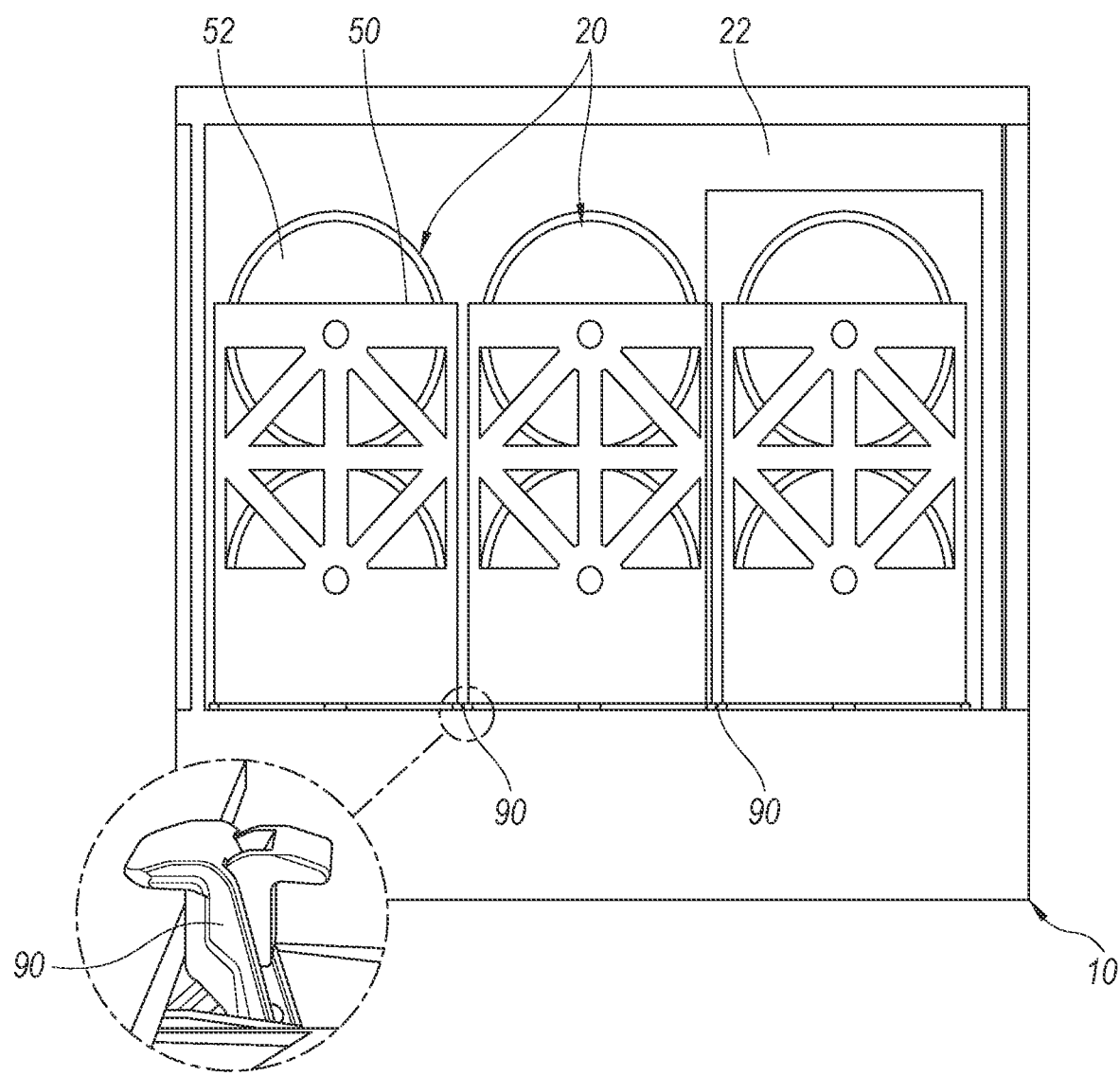
FIG. 7 is an elevation view of fuel storage modules releasably retained in a fuel storage area and releasably retained in place by one or more coupling mechanisms.

The fuel storage modules 20 may be loaded into the aircraft 10 or other vehicle and secured to the vehicle using one or more coupling mechanisms. FIG. 7 is an elevation view of some embodiments wherein the fuel storage modules 20 are releasably retained in selected positions by at coupling mechanism 90 connected to the airframe in the fuel module storage area 22. For example, the coupling mechanisms 90 can be clamp members or other mechanisms attached to anchor rails affixed to the airframe. The clamp members releasably clamp onto lower portions of the truss 50 of a fuel storage module 20 to affix the fuel storage module in a predetermined position within the fuel module storage area 22. Other embodiments can use other coupling mechanisms. The one or more coupling mechanisms 90 may not or need not require a usage of tools to load and/or secure the fuel storage modules 20 to the aircraft 10 or other vehicle. The one or more coupling mechanisms 90 may be configured to control a spatial disposition of the fuel storage modules 20 relative to the vehicle, the one or more fuel cells in the vehicle, and/or a propulsion system of the vehicle.

In some cases, the fuel storage modules 20 may be affixed or releasably coupled to the loading equipment 28 as described above. The loading equipment may be configured with an adapter (e.g., a rack, frame, holder, mount, cradle, bracket, etc.) to receive and arrange one or more fuel storage modules in a predetermined configuration. In such cases, the loading equipment may be configured to position the fuel storage modules into the vehicle (e.g., the aircraft 10) be releasably coupled to one or more structural components of the vehicle using the one or more coupling mechanisms.

The one or more coupling mechanisms may comprise a permanent coupling or a releasable coupling. In some instances, the fuel storage modules may be coupled to one or more structural components of the vehicle using adhesives, bonding, welding, fasteners (e.g., screws, nuts, bolts, pins), interference fits, snap fits, and the like. The coupling mechanisms may fix the fuel storage modules in a predetermined position and/or orientation relative to the vehicle, the fuel cells of the vehicle, or the propulsion system of the vehicle.

The coupling mechanisms may be configured to prevent inadvertent decoupling and may constrain a movement (e.g., a translation and/or a rotation) of the fuel storage modules when the vehicle is moving. In some embodiments, the coupling mechanism can be adapted to reduce or prevent certain movements of the fuel storage modules and/or the loading module containing the fuel storage modules. For example, the coupling mechanism may comprise one or more stabilizing elements (e.g., dampers) for reducing or eliminating unwanted motions (e.g., shaking and/or vibrations) of the fuel storage modules and/or the loading module containing the fuel storage modules while the vehicle is in motion.

The fuel storage modules 20 can be removably attached to the vehicle using the one or more coupling mechanisms. The coupling mechanisms may comprise, for example, snap-fits, fasteners, clamps, brackets, cradles, frames, interlocking elements, mating elements, ropes, suction cups, and the like. The coupling mechanisms described herein may comprise a quick release coupling mechanism. A quick release coupling mechanism may enable a user to rapidly mechanically couple and/or decouple a plurality of components with a short sequence of simple motions (e.g., rotating or twisting motions; sliding motions; pulling a lever; depressing a button, switch, or plunger; etc.). For example, a quick release coupling mechanism may require no more than one, two, three, or four motions to perform a coupling and/or decoupling action. In some instances, a quick release coupling mechanism can be coupled and/or decoupled manually by a user without the use of tools.

Interfacing/Connectivity

The fuel storage modules 20 may be configured to interface with a propulsion system of the vehicle and/or one or more fuel cells of the vehicle. In some cases, the propulsion system may comprise a hydrogen electric propulsion system. In other cases, the propulsion system may comprise a jet engine or any type of internal combustion engine for burning the hydrogen fuel, as described elsewhere herein. The fuel storage modules may be configured to provide hydrogen fuel to one or more components of the propulsion system of the vehicle.

In some cases, the fuel storage modules 20 may be configured to provide hydrogen fuel to one or more fuel cells 34. The fuel storage modules 20 may have one or more fuel outputs. The fuel outputs may transfer the fuel to another part of the vehicle, such as a fuel cell 34. In one example, the hydrogen fuel stored within the fuel storage modules may be output to the fuel cells to mix with another fuel such as air or oxygen. Electricity generated by the fuel cells using the hydrogen fuel may be used to move or propel the vehicle.

The fuel storage modules 20 may be configured to interface with one or more fuel cells 34 via a plumbing system such that the fuel storage modules 20 and the one or more fuel cells 34 are in fluid communication. The plumbing system may comprise one or more pipes configured to facilitate a flow of the hydrogen fuel to one or more fuel cells 34. The fuel cells 34 may be provided in an internal portion of the vehicle. In some cases, as shown in FIG. 5B, the internal portion may be a nacelle of the vehicle.

The fuel storage modules 20 may be operatively coupled to a plumbing system configured to distribute the hydrogen to the one or more fuel cells. The plumbing system and/or the fuel storage modules may comprise one or more pressure or flow regulators to control an amount of hydrogen distributed to the fuel cells or propulsion system. In some cases, the pressure or flow regulators may be configured to control a rate of distribution of hydrogen fuel to the fuel cells or the propulsion system. The hydrogen may be distributed to the one or more fuel cells as a gas.

Figure 8:
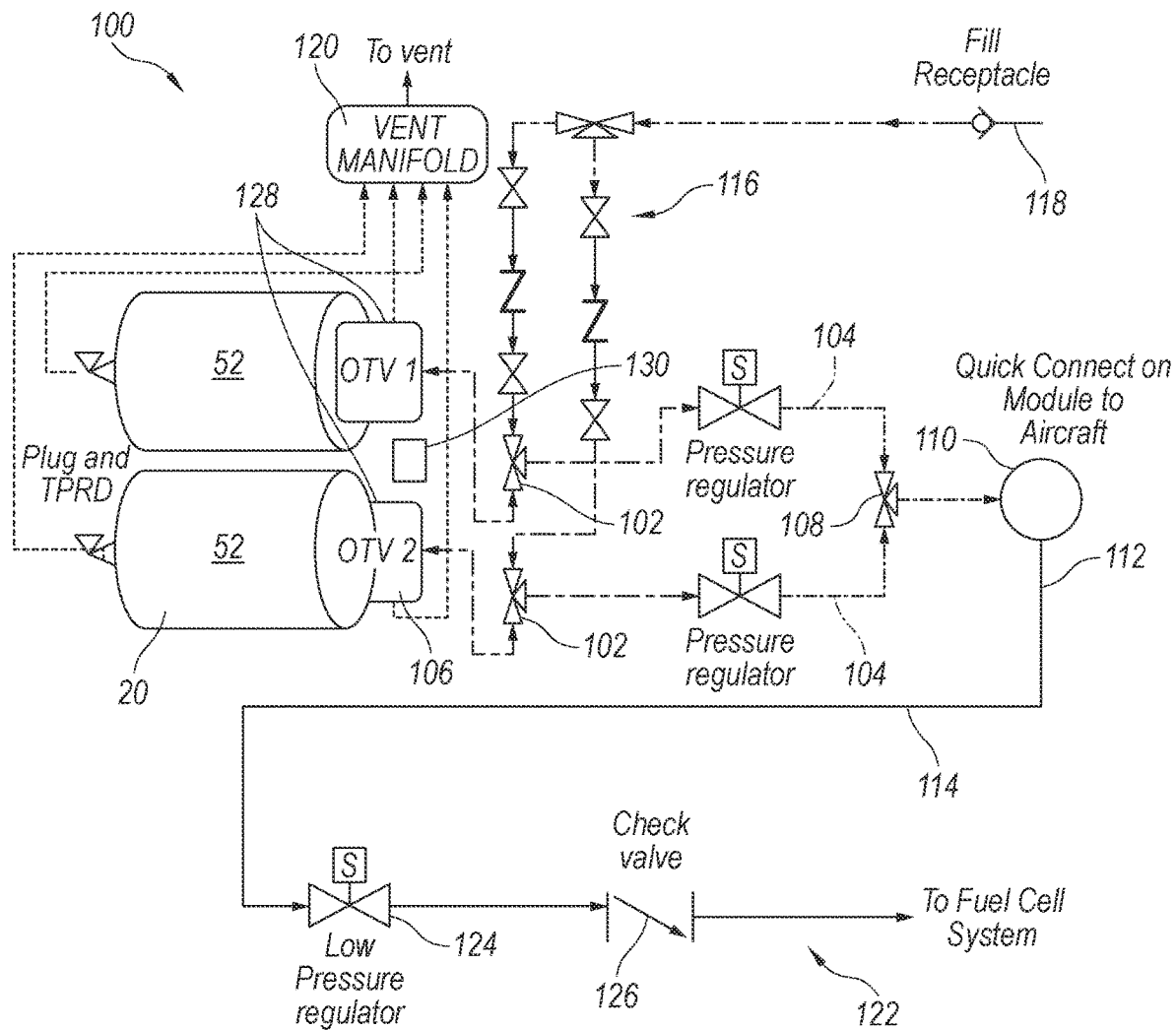
FIG. 8 is a schematic image of a fuel interface system that operatively couples the capsules of the fuel storage modules to a hydrogen fuel system of the vehicle.

FIG. 8 is a schematic image of a fuel interface system 100 that operatively couples the capsules 52 of the fuel storage modules 20 to a hydrogen fuel system and power plants of the aircraft 10 (FIG. 1) or other vehicle. The fuel interface system 100 of the illustrated embodiment includes one or more flow valves 102 and pressure regulators 104 connected to a hydrogen flow fitting 106 on a respective capsule 52, such as on a closure assembly as discussed in greater detail below. The flow valves 102 and pressure regulators 104 control the flow of hydrogen fuel from the respective capsule 52. Each pressure regulator 104 is connected to a downstream valve 108 that is in turn connected to a quick connect nozzle or fitting 110 that releasably connects to a mating quick connect fitting 112 of the fuel lines 114 of the vehicle's hydrogen fuel delivery system. In the illustrated embodiment, the flow valves 102 are also coupled to input valves 116 and a fill receptacle 118 configured to receive hydrogen fuel when filling the capsule 52 at, for example, the hydrogen production facility 180 (FIG. 2B) discussed above. The fuel interface system 100 also includes a vent manifold 120 coupled to the capsules 52 to vent the system during hydrogen flow into or out of the capsule 52.

The fuel storage modules may be configured to interface with the fuel delivery system 122 of the vehicle. The fuel delivery system 122 may comprise one or more pipes or fuel lines defining a flow path for the fuel from the fuel storage modules to the one or more fuel cells. The pipes may comprise a main fuel pipe and/or and a plurality of distribution pipes. Each distribution pipe may be connected to a corresponding fuel module. For instance, a first distribution pipe may be connected to a first fuel module so that a first fuel from the first fuel module may flow along the first distribution pipe. Similarly, a second distribution pipe may be connected to a second fuel module so that a second fuel from the second fuel module may flow along the second distribution pipe. Likewise, a third distribution pipe may be connected to a third fuel module so that a third fuel from the third fuel module may flow along the third distribution pipe. The first fuel, the second fuel, and/or the third fuel may comprise hydrogen. In some cases, three or more distribution pipes may be used to direct the hydrogen from the plurality of fuel storage modules to the fuel cells. The distribution pipes may be connected to the main fuel pipe which is directly connected to the fuel cells. In some alternate embodiments, the fuel modules may each individually connect to a main fuel pipe without requiring separate distribution pipes. Each of the fuel modules may be put into selective fluid communication with one or more fuel cells. This communication may be facilitated using one or more shared pipe, separate pipes, or any combination thereof. The plurality of pipes may be provided in the form of gas pipes, air ducts, hoses, tubes, etc. The pipes may be formed from a flexible or rigid material. The pipes may be made of an appropriate plastic or metal material chemically resistant to the fuel. The pipes may enable laminar flow of fuel through the pipes.

In the embodiment illustrated in FIG. 8, the fuel lines 114 of the vehicle's hydrogen fuel delivery system 122 downstream of the quick connect fitting 112 are coupled to a low pressure regulator 124 and a check valve 126 located upstream from the hydrogen fuel cell system 32 discussed above. The fuel interface system 100 of the illustrated embodiment is an example of only one configuration that can be used. Other embodiments can include a fuel interface system 100 with different components and/or layouts.

Figure 9:
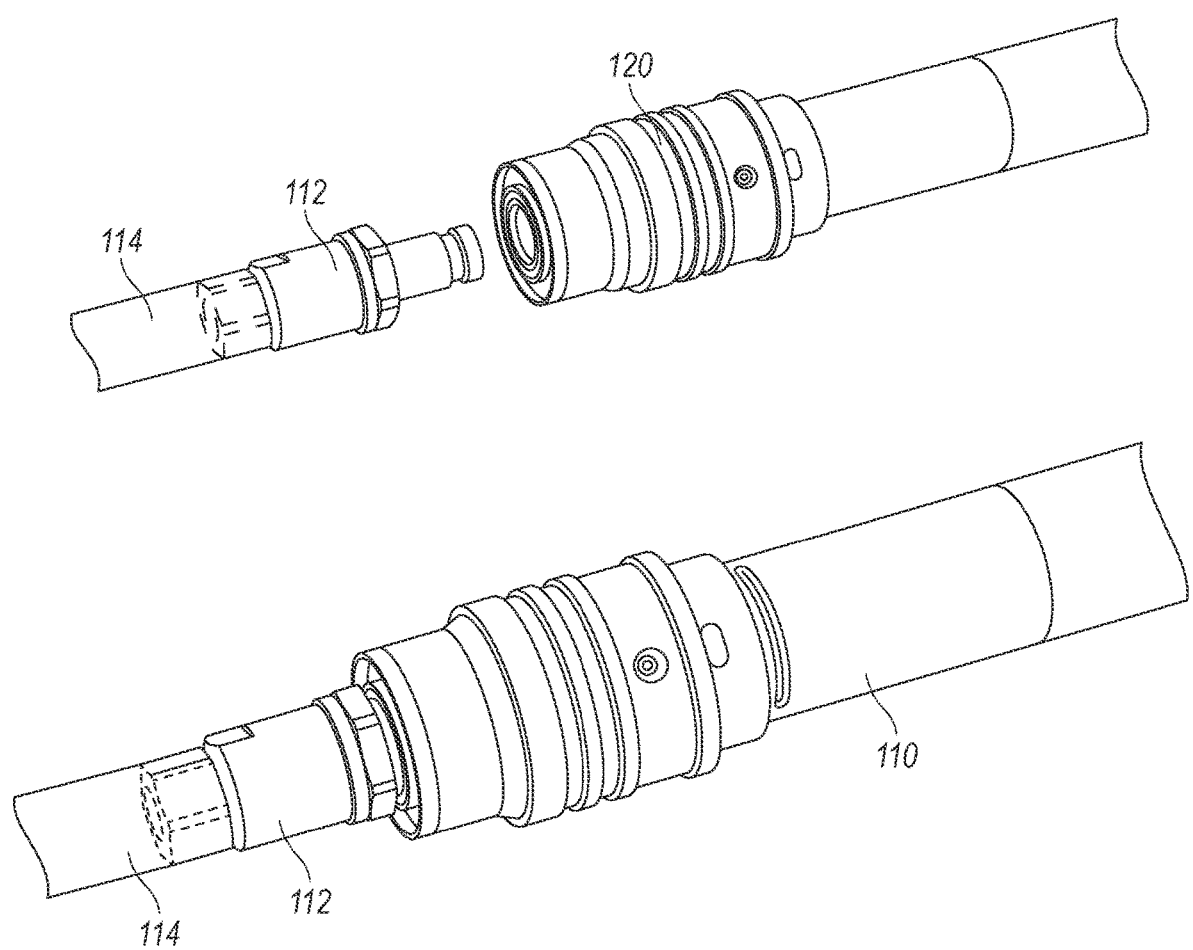
FIG. 9 illustrates quick connect fittings of the fuel interface system and the hydrogen fuel system of the vehicle in accordance with some embodiments.

FIG. 9 illustrates quick connect fittings 110 and 112 that may be used in accordance with some embodiments. The quick connect fitting 110 of the capsule 52 is a female connection coupled to a flexible hose or fuel line connected to the downstream valve 158. The quick connect fitting 112 of the vehicle's hydrogen fuel delivery system 122 is a male fitting configured to releasably plug into the female quick connect fitting 110 to provide a fully sealed interface that substantially prevent hydrogen leakage at the connection between the quick connect fittings 110 and 112. While the male fitting 110 is on the capsule side and the female fitting 112 is on the vehicle fuel system side, the connections can be switched in other embodiments so the male fitting 110 in on the vehicle fuel system side and the female fitting 112 is on the fuel storage module side. Other embodiments can provide a quick connect configuration with other fittings. Further, some embodiments are configured for manual connection and disconnection between the male and female fittings 112 and 110. Other embodiments can be configured for an automated connection and disconnection process. Similarly, the fill receptacle 118 of the fuel interface system 100 of the interface can also have a quick connect system, such a male or female fitting, for engaging a mating component at the hydrogen production facility for filling or re-filling of the capsules 52 of the fuel storage modules 20.

The fuel modules 20 may remain in fluid communication with the distribution pipes and/or any other pipe. Alternatively, they may be in selective fluid communication with the pipes. The fuel modules may be brought in and out of fluid communication with the pipes. For instance, a valve may control a flow of fuel between the modules and the distribution pipe. In some embodiments, each fuel module may have a corresponding valve that may allow control of whether each individual fuel module is in fluid communication with a pipe. The valves may be independently controlled, which may allow fuel modules to independently be brought into or out of fluid communication with one or more pipes. In some cases, a controller may be used to selectively control which fuel modules are used to deliver hydrogen fuel to the propulsion system of the vehicle.

In some embodiments, a flow regulator may be provided along the main fuel pipe. For instance, the flow regulator may be provided between the fuel storage modules and the fuel cells. A control module 128 may be configured to control an operation of the flow regulator to control the flow of the fuel from the fuel storage modules to the fuel cells. For instance, the control module 128 may control an on/off state of the flow of the fuel through the pipes. The control module may also control and regulate a flow rate and/or a flow pressure of the fuel through the pipes. The control module may control a flow rate and/or flow pressure of the fuel along a continuous spectrum, or at one or more predefined fuel flow levels. The control module may comprise a controller configured to control a plurality of gas flow control valves to control the flow of the hydrogen fuel to the fuel cell. The control module may provide signals that may control a flow of fuel at any juncture from the fuel modules to the fuel cells. For instance, the control module may control flow from the fuel modules to a distribution pipe or other type of pipe, or from a distribution pipe to a main pipe, or along a main pipe, or between a main pipe and a fuel cell. The control module may control flow of fuel, which may affect a direction of fuel flow. For instance, when one or more fuel cells are being used to produce electricity, the control module may control one or more valves or flow regulators to control an amount or a rate of fuel flowing from the fuel modules to one or more pipes (e.g., distribution pipe to main pipe) to the fuel cells.

In some instances, a flow of hydrogen between the fuel storage modules and the fuel cells may be controlled using a gas flow control valve. The gas flow control valve may have a binary open and closed position. Alternatively, a gas flow control valve may be a proportional valve that may control the flow rate of the gas that flows between the fuel storage modules and the fuel cells. For example, a proportional valve may have a wide open configuration that may permit a greater rate of flow than a partially open configuration that may permit a lesser rate of flow. Optionally, regulating, throttling, metering or needle valves may be used. Return or non-return valves may be used. A valve may have any number of ports. For example, a two-port valve may be used. Alternatively, a three-port, four-port or other type of valve may be used in alternative configurations. Any description herein of valves may apply to any other type of flow control mechanism. The flow control mechanisms may be any type of binary flow control mechanism (e.g., containing only an open and closed position) or variable flow control mechanism (e.g., which may include various degrees of open and closed positions). The flow control mechanisms may comprise, for example, check valves, shutoff valves, solenoid valves, bleed valves, relief valves, pressure regulating valves, regulators, bypass valves, filters, and/or additional flow components. In some cases, a flow of hydrogen between the fuel storage modules and the fuel cells may be controlled using one or more one or more electronically-controlled shutoff valves, such as solenoid valves.

In some cases, the flow control mechanisms may comprise one or more regulators. The one or more regulators may be a pressure regulator, a mass flow controller, or any other flow control components known in the art. For example, the regulator can comprise a restricting element (e.g., a valve that can provide a variable restriction to the flow, such as a globe valve, butterfly valve, poppet valve, etc.), a loading element (e.g., a part that can apply force/loading to the restricting element, such as, for example, a weight, a spring, a piston actuator, a diaphragm actuator in combination with a spring, a pneumatic actuator, an electronically controlled actuator or motor, etc.), and a measuring element (e.g., diaphragm, mass flow meter, pressure sensor, temperature sensor, etc.).

One or more actuators may be used to control the flow control mechanisms. The actuators may be in fluid communication with at least one fuel path (also referred to herein as a "fuel flow path" or "fluid flow path") configured to deliver hydrogen fuel to and/or from the fuel storage modules. The actuator may be in fluid communication with the fuel path(s) at the point(s) of actuation and/or at other location(s). The actuator may be in fluid communication with the fuel path(s) in order to sense a fuel flow parameter (e.g., a flow rate). For example, the actuator may be a mechanical spring actuated by fuel pressure (e.g., thereby opening or closing a bypass valve). Other mechanical actuation configurations may include, for example, gears or translation stages, pneumatic actuation (e.g., fuel pressure force may compress a hydraulic fluid that actuates a bypass valve, magnetic actuation (e.g., fuel pressure force may move a magnetic component in proximity of a mating magnetic component until the components experience a sufficient magnetic attraction force to engage mechanically, thereby opening or closing a valve), etc. In some cases, the actuator may be operatively coupled to a sensor, such as, for example, a pressure sensor. In some cases, the actuator may not be operatively coupled to a sensor but may sense the parameter implicitly (e.g., a spring loading may change as a result of changing fuel pressure force).

Sensors 130 may be integrated with the fuel delivery system. In some cases, such sensors 130 may communicate with one or more flow control mechanisms, actuators, or control units (e.g., a processor, a controller, or an electronic control unit (ECU)). In some cases, individual valves and/or flow control components may be electronically controlled by the control unit (e.g., automatically controlled or user-controlled). In some cases, individual valves and/or flow control components may be electronically controlled through the control unit as well as mechanically controlled (e.g., automatically controlled or user-controlled).

In some cases, one or more pressure transducers, pressure gauges, thermocouples, or other sensors may be deployed along a plurality of fluid flow paths between the fuel storage modules and the fuel cells. In some cases, a control unit may receive temperature, pressure and/or other sensor data and may provide a signal to the one or more solenoid valves to open or close to control (e.g., close or open) appropriate fuel paths. Further, a status and/or a configuration of the fuel paths may be displayed to an operator of the vehicle. Further, the control unit may display other system parameters (e.g., fuel level, remaining range, fault conditions, etc.) which may be relevant to the fuel paths. The control unit may communicate with various components of the fuel delivery system. Data, control signals and/or parameters resulting from such communications may be used for controlling the fuel flow paths, and vice versa. For example, a fault condition or a signal received from the fuel delivery system may be used to decide which fuel flow paths or fuel storage modules to use.

The control unit 128 may be in communication with one or more sensors 130. The sensors 130 may be a pressure sensor, temperature sensor, accelerometer, optical sensor, shock sensor, damage sensor, acoustic sensor, or any other type of sensor. Examples of types of pressure sensors may include a piezoresistive strain gauge, capacitive pressure sensor, electromagnetic pressure sensor, piezoelectric pressure sensor, optical pressure sensor, potentiometric pressure sensor, resonant pressure sensor, thermal pressure sensor, and/or ionization pressure sensor. In some embodiments, a transducer may be provided (e.g., for pressure and temperature) that may provide an electronic signal to the control unit. In some embodiments, a plurality of sensors may be in communication with the control unit. The plurality of sensors may be the same type of sensors, or may include different types of sensors. For example, one or more temperature sensors and one or more pressure sensors may be in communication with the control unit. In some embodiments, a temperature sensor and/or pressure sensor may be capable of detecting or measuring ambient conditions or the temperature and/or pressure of the hydrogen fuel stored within the fuel storage modules.

Prior to providing the hydrogen gas to the fuel cells, all of the gas flow control valves may be closed. The fuel storage modules may contain the hydrogen gas therein, which may be prevented from flowing to the fuel cells by the closed gas flow control valves. A signal may be provided from the controller to each gas flow control valve that may cause the gas flow control valve to open. In some instances, signals to open the gas flow control valves may be provided when the vehicle is about to take flight. The signals may also be generated when one or more propulsion units of the vehicle are to be powered, and/or when other non-propulsion components of the vehicle are to be powered. When the gas flow control valves are opened, the hydrogen gas may flow from the fuel storage modules to the fuel cells so that electricity can be generated to power the vehicle. The hydrogen gas may be rapidly provided to the fuel cell. In some instances, the hydrogen gas from the gas bag may reach the fuel cell within 0.01 seconds, 0.05 seconds, 0.1 seconds, 0.2 seconds, 0.3 seconds, 0.4 seconds, 0.5 seconds, 0.6 seconds, 0.7 seconds, 0.8 seconds, 0.9 seconds, 1 second, 1.2 seconds, 1.5 seconds, 2 seconds, 3 seconds, or 5 seconds. The amount, flow rate and/or pressure of the hydrogen gas to the fuel cells may be controlled using the controller to control one or more of the gas flow control valves.

Fuel Cell

As described above, the hydrogen fuel compatible vehicles may comprise one or more fuel cells 34. In some cases, the hydrogen fuel compatible vehicles may comprise a propulsion system that comprises or is operatively coupled to one or more fuel cells. The one or more fuel cells may be configured to use hydrogen and air to generate electricity. The fuel cells may also produce byproducts such as thermal energy and/or water. In some cases, the water may comprise water vapor. For example, the fuel cells 34 of the aircraft 10 discussed above in connection with FIG. 5B utilize a plurality of fuel cell stacks of the type manufactured by Plug Power, Inc. The fuel cell 34 may receive hydrogen gas from the fuel storage modules 20 via the plumbing or manifold system 132 connected to the capsules 52 containing the hydrogen fuel. The fuel cell 34 may have an air intake for receiving air. The fuel cells 34 may be placed in or near a structural component of the aircraft 10 or other vehicle configured to receive enhanced air flow (e.g., due to a location or a shape of the structural component). The fuel cell 34 may have a water outlet 134 configured to expel the water generated by the fuel cell 34. In some cases, the fuel cell 34 may comprise a heat dissipation system 136 to dissipate heat generated by the operation of the fuel cell.

The fuel cell may be configured to receive a first fuel from the fuel storage modules via one or more pipes or fluid flow paths 138. The first fuel may comprise hydrogen. The fuel cell may be further configured to receive a second fuel. The second fuel may be oxygen provided in a gaseous state or a liquid state. The second fuel may be delivered to the fuel cell via an inlet hole in the fuel cell. In some embodiments, the second fuel may be delivered from the ambient environment to the fuel cell. The second fuel may be delivered via forced airflow through the inlet hole. The ambient air may include oxygen that may be used by the fuel cell as the second fuel.

The fuel cell may be configured to generate electricity, by reacting a first fuel (e.g., hydrogen) with a second fuel through an electrochemical reaction. The first fuel may be hydrogen from the fuel storage container. The second fuel may be oxygen from the ambient air. Alternatively, the second fuel may be provided from another storage module (e.g., an oxygen tank). Electrical contacts may be provided to connect the electrical output of the fuel cell to one or more propulsion systems or units of the vehicle, a power consuming unit of the vehicle, or an energy storage unit of the vehicle (e.g., battery). In some embodiments, a sensor may be electrically connected to the fuel cell, and configured to dynamically detect and record the electrical output of the fuel cell.

In some cases, the fuel cell may be a proton-conducting fuel cell. The fuel cell may comprise a cathode, an anode, and an electrolyte. The fuel cell may be configured to receive a first fuel (e.g., hydrogen gas) and a second fuel (e.g., oxygen gas). The hydrogen gas may be provided from a fuel storage module located on and/or releasably coupled to the vehicle. The oxygen gas may be obtained from air in the ambient environment. The electrolyte may allow positively charged hydrogen ions (or protons) to move between the two sides of the fuel cell. The anode and cathode may contain catalysts that cause the fuel to undergo oxidation reactions that generate positive hydrogen ions and electrons. The hydrogen ions may be drawn through the electrolyte after the reactions. At the same time, electrons may be drawn from the anode to the cathode through an external circuit, producing direct current electricity. At the cathode, hydrogen ions, electrons, and oxygen may react to form water. In some embodiments, to deliver the desired amount of energy, a plurality of fuel cells (e.g., a fuel cell stack) can be combined in series to yield higher voltage, or in parallel to allow a higher current to be supplied. The cell surface area can also be increased in the fuel cell stack, to allow higher current from each cell. A fuel cell may be provided in different designs and configurations, for example, proton exchange membrane fuel cells (PEMFCs), molten carbonate fuel cell (MCFC), phosphoric acid fuel cell (PAFC), solid oxide fuel cell (SOFC), etc.

In some instances, the fuel cell may operate in accordance with a need or demand by the vehicle. For instance, when power consuming units or propulsion systems of the vehicle demand more energy, the fuel cells may work to produce more energy. In such situations, the fuel cell may consume fuels at a faster rate. When less energy demand is provided on-board the vehicle, the fuel cell may produce less energy. For instance, the fuel cell may consume fuels at a slower rate. Alternatively, the fuel cell may consume fuel independently of an energy demand. In some cases, the fuel cells may be operatively coupled to one or more batteries. The one or more batteries may be charged or recharged using the electricity generated by the fuel cells. The batteries may be configured to provide electricity to drive one or more electric motors and/or one or more propellers.

As described above, the fuel cell may be configured to generate electricity using a first fuel and a second fuel. As described above, the first fuel may comprise hydrogen gas ($H_2$) and the second fuel may comprise oxygen gas ($O_2$). The fuel cell may be configured to generate electricity by reacting hydrogen gas from the fuel storage container with oxygen gas through an electrochemical reaction. The oxygen gas may be obtained from air from the ambient environment.

The electrochemical reaction in the fuel cell may generate a byproduct. The byproduct may be a liquid. When the first fuel is hydrogen and the second fuel is oxygen, water may be generated as the byproduct of the electrochemical reaction. The byproduct may be discharged from the fuel cell via a drain vent or outlet in fluid communication with the fuel cell. The byproduct may add to the load of the vehicle if it is not removed from the vehicle. An added load to the vehicle may increase the weight of the vehicle and reduce a range of the vehicle. In some embodiments, the vehicle may be configured to remove the byproduct from the vehicle, to reduce the load and increase flight time of the vehicle. The byproduct may be removed via evaporation using forced convection.

Byproduct Management

In some cases, ventilation may be provided that may aid in the forced convection and/or removal of the byproduct. In cases where the byproduct is a benign byproduct, such as water, the byproduct may be safely dispersed to an environment. Alternatively, the byproduct may be removed by subjecting the byproduct to electrolysis to cause the byproduct to decompose into its elements. The electrolysis of the byproduct may also be used to generate additional fuel for the fuel cell. In some cases, the water byproduct may be used as a coolant.

Heat may be generated by the fuel cell since the electrochemical reaction is usually exothermic. The heat may affect the performance/reliability of the fuel cell, as well as other internal components of the vehicle. In some cases, a venting system may be used for removal of heat from the fuel cell, to regulate the working temperature of the fuel cell, and to improve the performance and/or reliability of the fuel cell. The heat may be removed by applying forced convection to evaporate the byproduct to cool the fuel cell. Ventilation may be provided that may aid in the forced convection and/or removal of the heat. In some cases, the heat may be managed or dissipated using one or more radiators conformal with (i.e., sized and/or shaped to conform to the shape of) the external skin of the vehicle. The one or more radiators may be in thermal communication with the fuel cells or another heat management system integrated into the vehicle.

In some cases, the vehicle may comprise a first venting system. In some cases, the fuel cell and/or the propulsion system of the vehicle may comprise a second venting system in fluid communication with the first venting system. In some cases, the second venting system may be integrated with the first venting system of the vehicle.

In some cases, the venting system of the vehicle may be further configured to dissipate hydrogen fuel inadvertently released (e.g., by leaking) from the fuel cells or the fuel storage modules. In some cases, the venting system of the vehicle may be configured to dissipate hydrogen fuel controllably released from the fuel storage modules to mitigate a burst scenario.

The venting system may be configured to expose the byproduct to forced convection (e.g., forced airflow), so as to remove the byproduct from the vehicle. The venting system may provide fluid communication between the byproduct and an ambient environment around the vehicle. Having the venting system may increase the rate at which the byproduct may be removed.

The venting system may be configured to evaporate and remove the water from the vehicle using forced convection. The water may be exposed to forced convection in the venting system. The forced convection may be generated with aid of one or more propulsion units of the vehicle that generates airflow over the water. The forced convection may alternatively be generated with aid of one or more internal fans or pumps. The forced convection may cause air to flow over the byproduct at a rapid rate. The forced airflow may be within a housing of the vehicle. The direction of the forced airflow may be substantially parallel to a surface of the byproduct. Alternatively, the direction of the forced airflow may be substantially perpendicular to the surface, or at any other angle relative to the surface (e.g., about 15 degrees, 30 degrees, 45 degrees, 60 degrees, or 75 degrees).

The venting system may comprise one or more air inlet holes and one or more air exhaust vents. The air inlet hole and the exhaust vent may be provided on a housing of the vehicle. The airflow may be directed into the venting system through the air inlet hole. In some cases, the one or more propulsion units of the vehicle may include a propeller. The propulsion units of the vehicle may force air from the ambient environment into an inner portion or volume of the vehicle through the air inlet hole. In some embodiments, the air inlet hole may be positioned near the propeller of the vehicle (e.g., within 1%, 3%, 5%, or 10% of the length of the arm of the propeller). Alternatively, the air inlet hole may not or need not be near the propeller of the vehicle. The propulsion units may be configured to force the air to flow into a central cavity of the vehicle where the fuel cell and its byproduct are stored. The byproduct may be evaporated by the airflow and discharged through the air exhaust vent. The air exhaust vent may be located on a central body of the vehicle. The air exhaust vent may be located near an area where the byproduct may collect. The byproduct may be removed from the vehicle to reduce a weight of the vehicle. The weight of the vehicle may be reduced to decrease an amount of power needed to power the vehicle, so as to increase the flight time and range of the vehicle.

In some cases, the fuel cells may be operatively coupled to a heat dissipation system to manage the thermal energy produced by the fuel cells. The fuel cells may be coupled to the heat dissipation system in a conformal way to efficiently dissipate the heat generated by the fuel cells. The excess heat produced by the fuel cells may be reused or recycled. In some cases, the excess heat may be provided to the wings or the empennage of the vehicle to energize one or more boundary layers generated during flight and to facilitate laminar flow across the wings or in the wake. In some cases, the excess heat may be provided to the wings of the vehicle to perform de-icing.

Power Delivery

The electricity generated by the fuel cells may be provided to a propulsion system of the vehicle. In some cases, the propulsion system may comprise one or more electric motors. In some cases, the electricity generated by the fuel cells may be provided to a motor controller configured to control an operation of the one or more electric motors. The one or more electric motors may be installed and/or housed where an engine of a non-retrofit vehicle is typically installed and/or housed. In some cases, the propulsion system may comprise a high-power motor. In some cases, the propulsion system may comprise a gear box. In some cases, the propulsion system may not or need not require a gear box. In some cases, the propulsion system may comprise one, two, or more propellers driven using the electricity generated by the fuel cells.

In some cases, the fuel cell may be operatively coupled to a power delivery system. The power delivery system may be configured to transmit or deliver the electricity or electrical energy generated by the fuel cell to one or more propulsion units of the vehicle. The electricity may be distributed using a kilovolt (kV) power delivery and distribution system. In some cases, the power delivery and distribution system may be configured for less than 270V, 540V, or 1 kV. In some cases, the power delivery and distribution system may be configured for greater than 1 kV.

Refueling and Inspection

The fuel cells of the vehicle may be used to generate electricity until one or more hydrogen fuel storage modules are depleted. Once the hydrogen fuel is expended or partially expended, the fuel storage modules 20 (FIG. 2B) may be collected or removed from the aircraft 10 or other vehicle and refilled. The fuel storage modules 20 may be transported to a refueling site, a hydrogen production facility, and/or another source of hydrogen for refilling. In the illustrated embodiment, the fuel storage modules 20 are transported to the hydrogen production facility 42 for re-fueling. In some cases, the fuel storage module or parts of the module may be refurbished and/or tested before being redeployed on another vehicle or the same vehicle. In some cases, the expended or partially expended hydrogen fuel storage modules may be inspected prior to refueling. In some cases, the expended or partially expended hydrogen fuel storage modules may be inspected before, during, or after flight. In other cases, the expended or partially expended hydrogen fuel storage modules may be inspected before, during, or after installation into the vehicle.

Decoupling

The fuel storage modules 20 may be removed from the vehicle after installation and use. In some cases, the fuel storage modules may be decoupled from one or more portions of the vehicle. Decoupling the fuel storage modules from the vehicle may comprise undoing or disengaging one or more coupling mechanisms initially used to secure or load the fuel storage modules into the vehicle. In some cases, the decoupling may involve disengaging one or more interlocking coupling mechanisms.

In some embodiments, a decoupling mechanism may be used to decouple the fuel storage modules 20. The decoupling mechanism may be, for example, a robotic arm, an actuator, a spring, or a mechanical elevator. The mechanical elevator may affect a horizontal movement to decouple the fuel storage modules from the vehicle. The mechanical elevator may affect a vertical movement to decouple the fuel storage modules from the vehicle. The decoupling mechanism configured to decouple and/or remove the fuel storage modules may comprise an end member adapted to attach to the fuel storage modules to be removed from the vehicle. For example, the end member may be a magnet, a hook, a suction device, or a clamp. The fuel storage modules may be translated without being rotated during decoupling and/or removal. In alternative embodiments, the fuel storage modules may be rotated during removal. In some cases, the decoupling mechanism may be used to affect a vertical, horizontal, circular, or radial movement, or any combination of such movements, to decouple the fuel storage modules from the vehicle.

After the fuel storage modules 20 are decoupled from one or more structural components of the vehicle, the fuel storage modules may be configured to slide out of an inner portion or volume of the vehicle. The fuel storage modules may be transported to a refueling site, a hydrogen production facility, and/or another source of hydrogen for refilling.

Networking

In some cases, the systems and methods disclosed herein may be implemented using a just-in-time system configured to determine a demand for hydrogen fuel at one or more vehicle fueling sites. One or more hydrogen fuel compatible vehicles, such as the aircraft 10 discussed above, may be located in or near the one or more vehicle fueling sites 46 (FIG. 2A). The just-in-time system may be configured to determine a demand for hydrogen fuel based on a number of vehicles at each fueling site, a frequency of operation of such vehicles, and/or a distance travelled by such vehicles during a typical trip or based on historical and predicted future operating patterns.

The just-in-time system may be configured to coordinate a delivery of one or more fuel storage modules to one or more fueling sites based on a time required to transport the fuel storage modules from a hydrogen production facility to the vehicle fueling sites. In some cases, the just-in-time system may be configured to coordinate a delivery of one or more fuel storage modules to one or more fueling sites based on a time of arrival or a time of departure of one or more vehicles located in or near the vehicle fueling sites. In some cases, the just-in-time system may be configured to coordinate a delivery of one or more fuel storage modules to a plurality of different fueling sites to meet a demand for hydrogen fuel at different fueling sites. In some cases, the just-in-time system may be configured to coordinate a delivery of one or more fuel storage modules to a first vehicle fueling site, and may be configured to coordinate a delivery of one or more fuel storage modules to a second vehicle fueling site after one or more vehicles travel from the first vehicle fueling site to the second vehicle fueling site. In some cases, the delivery may be performed in multiple stages (e.g., from a production depot to a regional distribution hub to a fueling location). In some cases, the delivery may be performed using a plurality of different modes of transit. In some cases, the delivery may be planned or coordinated based on factors such as, for example, weather, seasonality, historical data, and/or demand or production reports from operators or various stakeholders.

In some cases, the systems and methods of the present disclosure may be implemented using an algorithm configured to coordinate shipping of the fuel storage modules based on a demand for the hydrogen as well as current and future production rates for hydrogen. In some cases, the algorithm may be configured to account for current, historical, and projected energy/electricity prices, expected transit times, the locations of one or more hydrogen production facilities, production capacities of the one or more hydrogen production facilities, transport logistics for a given consumption or demand profile, an availability of one or more modes of transport, the locations of the one or more vehicle fueling sites, a current or future willingness of consumers to pay for the hydrogen, and/or level of service guarantees. In some cases, the algorithm may be configured to identify optimal production sites (e.g., by location and/or production capacity) and to optimize transport logistics (e.g., a selection of the best modes of transport) for a given consumption or demand profile, to minimize production and transportation costs and maximize on-time deliveries. In some cases, the algorithm may be configured to optimize production of hydrogen at various hydrogen production facilities located in different regions.

In some cases, the systems and methods of the present disclosure may be used to automatically generate shipping documentation to coordinate shipping and delivery/transport of the fuel storage modules to or from vehicle fueling sites. In some cases, the systems and methods of the present disclosure may be used to generate documentation such as weight and balance checklists or fuel calculations, which can aid in the coordination of shipping, transport, delivery, and usage of fuel storage modules. In some cases, the systems and methods of the present disclosure may be used to generate documentation that comprises one or more sensor readings or measurements obtained using any of the sensors, sensor systems, or sensor suites described herein.

Algorithms for Monitoring

In any of the embodiments described herein, a sensor suite may be provided or implemented to monitor a plurality of parameters associated with the fuel storage modules, through a life of the fuel storage modules (i.e., from filling the fuel storage modules with hydrogen to a transportation of the fuel storage modules to a loading of the fuel storage modules in one or more hydrogen fuel compatible vehicles to a consumption of the hydrogen fuel by the hydrogen fuel compatible vehicles to an unloading of the fuel storage modules to an inspection and/or refueling of the hydrogen fuel storage modules). The plurality of parameters may comprise the temperature of the hydrogen stored within the fuel storage modules, the pressure of the hydrogen stored within the fuel storage modules, the velocity or acceleration of the hydrogen fuel storage modules, an amount of gas venting or leakage from the fuel storage modules, a load exerted on the fuel storage modules due to an acceleration or a deceleration of the fuel storage modules, a load exerted on the fuel storage modules due to one or more vibrations or shocks, or any changes to such parameters over a period of time. In any of the embodiments described herein, a monitoring algorithm may be implemented to actively monitor and process readings or measurements obtained using the sensor suite. In some cases, the monitoring algorithm may be configured to detect failure scenarios and/or mitigate such failure scenarios (e.g., by sending one or more commands to a controller or an actuator to vent the fuel storage modules or to shut off fuel delivery from the fuel storage modules to one or more fuel cells).

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Storage Module

Storage vessels (for example, the capsules 52 for hydrogen fuel) have been developed as described herein incorporating metal and composite materials to allow the operating pressure of the tank to be increased while reducing weight. In some embodiments, the vessels can have the construction discussed above. In other embodiments, the vessels may use a polymeric, aluminum, or other metallic liner about which a carbon fiber composite is filament wound around the liner to provide the strength needed for the operating pressures of the gas. Conventional vessels, to keep the hydrogen from escaping, may use a composite in an outer layer. The composite may include fiber and a matrix. The matrix may be an epoxy or resin. The epoxy is used to offset or counter interlaminar loads, shear forces, and lateral loads not in the direction of the wound fibers. Epoxy or other matrix material, however, can add significant weight to storage vessels, which can lead to increased fuel and transportation costs. The additional weight may also reduce the amount of payload that a vehicle can carry or support. Accordingly, there is a need to reduce the weight of storage vessels.

The present disclosure provides an improved storage vessel design, that substantially reduces the amount of epoxy in the vessel, thereby leading to weight savings. In some embodiments, the use of epoxy can be substantially reduced or eliminated. The improved storage vessel design disclosed herein can be configured to handle interlaminar and lateral fiber loads through a balance of fibers woven in different directions, without requiring the use of an epoxy. In some of the embodiments disclosed herein, the storage vessel may have an elongated shape, with a hollow interior portion in which the hydrogen is stored. The hydrogen stored in the vessel may be liquid, gaseous, liquid under high pressure, or hydrogen in a state of matter anywhere along the continuum from liquid to gas. The hydrogen storage vessel disclosed herein may comprise lightweight materials, and may not require the substantial use of epoxy as required by other conventional hydrogen storage vessels.

The hydrogen storage vessel disclosed herein may include several layers of material. As discussed above in connection with FIGS. 3B and 3C, embodiments of the capsule 52 or other storage vessel includes the first layer 60 that may be a melt bonded or ultrasonically welded, substantially hydrogen impervious barrier layer, which may use a combination of a PE, PVA, or EVA on a support carrier so as to form the laminated inner liner layer as discussed above. The second layer 62 may be the insulation layer, the third layer 64 may be the load-carrying layer, and the fourth layer 66 may be the anti-abrasion layer. Some embodiments do not include the insulation layer. The layers together may comprise a non-rigid laminate stack that enables the sealing of hydrogen in a vessel made of lightweight materials.

The load-carrying layer 64 may use high tensile strength fibers. The fibers may be combined into a structural layer consisting of many fibers, in different orientations to accommodate the various loads within the vessel. The fiber layer may be formed as a braid, a weave, a series of wound tows or a variety of envisioned layering methods. In the illustrated embodiment, the third layer 64 is a seamless, cylindrical carbon-fiber weave that extends over and encases the first and second layers 60 and 62. The layering method enables an orientation direction of the fibers to be tailored to the location and geometry of the contour of the vessel to optimize load bearing. Closer to a cylindrical region of the hydrogen storage vessel, the fibers may be primarily hoop and axially oriented. As discussed in greater detail below, some or all of the layers forming the body of the vessel, (i.e., the capsule 52), can be sealably arranged to provide a sealed enclosure that contains the hydrogen fuel. For example, the fiber-based third layer 64 may be clamped between two concentric rings of a closure assembly, wherein the rings can interface at a tapered cone surface. The fiber may be anchored to the outer ring and pressure loads may push the inner ring outwards into the cone circle. This wedging action between the concentric rings may clamp the fibers in place. The fiber layer may be terminated using a laminated metal resistance spot welded joint. The fiber layer may be clamped to the outer ring.

The fiber layer 64 may be braided or woven to improve the manufacturability of the system and to optimize the balance of fiber orientations throughout the structural layer. One preferred material for the fiber braid is carbon fiber. A carbon fiber braid may be formed in either sheets or a tube. In forming the carbon braid, numerous carbon fibers may be gathered to form tows. Then the individual tows may be woven or braided. In a preferred material, the strands may be woven at +45° to form a woven braid. It may be preferred that the carbon is braided so that the fibers run at a 45° angle relative to the longitudinal length of the sheet or sleeve. With respect to cylindrical methods, loads are mainly hoop loads on the order of pressure multiplied by radius over thickness (PR/T) and axial loads on the order of PR/2T. A preferred fiber orientation in a cylinder section may therefore be one set of axial fibers to two parts hoop fibers (as hoop loads are on the order of twice axial loads in magnitude). Towards end portions of the vessel, off-axis or 45-degree fibers may be provided or implemented to accommodate for the end portions' complex stress regions.

Similar principles may be applied for designing vessels not cylindrical in shape. The hoop and axial strains may be determined for different vessel shapes and the fibers may be braided according to the relationships between the hoop and axial strains. If such vessels also include domed sections, those sections may also use off-axis or 45-degree fibers. In some cases, complex shapes may have more than two (e.g., axial and hoop) directions of stress. For these cases, fibers may have to be oriented in more than two directions, with larger proportions of fibers oriented in directions of increased stress. The carbon braid as described herein may be made of commercially-available carbon fiber (including graphite fiber).

The fiber braid may be configured according to a particular ratio of fiber orientations to accommodate loads within the vessel. The fiber braid may comprise an optimized ratio of fiber orientations to accommodate the prevailing loads. The fiber orientations may differ along the length of the vessel depending on structural needs imposed by the geometry and depending on the fuel type (e.g., hydrogen) stored within the vessel. The braid may be formed on a mandrel which enables an evolving fiber orientation. The above principles and braiding technique can be used to design hydrogen storage vessels of different shapes. The braid angles of fibers may be adjusted in order to improve performance. For example, fibers may be braided at angles of 45° in an x-y plane. Braiding of the fibers at any angle (other than at) 45° may be contemplated, in order to provide different customized strengths and needs. For example, additional hoop fibers or axial fibers may be added in order to optimize hoop and axial strength. In some embodiments, the braid may be a three-dimensional (3D) carbon fiber braid. In this embodiment the through thickness fibers may assist in the transfer of interlaminar or shear loading in the fiber layer.

In some embodiments, the ends of the layers of the vessel are captured or otherwise connected to the closure assembly to provide the sealed ends of the vessel. The closure assembly can include mating components that form a load transfer interface. The load transfer interface may be configured to terminate loads experienced by the fibers. The load transfer interface may comprise a mechanical or structural joint. The joint may comprise a plurality of concentric rings (e.g., a pair of concentric rings) tailored in shape and profile to transfer the fiber axial loads into the joint through friction or shear. The ring fitting may be designed to provide an increasing concentric clamping load with increased axial fiber loading. The ring fitting may be designed to clamp load bearing fibers, while transitioning the low permeability and insulation layers towards the inner surface of the fitting and transitioning the abrasion resistant layers towards the outside of the fitting. This may be achieved without creating stressed creases in the layers.

Figure 10:
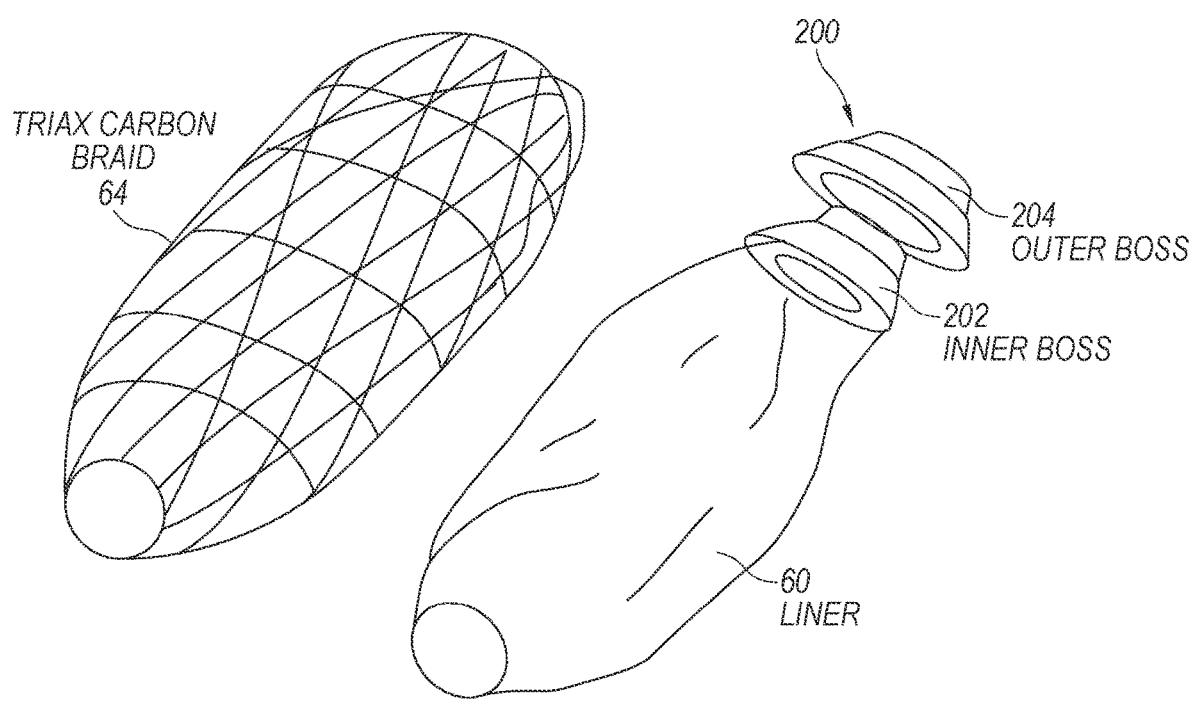
FIG. 10 is a partially exploded isometric view of layers of a storage vessel, in accordance with some embodiments.

FIG. 10 shows schematic views of the closure assembly 200 and the layers/components of the hydrogen storage capsule 52, in accordance with some embodiments. The hydrogen storage capsule 52 may have an elongated smooth profile, with a conical or dome-shaped end for transferring a load. Shown in FIG. 10 are a braided fiber layer forming the third layer 64 as discussed above, an inner liner layer forming the first layer 60 as discussed above. The closure assembly 200 of the illustrated embodiment comprises a mating inner boss 202 and outer boss 204 that connect to at least some of the layers to securely anchor the layers together at the end (i.e., the top end 206 of the capsule 52).

Although the embodiments described herein show an elongated cylindrical capsule 52 or other storage vessel, the present disclosure is not limited to such a shape. Other elliptical, cylindrical, or oval shapes, for example, may also be suitable depending on the requirements of the vehicles or equipment to which the hydrogen storage vessel may be coupled to. Similarly, the end shape may not necessarily be conical or domed in shape, but may also be, e.g., spheroid or rectangular in shape.

The closure assembly 200 may include connection fittings or other mouthpieces that facilitate connections between the hydrogen storage capsule 52 and the fuel system of the aircraft 10 (FIG. 1) or other vehicles or other pieces of equipment. The capsule 52 can have closure assemblies 200 at each of the top and bottom ends. The outer and inner bosses 204 and 202 of the closure assembly may be made of metal, such as stainless steel, or any other appropriate. The outer boss 204 may be provided outside of the fiber braid, while at least a portion of the inner boss 202 may be covered by the fiber braid layer 64 in a configuration that resolves stress in the fibers of the fiber braid when the capsule contains the hydrogen fuel under pressure.

The liner 60 forms the interior barrier layer configured to prevent the hydrogen from permeating through the walls of the capsule 52 or other vessel. The hydrogen-impervious liner 60 may include an inner layer and one or more exterior layers. The inner layer may directly contact the hydrogen gas, while the exterior layers may provide reinforcement for the liner. The liner may be thin and lightweight so as to provide only a low hydrogen permeability without the ability to carry sufficient loads by itself. The liner 60 may be configured to have high impact resistance to prevent cracking and the escape of hydrogen gas or liquid hydrogen. The liner 60 may prevent leaks of hydrogen and chemical degradation of the hydrogen vessel itself. The liner 60 may be of a thermoplastic material, such as a high-density polyethylene (HDPE), or a layer of metal such as aluminum. Additionally, the liner may be made of EVA using a support carrier. The liner may be manufactured using an injection molding, rotational molding process, or thermoforming process. An EVA liner may be laminated or flat extruded.

Figure 11:
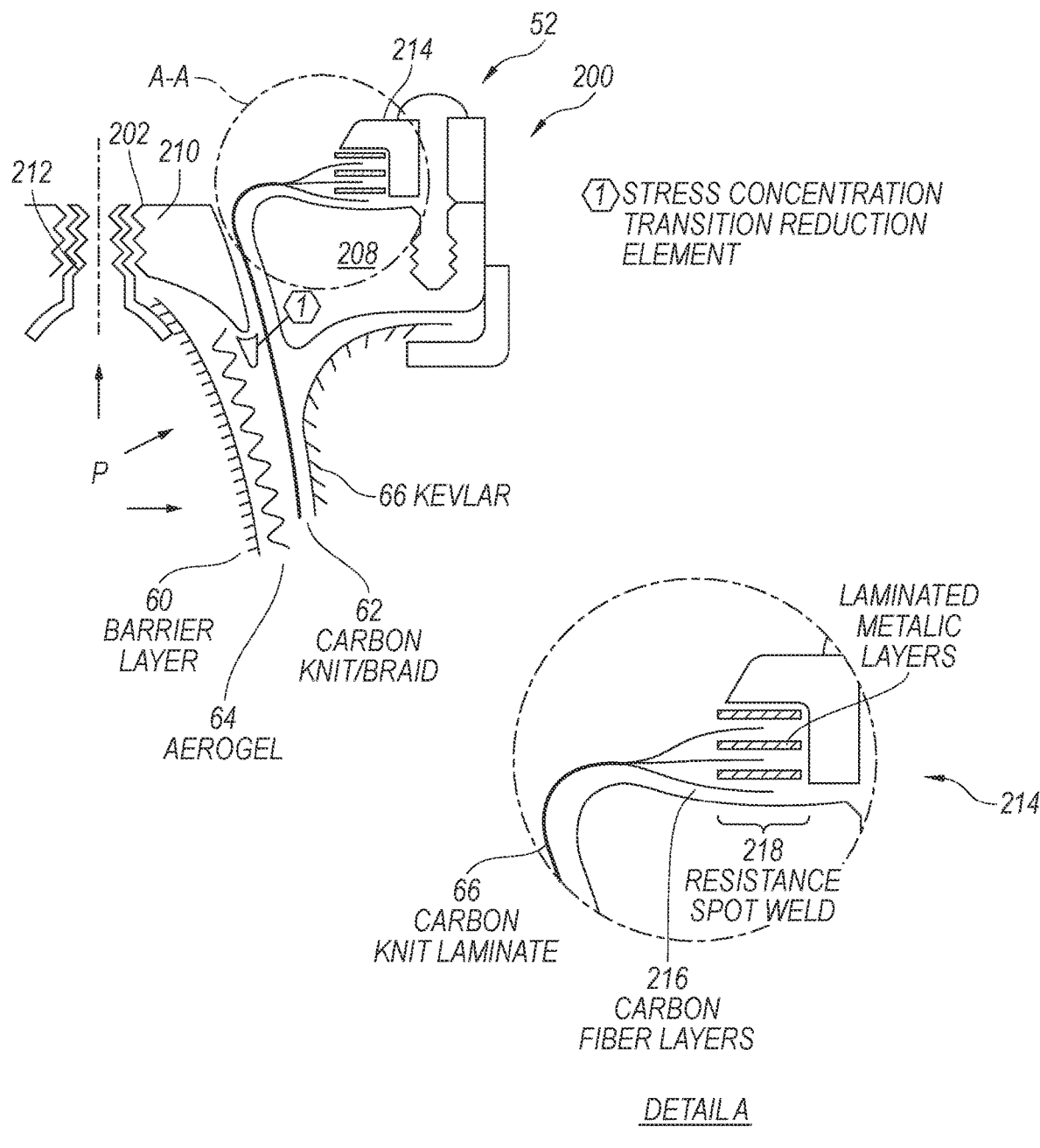
FIG. 11 is an enlarged cross-sectional view of a storage vessel, in accordance with some embodiments.

FIG. 11 is an enlarged, partial cross-sectional view of a hydrogen storage vessel (i.e., the capsule 52), in accordance with some embodiments. FIG. 11 also illustrates a side view of the storage vessel. Referring to FIG. 11, hydrogen (which may be in a state along the continuum from liquid to gas) exerts pressure on the inner most barrier layer corresponding to the first layer 60 (FIG. 3B) discussed above. The system disclosed can use the pressure from the hydrogen to seal the vessel. In some embodiments, between the barrier layer 60 and the fiber knit, corresponding to the second layer 62 (FIG. 3B) discussed above), is an insulating layer, corresponding to the third layer 64 (FIG. 3B) discussed above, which may be made of aerogel or other lightweight high-insulating value material. An outer anti-abrasion layer may correspond to the fourth layer 66 (FIG. 3B) discussed above. Near the termination of the barrier layer 60 and/or the insulation layer 64 is a stress concentration reduction element 208 the closure assembly 200. The stress concentration reduction element 208 may be a mechanical or structural joint made of a soft material such as rubber and fashioned into a wedge shape. The stress concentration reduction element 208 may facilitate the transfer of the hydrogen load inside the body of the capsule 52 into the closure assembly 200 or other end fitting (the outer body), while preventing wrinkles or bunching of the insulation and barrier layers as they are diverted towards the inner boss of the tank.

The layers of the storage vessel may comprise a fiber stack that is primarily flexible and non-rigid. The layers may be configured to work together, with each layer providing a particular set of functions.

The illustrated closure assembly 200 of the capsule 52 may comprise the inner boss 202 sealably coupled to the inner layer 60. In the illustrated embodiment, the inner boss 202 has an annular body portion 210 and a liner retainer 212 threadably engaging the annular body portion 610, such that the edge portion of the inner layer 610 is captured in a sealed configuration between the annular body portion 210 and the liner retainer 212. The liner retainer 212 can include a central channel, such as a threaded aperture that communicates with the capsule's interior volume and can receive connector of a flow control assembly with one or more valves and/or regulators that are coupled to the fuel outlet fitting, such as the quick disconnect fitting 112, discussed above. The liner retainer 212 of a closure assembly can be sealed and also include sensors or monitors for monitoring the health of the capsule 52 and the hydrogen therein, including the fuels temperature and/or pressure.

The illustrated closure assembly 200 has the annular outer boss 204 securely coupled to and substantially concentric with the inner boss 202. Between the inner boss 202 and outer boss 204 are the barrier 60, insulation 64, and fiber knit 62 layers. Outside the outer boss 204 may be an anti-abrasion layer 66 (e.g., made of Kevlar). The inner and outer bosses 202 and 204 of the illustrated embodiment have a wedge-shaped interface along which the bosses engage each other. The bosses 202 and 204 can be securely held in engagement with each other by a fastening ring or other fasteners securely engaging the bosses. The concentric bosses of the closure assembly 200 may be tailored in shape to transfer loads from the fiber knit to the end fitting.

The barrier layer 60 may serve to contain the hydrogen within the vessel. The barrier layer 60 may comprise a low-permeability material, such as polyvinyl alcohol (PVA) or ethylene vinyl acetate (EVA). The barrier layer 610 may be sufficient to trap nearly all of the hydrogen gas within the vessel.

The insulation layer 64 may moderate the temperature within the vessel to ensure safe transportation of the hydrogen contents. Insulation can reduce heat transfer from the outside environment and thereby reduce the evaporation rate of the liquid hydrogen. The insulation layer 64 may comprise a mesoporous material with low thermal conductivity, such as aerogel. Such materials may be advantageous due to their large surface areas, open porosity, and small pore sizes. For example, aerogels are the lightest solid materials and have the lowest sound conductivity of any material.

The fiber layer 62 may support the barrier layer and may contain the pressure loads of the internal gas. The fiber layer 62 may comprise braided, woven or knit carbon fibers or other high tensile strength fibers, such as Dynema fibers. The braided or woven fibers may be formed such that they comprise overlapping layers in two or more directions. Some fibers may be woven longitudinally, radially, or at various angles along the longitudinal axis of the vessel, to improve strength of the vessel in both circumferential and axial directions. The walls of the hydrogen storage vessel may experience a multi-axial load and strain. In some hydrogen storage vessel designs, the hoop load may exceed the axial load. For example, for a cylindrical design the hoop load may be twice the axial load. The fiber knit 62 disclosed herein may be configured to provide more support with respect to the hoop direction than with respect to the axial direction. The fiber knit layer 62 may serve as the primary load-bearing member within the stack, resolving high-pressure hydrogen loads within the vessel. The fiber knit layer 62 may be knit or woven such that its constituent fibers may individually be oriented in two or more different directions, allowing for strength optimization based on where the fibers are located in the structure. These fiber orientations may thus vary depending on whether the storage vessel is cylindrical, oval, or of another shape. Fiber directions may also vary with respect to the structural topography of the vessel depending on what the surface shape geometry is doing.

The fiber knit 62 may be clamped to the outer boss 204 and the inner boss 202. The fiber knit 62 may thus resolve the axial and hoop stresses from the pressure of the hydrogen on the inner layers of the hydrogen storage vessel (the barrier and insulation layers).

The anti-abrasion layer 66 may serve to protect the vessel from external or environmental forces or impacts which may damage the tank. These forces may include objects hitting the tank, the tank being dropped, heavy materials being disposed on top of the tank, and pressure waves caused by explosions or other disruptions. The anti-abrasion layer may comprise a protective material such as Kevlar or fiberglass. The anti-abrasion layer may be placed outside of the concentric ring structure of the hydrogen storage vessel.

FIG. 11 (Detail A) additionally illustrates a clamping assembly 214 to adhere/couple the fiber knit 62 to the inner body of the hydrogen storage vessel. The carbon fiber layers 216 comprising the knit pattern may be terminated using a laminated metal resistance spot-welded joint 218 and clamped to the outer body. The welding process may place carbon fibers in alternating layers with laminated metallic layers. The clamping assembly 214 may work in tandem with pressure produced by the trapped hydrogen to wedge and seal the hydrogen storage vessel.

Figure 12:
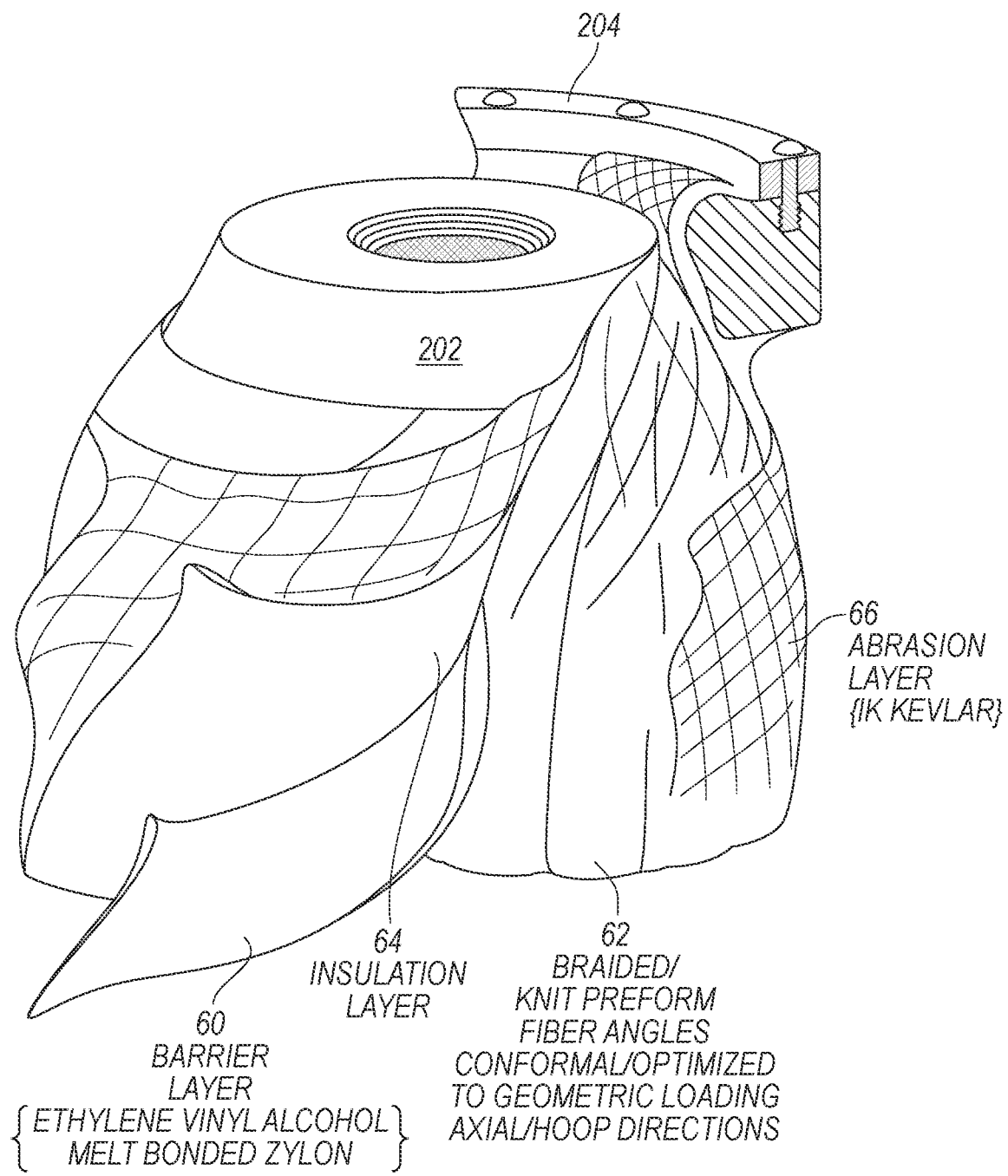
FIG. 12 is a partial sectional cut-out view of a storage vessel, in accordance with some embodiments.

FIG. 12 illustrates a partial cutaway view of the hydrogen storage vessel. The cutaway view shows the inner boss 202 and outer boss 204 of the closure assembly 200, as well as the layers of material in-between. The inner boss 202 and outer boss 204 may have concentric ring cross-sections when viewed from above. The interface of the inner and outer bosses may have a conical shape. The inner boss 202 may be encased in multiple layers of material (e.g., three stacked layers). The barrier layer 60 may be the first layer, the insulation layer 64 may be the second layer, and the fiber knit layer 62 may be the third layer. The cutaway view illustrates the axially and hoop-oriented fibers of the fiber knit 62. The fiber knit 62 may be clamped to the outer boss 204 using the clamping assembly 214. When pressure from within the vessel is exerted outwards, it creates a wedging effect that clamps the fiber knit, insulation layer, and barrier layers in place between the inner body and outer body. The fiber knit in turn preserves the structural integrity of the tank, despite the pressure caused by the entrapped hydrogen. The outer boss 204 may be encased by an abrasion layer 66 (e.g., a Kevlar layer). Because of the cone shape, the inner ring or boss may not be able to move axially past the outer ring or boss. Additionally, anything in the wedge between the two rings gets clamped tighter as the ring is pushed axially by the pressure force. Non-cylindrical hydrogen tanks may also include conical interfaces, or interfaces that bulge towards the center of the tank and taper towards the ends (which may or may not be dome-shaped).

Figure 13:
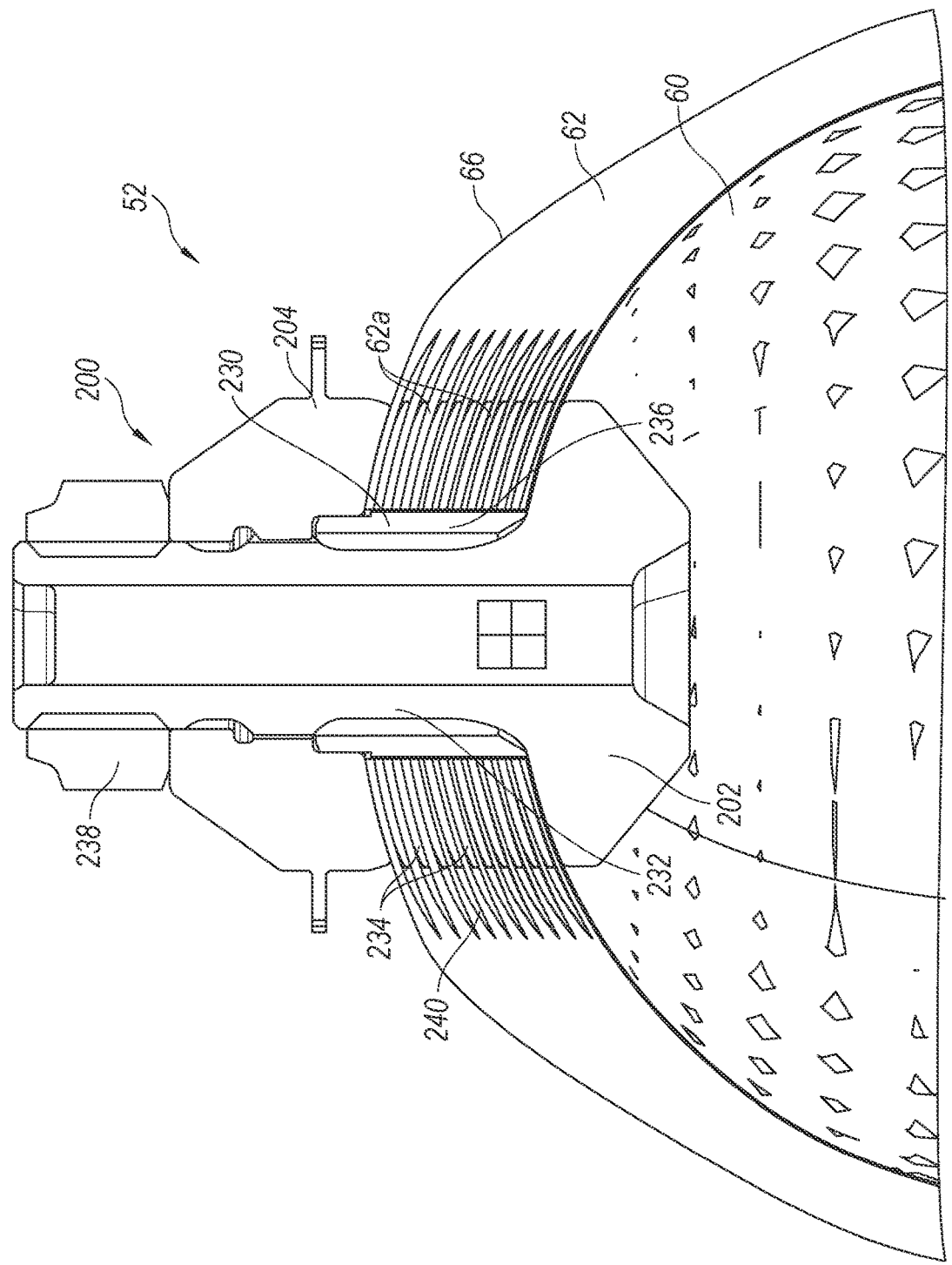
FIG. 13 is an enlarged cross-sectional view of an upper portion of the storage vessel, in accordance with another embodiment.

FIG. 13 is an enlarged cross-sectional view of an upper portion of the capsule 52 showing the closure assembly 200 in accordance with an alternate embodiment. In the illustrated embodiment, the end portions of the barrier layer 60, the fiber layer 62, and the abrasion layer 60 are captured between the inner boss 202 and the outer boss 204. The fiber layer 62 of the illustrated embodiment is an assembly of multiple sublayers 62a stacked or otherwise laid up together, wherein the fibers in the various sublayers 62a may have the same or different angular orientations relative to other sublayers 62a. The closure assembly 200 has a locking element 230 positioned concentrically around a neck portion 232 of the inner boss 202, and the locking element 230 is captured and compressed between the inner and outer bosses 202 and 204. The locking element 230 has a plurality of locking fins 234 extending radially from a central sleeve 236 connected to the neck portion 232. The locking fins 234 are configured to receive one, two, or other small number of the fiber sublayers 62a in the annular spaces between the locking fins 234.

The inner boss 202 of the illustrated embodiment projects away from the locking element 230 and the annular outer boss 204 is positioned over and around neck portion 232 so the locking element is captured between the inner and outer bosses 202 and 204. A fastening member 238 is coupled to the outer boss 204 and configured to securely press the upper boss 204 into engagement with the locking element 230. In the illustrated embodiment, the fastening member 238 is a nut or other threaded member that screws onto a threaded upper end portion of the neck portion 232 is threaded, and onto the neck portion 232. As the fastening member 238 is tightened, it presses against the upper boss, which presses against the locking fins 234, and the locking fins 234 press against the capsule's layers and sublayers engaging the locking element. The outward ends of the locking fins 234 can include flexible stress relief members 240 to minimize loads where the layers 60, 66, and sublayers 62b first engage the locking fins. With this construction, the locking fins 234 provide a large engagement surface area, so the frictional engagement and holding force between the capsule's layers and the locking element 230 is extremely large. Accordingly, this construction of the closure assembly 200 provides a rigid and fully sealed interface without leakage of hydrogen fuel, particularly when the hydrogen fuel is under pressure.

Figure 14:
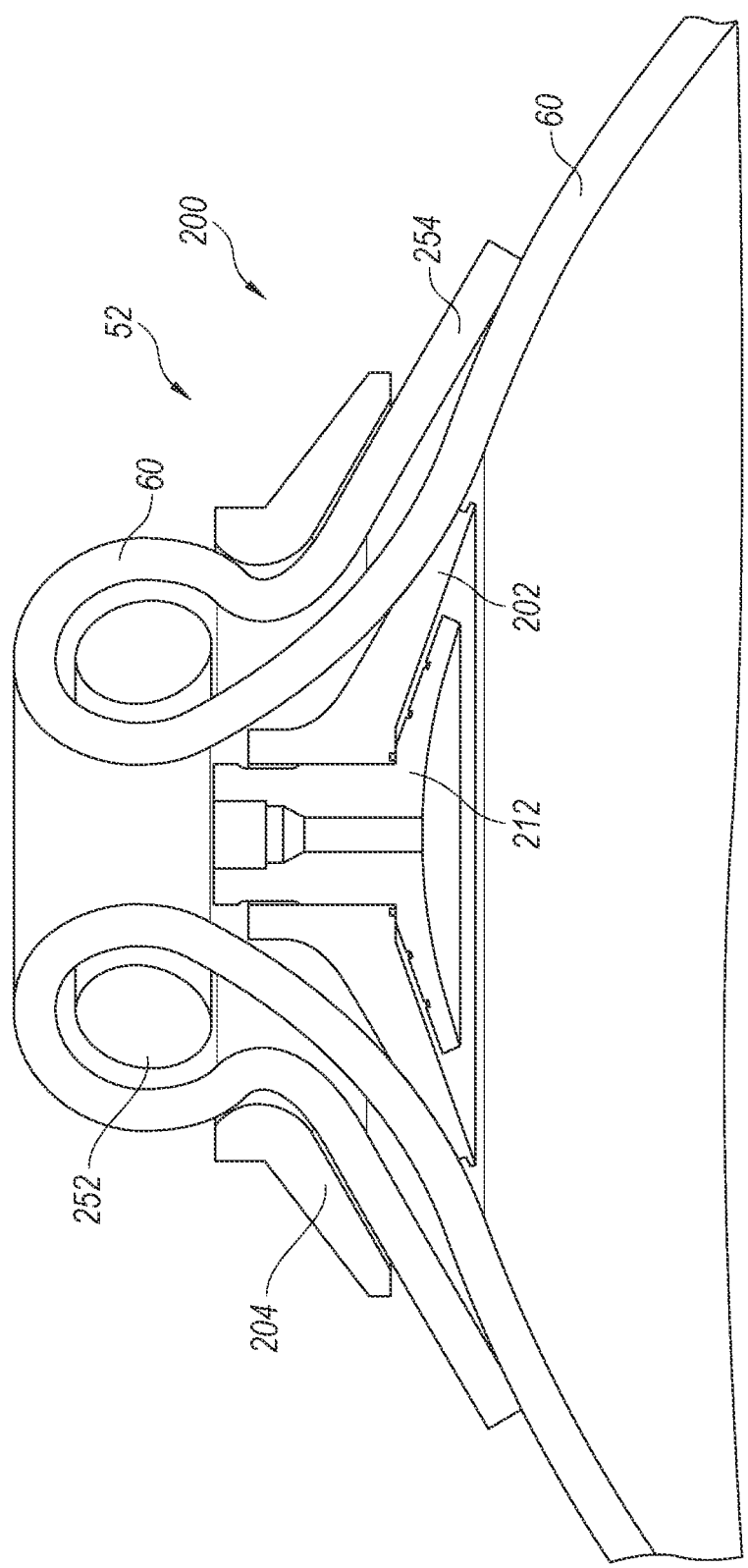
FIG. 14 is an enlarged cross-sectional view of an upper portion of the storage vessel, in accordance with yet another embodiment.

FIG. 14 is an enlarged cross-sectional view of an upper portion of the capsule 52 showing the closure assembly 200 in accordance with another alternate embodiment. The closure assembly 200 has the inner boss 202 and a liner retainer 212 that captures the upper edge portion of the barrier layer against the bottom surface 250 of annular body portion 210 of the inner boss. The fiber layer 62 is securely captured between the upper surface of the inner boss 202 and the bottom surface of the annular outer boss 204. In the illustrated embodiment, the closure assembly also has a locking ring 252 configured so the upper edge portion of the fiber layer 62 wraps over the locking ring 252 to the fiber layer 62 doubles back on itself. The tag end 254 of the fiber layer 62 is also captured and locked between the bottom surface of the outer boss 204 and the upper surface of the inner boss 202. The upper boss 204 is securely fixed in place to form a clamping arrangement with the inner boss. This configuration with the locking ring 252 creates the hydrogen impervious seal and resolves the stress in the fibers of the fiber layer 62 at the end portion when the capsule contains the hydrogen fuel under pressure. This configureation is only one example of a construction of the closure assembly 200, and other embodiments can use end closures 200 with other configurations.

Figure 15:
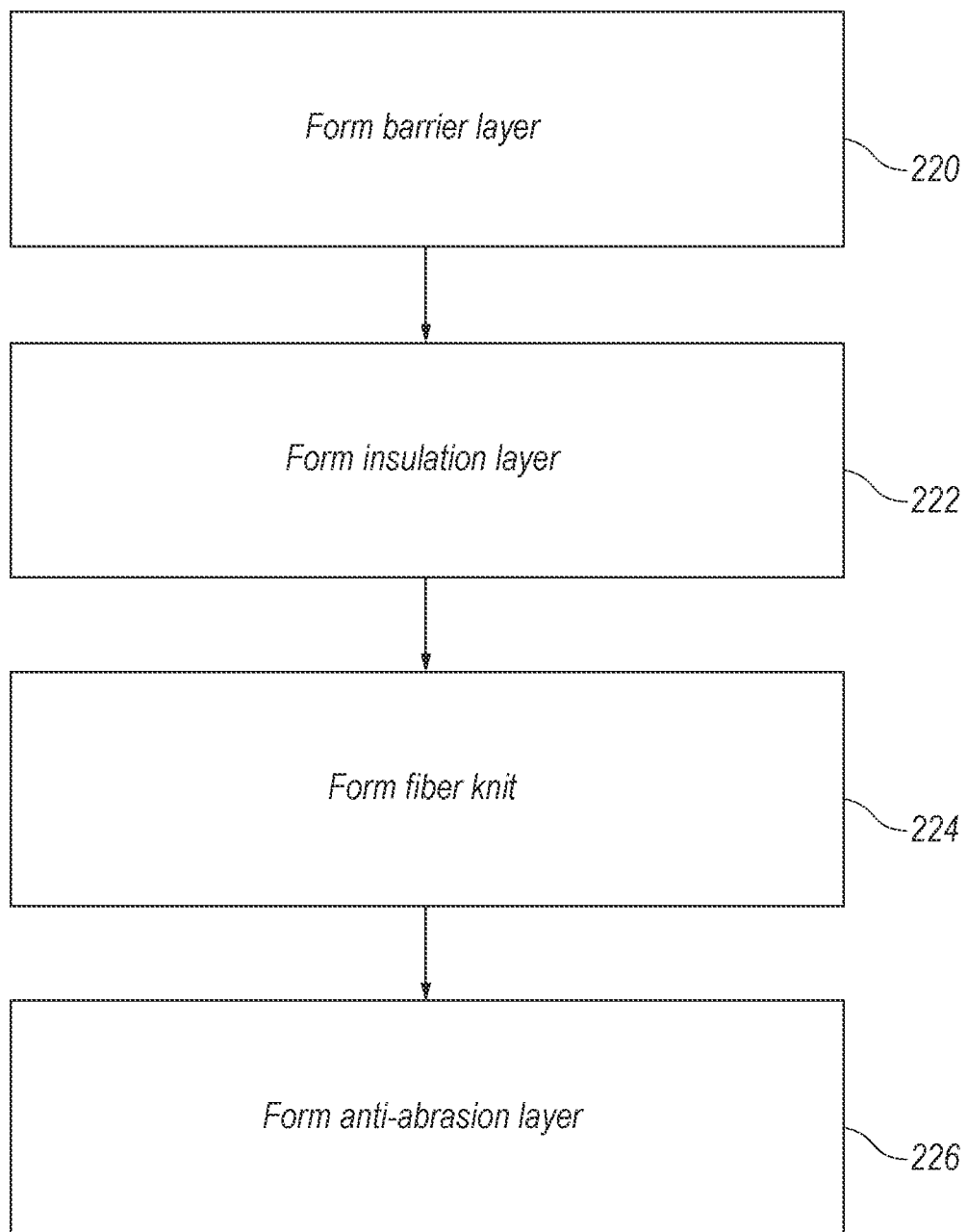
FIG. 15 is a schematic flow chart illustrating a process of forming a storage vessel, in accordance with some embodiments.

FIG. 15 shows a process of forming a hydrogen storage vessel, in accordance with some embodiments. The storage vessel may comprise an inner body and an outer body with multiple material layers and a clamping assembly to adhere/couple a braided fiber layer to the inner body.

In a first operation 220, the barrier layer is formed over the inner body. The barrier layer may be formed by processes such as forging, stamping, machining, molding, laminating, ultrasonically welding, and other processes. In a second operation 222, the insulation layer is applied over the barrier layer. The insulation layer may be made of a material with low thermal conductivity, such as Aerogel. The insulation layer may or may not be fixed to the barrier layer using a light adhesive, ultrasonic bonding, or pin bonding. In some embodiments, the capsule 52 does not include the insulation layer, so this step is skipped.

In a third operation 224, the fiber knit is formed over the insulation layer. The fiber knit may be braided or woven in two or more directions. The fiber knit may or may not be fixed to the insulation layer using a light adhesive, ultrasonic bonding, or pin bonding. The fiber knit may also be placed between two layers of thermoplastic film and pin bonding the layers, trapping the fiber in between. The carbon knit may be clamped to an outer body, using a clamping apparatus. In a fourth operation 226, the anti-abrasion layer may be formed over the outer body. The anti-abrasion layer may comprise Kevlar.

Computer Systems

Figure 16:
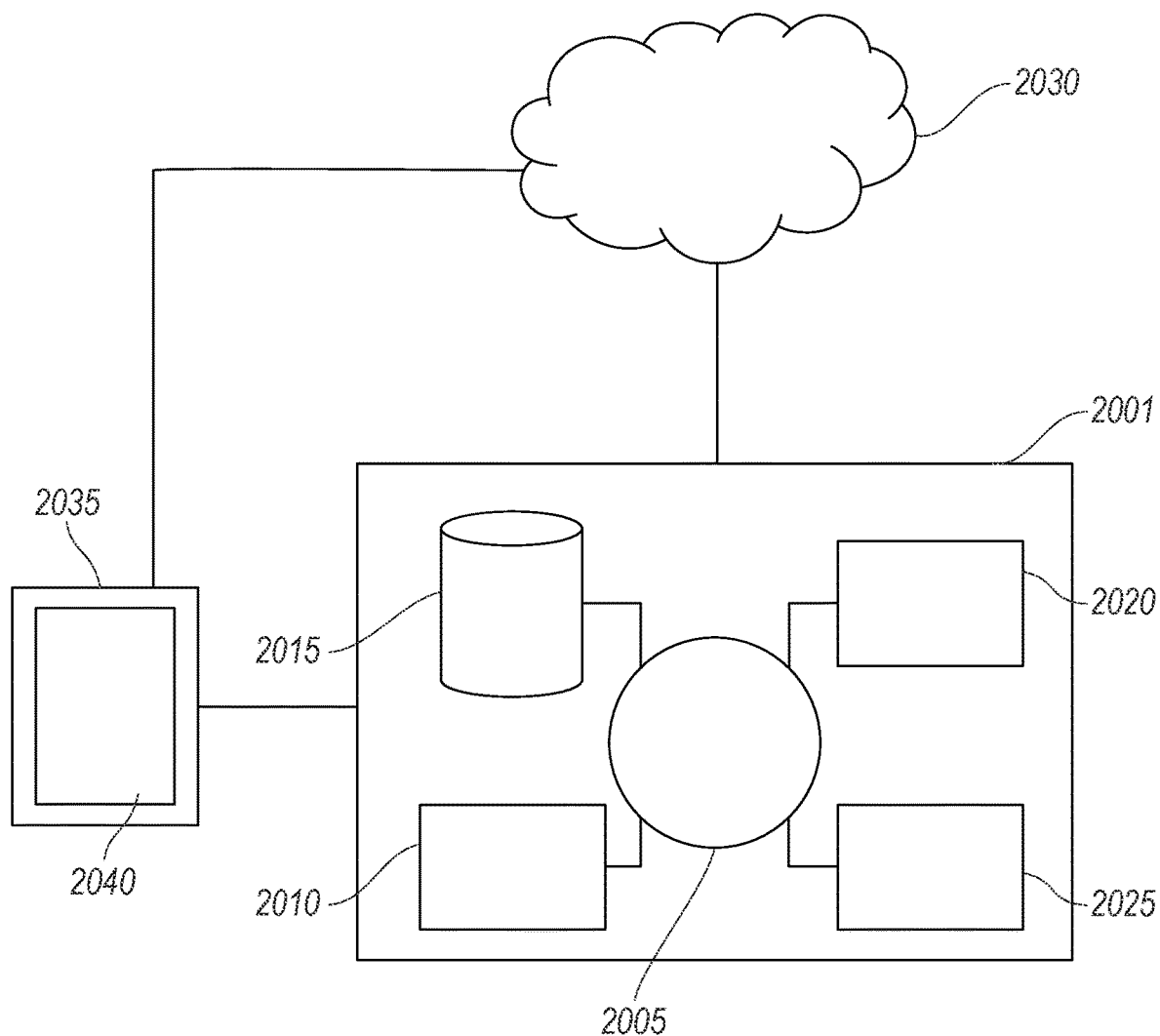
FIG. 16 is a schematic illustration of a computer system programmed or otherwise configured to implement methods provided herein.

In another aspect, the present disclosure provides computer systems programmed or otherwise configured to implement methods of the disclosure. FIG. 16 shows a computer system 2001 programmed or otherwise configured to implement a method for carbon-free transportation. The method may comprise determining a demand for hydrogen fuel storage modules and coordinating a delivery or a transportation of one or more hydrogen fuel storage modules to one or more hydrogen fuel compatible vehicles located at or near one or more vehicle fueling sites. The computer system 2001 can be an electronic device of a user or a computer system remotely located with respect to the electronic device. The electronic device can be a mobile electronic device.

The computer system 2001 may include a central processing unit (CPU, also "processor" and "computer processor" herein) 2005, which can be a single core or multi core processor, or a plurality of processors for parallel processing. The computer system 2001 also includes memory or memory location 2010 (e.g., random-access memory, read-only memory, flash memory), electronic storage unit 2015 (e.g., hard disk), communication interface 2020 (e.g., network adapter) for communicating with one or more other systems, and peripheral devices 2025, such as cache, other memory, data storage and/or electronic display adapters. The memory 2010, storage unit 2015, interface 2020 and peripheral devices 2025 are in communication with the CPU 2005 through a communication bus (solid lines), such as a motherboard. The storage unit 2015 can be a data storage unit (or data repository) for storing data. The computer system 2001 can be operatively coupled to a computer network ("network") 2030 with the aid of the communication interface 2020. The network 2030 can be the Internet, an internet and/or extranet, or an intranet and/or extranet in communication with the Internet. The network 2030 in some cases is a telecommunication and/or data network. The network 2030 can include one or more computer servers, which can enable distributed computing, such as cloud computing. The network 2030, in some cases with the aid of the computer system 2001, can implement a peer-to-peer network, which may enable devices coupled to the computer system 2001 to behave as a client or a server.

The CPU 2005 can execute a sequence of machine-readable instructions, which can be embodied in a program or software. The instructions may be stored in a memory location, such as the memory 2010. The instructions can be directed to the CPU 2005, which can subsequently program or otherwise configure the CPU 2005 to implement methods of the present disclosure. Examples of operations performed by the CPU 2005 can include fetch, decode, execute, and writeback.

The CPU 2005 can be part of a circuit, such as an integrated circuit. One or more other components of the system 2001 can be included in the circuit. In some cases, the circuit is an application specific integrated circuit (ASIC).

The storage unit 2015 can store files, such as drivers, libraries and saved programs. The storage unit 2015 can store user data, e.g., user preferences and user programs. The computer system 2001 in some cases can include one or more additional data storage units located external to the computer system 2001 (e.g., on a remote server in communication with the computer system 2001 through an intranet or the Internet).

The computer system 2001 can communicate with one or more remote computer systems through the network 2030. For instance, the computer system 2001 can communicate with a remote computer system of a user (e.g., an operator of a hydrogen fuel compatible vehicle, an operator of a transport vehicle for transporting one or more hydrogen fuel storage modules, a technician at a hydrogen production facility, an entity managing a just-in-time network for hydrogen fuel cell delivery and distribution, etc.). Examples of remote computer systems include personal computers (e.g., portable PC), slate or tablet PC's (e.g., Apple® iPad, Samsung Galaxy Tab), telephones, Smart phones (e.g., Apple® iPhone, Android-enabled device, Blackberry®), or personal digital assistants. The user can access the computer system 2001 via the network 2030.

Methods as described herein can be implemented by way of machine (e.g., computer processor) executable code stored on an electronic storage location of the computer system 2001, such as, for example, on the memory 2010 or electronic storage unit 2015. The machine executable or machine-readable code can be provided in the form of software. During use, the code can be executed by the processor 2005. In some cases, the code can be retrieved from the storage unit 2015 and stored on the memory 2010 for ready access by the processor 2005. In some situations, the electronic storage unit 2015 can be precluded, and machine-executable instructions are stored on memory 2010.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 2001, can be embodied in programming. Various aspects of the technology may be thought of as "products" or "articles of manufacture" typically in the form of machine (or processor) executable code and/or associated data carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, which may be transmitted across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2001 can include or be in communication with an electronic display 2035 that comprises a user interface (UI) 2040 for providing, for example, a portal for monitoring a transportation or a usage of one or more hydrogen fuel storage modules. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 2005. The algorithm may be configured to determine a demand for hydrogen fuel storage modules and to coordinate a delivery or a transportation of one or more hydrogen fuel storage modules to one or more hydrogen fuel compatible vehicles located at or near one or more vehicle fueling sites.

Vehicle Conversion

In any of the embodiments described herein, the hydrogen fuel compatible vehicles may comprise one or more vehicles converted or retrofitted to be compatible with the fuel storage modules described herein. In some cases, the one or more vehicles described herein may be converted or retrofitted into a hydrogen fuel compatible vehicle using a conversion kit. The conversion kit may comprise one or more components that enable a vehicle to use hydrogen fuel for propulsion, movement, or transportation. For example, the conversion kit may comprise one or more hydrogen fuel cells, one or more propulsion units (e.g., electric motors) configured to use hydrogen to generate thrust, structural components (e.g., frames) configured to receive and hold the fuel storage modules within the vehicle, plumbing to distribute hydrogen fuel from the fuel storage modules to the hydrogen fuel cells, an electric power train, and connectors and fittings to releasably couple the fuel storage modules (or any frame structures holding the fuel storage modules) to the hydrogen fuel compatible vehicles. The conversion kit may be an aftermarket retrofit solution for operators of vehicles (e.g., regional aircraft). The conversion kit may comprise any number of components required for hydrogen-based propulsion. The conversion kit may be customized for retrofitting on any vehicle or any aircraft. The components of the conversion kit may be modular such that the components can be combined or assembled in different configurations for retrofitting on a plurality of different aircrafts having different shapes, sizes, profiles, or designs. In some instances, the conversion kit may comprise electronics hardware and/or software to enable an operator to control or modulate the one or more components of the conversion kit.

In some cases, the fuel storage modules may be substantially cylindrical in shape. In other cases, the fuel storage modules may have a non-cylindrical shape (e.g., a conical, cuboid, or polygonal shape).

In any of the embodiments described herein, the hydrogen fuel storage modules may be configured to store gaseous hydrogen fuel, liquid hydrogen fuel, a combination of gaseous and liquid hydrogen fuel, or hydrogen as a supercritical fluid. Gaseous and liquid hydrogen fuel may be interchangeable depending on transportation requirements for the hydrogen fuel compatible vehicle. Gaseous hydrogen fuel may be less dense than liquid hydrogen fuel and may provide less range than liquid hydrogen fuel, but can provide cost savings since the compression process consumes less energy. Gaseous hydrogen fuel may also be stored in the fuel storage modules in a pressurized or compressed state for an extended time period (e.g., at least about 1 week, 1 month, 1 year, or longer) without substantial leakage from the module. Conversely, liquid hydrogen fuel can provide greater range than gaseous hydrogen fuel since liquid hydrogen fuel is more dense than gaseous hydrogen fuel, but may require a more expensive compression and liquefaction process. Depending on the transportation requirements for a hydrogen fuel compatible vehicle, an operator may elect to use either gaseous or liquid hydrogen fuel or both, depending on operational needs. In any case, the fuel storage modules described herein may be used to store gaseous hydrogen fuel and/or liquid hydrogen fuel. In some embodiments, the hydrogen fuel may be stored at a pressure that ranges from about 1 megapascal (MPa) to about 200 MPa.

The hydrogen fuel storage modules can be used to store liquid hydrogen fuel. During transport, the liquid hydrogen fuel may warm up, in spite of any insulation, and start to evaporate, thereby building up pressure inside the fuel storage module. To mitigate pressure buildup, the fuel storage modules may be configured to vent at least a portion of the stored hydrogen fuel at a controlled rate. The fuel storage modules may vent at least a portion of the stored hydrogen fuel until the fuel storage modules are delivered to a fueling site for use or consumption by a hydrogen fuel compatible vehicle. The total time between (i) fueling the hydrogen storage modules and (ii) delivery of the hydrogen fuel storage modules to a fueling site may be at most about 5 days, 4 days, 3 days, 2 days, 1 day, or less. In some instances, the total time between fueling and delivery may be more than 5 days. In any case, the fuel storage modules may be configured to retain the hydrogen fuel over an extended period of time with minimal leakage.

In any of the embodiments described herein, the hydrogen fuel storage modules may comprise a plurality of different sizes, shapes, or storage capacities depending on the type of vehicle or the transportation requirements associated with a particular vehicle type or travel route. The hydrogen fuel storage modules may be compatible with different vehicles in a same vehicle class or vehicle category.

Figure 17:
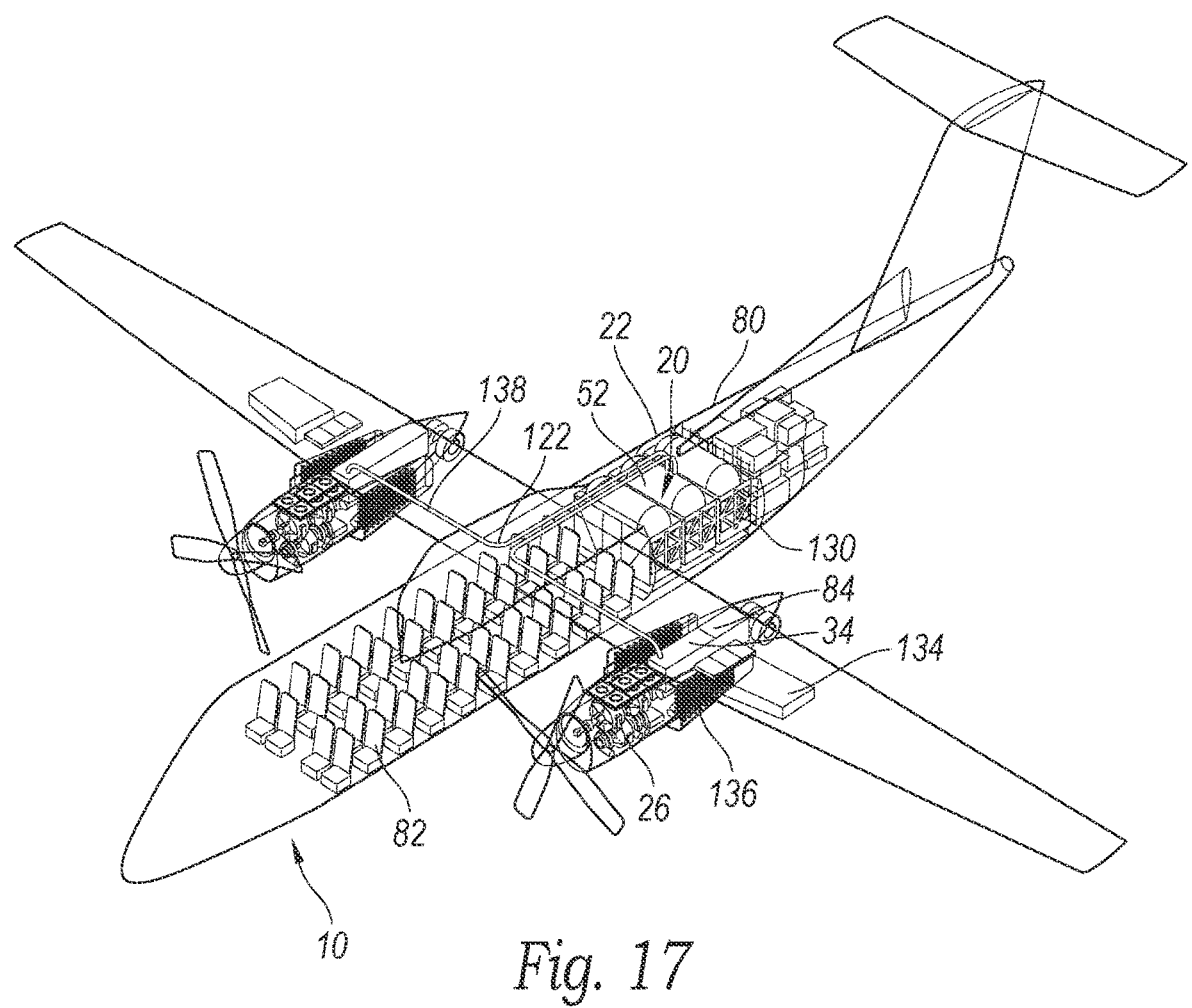
FIG. 17 is a schematic illustration of a converted aircraft configured to receive one or more hydrogen fuel storage modules, in accordance with some embodiments.

As shown in FIG. 17, the hydrogen fuel storage modules 20 may be placed or stored inside a converted aircraft 10. The converted aircraft 10 may comprise an aircraft converted into a hydrogen fuel compatible vehicle. The aircraft 10 may be converted into a hydrogen fuel compatible vehicle using a conversion kit as described herein, and may be configured for use with any of the storage modules described herein. In some cases, the fuel storage modules 20 may be placed inside a cabin area of the fuselage 80 of the converted aircraft 10. In such cases, the fuel storage modules 20 may be placed where one or more passenger seats are usually located before the aircraft undergoes conversion (e.g., by use of a conversion kit). In any of the embodiments described herein, the hydrogen fuel storage modules 20 may be in fluid communication with one or more hydrogen fuel cells (e.g., via piping or ducting). The one or more hydrogen fuel cells may be located on or near a wing region or a nacelle region of the aircraft 10.

In any of the embodiments described herein, the hydrogen fuel storage modules may be insertable into a frame structure. The frame structure may be configured to receive one or more fuel storage modules. The fuel storage modules may be releasably coupled to the frame structure. The frame structure may be inserted or loaded into a hydrogen fuel compatible vehicle. The frame structure may be releasably coupled to the hydrogen fuel compatible vehicle, or a structural component thereof. The frame structure may be configured to position and/or orient the fuel storage modules such that the fuel storage modules are able to interface with various components (e.g., connectors, fittings, piping, ducting, plumbing, electrical wiring, etc.) upon insertion into a hydrogen fuel compatible vehicle. The modules can be automatically positioned or oriented in a proper position or configuration using one or more aligning and locking mechanisms on the frame structure. Examples of such mechanisms may include guides, rails, grooves, latches, clips, springs, detents, magnets, etc. In some cases, the interfacing of the fuel storage modules with various components of the conversion kit or various subsystems of the hydrogen fuel compatible vehicle may comprise engagement of a quick release mechanism. Such interfacing may place the fuel storage modules in fluid communication with one or more hydrogen fuel cells. In some cases, such interfacing may permit operative coupling of the fuel storage modules to one or more controllers used to regulate the delivery of hydrogen fuel from the fuel storage modules and/or the operation of the hydrogen fuel cells and any compatible propulsion systems (e.g., electric motors). The use of quick release mechanisms for interfacing may enable safe and easy coupling and decoupling of the fuel storage modules within a short time period (e.g., at most about 5 minutes, 4 minutes, 3 minutes, 2 minutes, 1 minutes, or less). The quick release mechanisms may also reduce loading and unloading times, which can increase operator efficiency and enable aircraft to become operational quicker with reduced downtime.

In any of the embodiments described herein, the fuel storage modules may comprise one or more sensors for status monitoring (i.e., monitoring of the state of the contents stored within the module, or monitoring a condition or a structural integrity of the fuel storage modules). The one or more sensors may comprise, for example, a pressure sensor, a temperature sensor, a motion sensor, and/or any other sensor as described elsewhere herein.

Figure 18A:
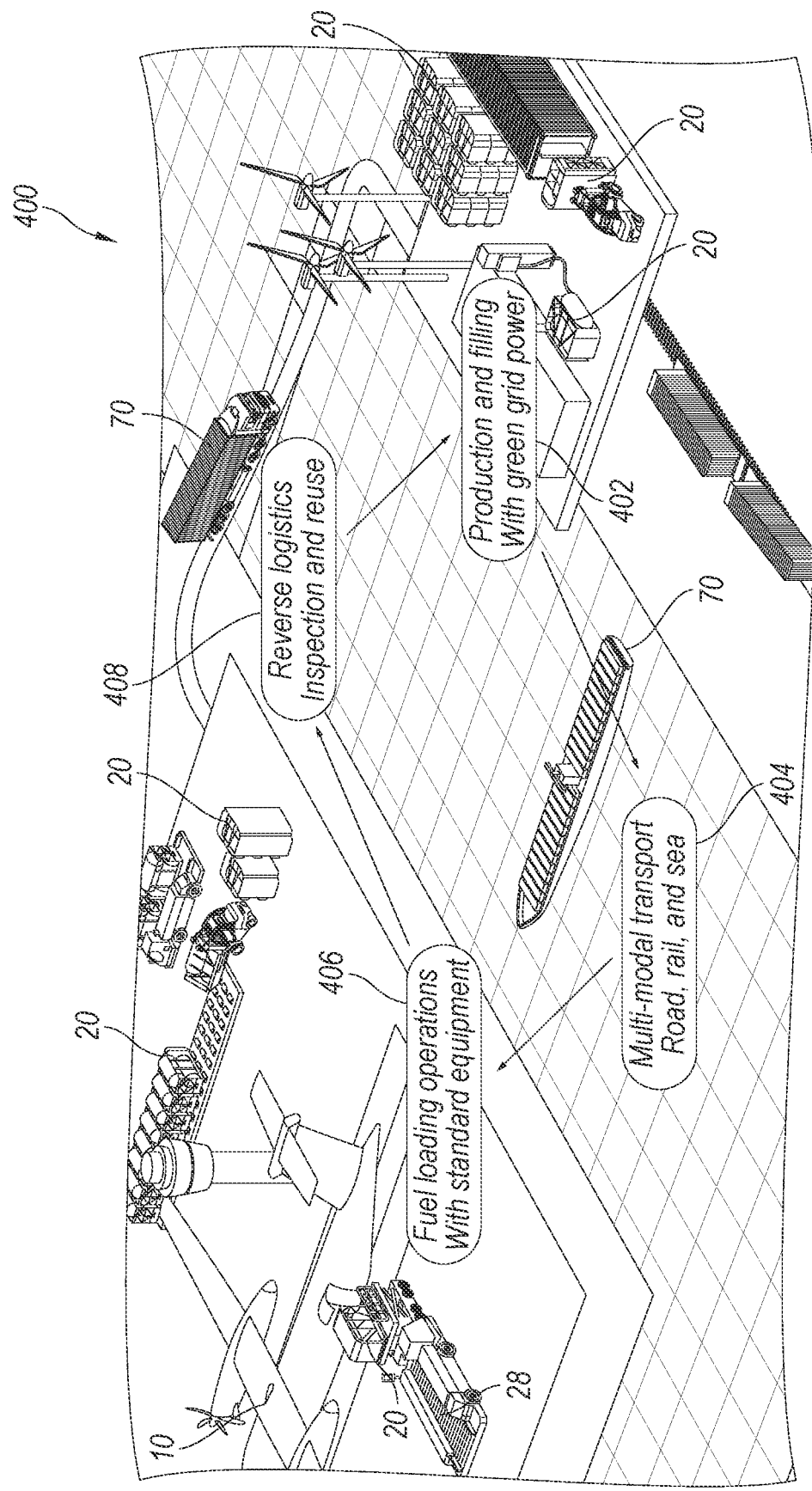
FIGS. 18A and 18B are schematic illustrations of a hydrogen fuel network, in accordance with some embodiments.
Figure 18B:
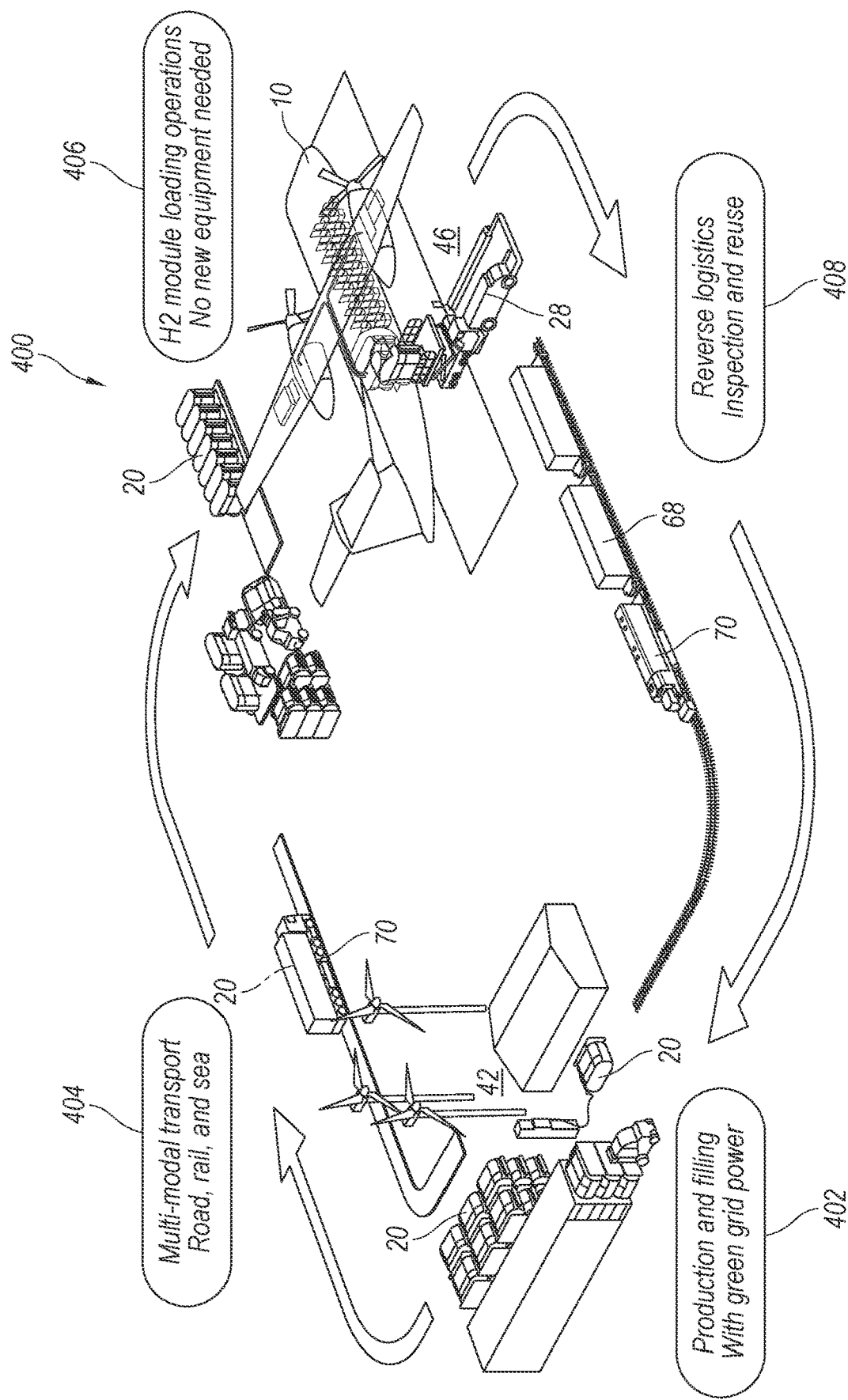

Referring to FIGS. 18A and 18B, the systems and methods of the present disclosure may be used to implement a hydrogen fuel network 400. The hydrogen fuel network 400 may comprise a production and filling stage 402, during which one or more hydrogen fuel storage modules 20 are filled with hydrogen fuel. In some cases, the hydrogen fuel may be produced using green grid power. The hydrogen fuel network 400 may further comprise a multi-modal transport stage 404, during which the one or more hydrogen fuel storage modules 20 are transported to one or more transport vehicle 44 fueling sites via road, rail, and/or sea. The hydrogen fuel network 400 may further comprise a fuel loading operations stage 406, during which the hydrogen fuel storage modules 20 are loaded into one or more hydrogen fuel compatible vehicles, such as the aircraft 10, using standard, commercially available equipment, such as ground support loading vehicles 28. The hydrogen fuel network 400 may further comprise a reverse logistics stage 408, during which one or more depleted or partially spent fuel storage modules 20 are inspected and approved for refill and/or reuse.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

We claim:

1. A hydrogen fuel supply method for use by hydrogen-powered vehicles, comprising:
   determining a demand for one or more fuel storage modules by one or more hydrogen fuel compatible vehicles, the determining of the demand being based at least in-part on a number of vehicles at a vehicle fueling site;
   receiving at the vehicle fueling site one or more fuel storage modules, wherein the one or more fuel storage modules are filled with hydrogen at a hydrogen supply source, and wherein each of the one or more fuel storage modules comprise a storage capsule and a fuel outlet fitting through which hydrogen fuel is dispensed from the storage capsule;
   receiving at the vehicle fueling site a hydrogen-powered vehicle for fueling, wherein the hydrogen-powered vehicle has a fuel storage compartment, a fuel system with one or more fuel inlet fittings, and a power plant coupled to the fuel system for receiving hydrogen fuel from the fuel system of the hydrogen-powered vehicle;
   removing one or more depleted fuel storage modules from the fuel storage compartment of the hydrogen-powered vehicle;
   loading the one or more fuel storage modules into the fuel storage compartment; connecting each fuel outlet fitting to a respective one of the one or more fuel inlet fittings to transfer the hydrogen fuel from the fuel storage module to the fuel system of the hydrogen-powered vehicle; and
   directing the one or more depleted fuel storage modules away from the vehicle fueling site for refilling at the hydrogen supply source, via an ISO (International Organization for Standardization) container.

2. The method of claim 1, further comprising:
   accessing the depleted fuel storage modules in the fuel storage compartment of the hydrogen-powered vehicle;
   disconnecting the fuel outlet fitting of the depleted fuel storage module from the one or more fuel inlet fittings; and
   removing the depleted fuel storage modules from the fuel storage compartment of the hydrogen-powered vehicle.

3. The method of claim 1 wherein the hydrogen-power vehicle is an aircraft.

4. The method of claim 1, further comprising securing the one or more fuel storage modules to structure of the hydrogen-powered vehicle in the fuel storage compartment.

5. The method of claim 1 wherein receiving at a vehicle fueling site one or more fuel storage modules comprises removing the one or more fuel storage modules from a transport vehicle configured to deliver the fuel storage modules to the vehicle fueling site.

6. The method of claim 1, further comprising loading the depleted fuel storage modules onto a transport vehicle for transportation to the hydrogen supply source for refilling with hydrogen.

7. The method of claim 1 wherein the fuel outlet fitting and the fuel inlet fitting are quick connect fittings, wherein the connecting comprises releasably interconnecting the each of the fuel outlet quick connect fittings to a respective one of the fuel inlet quick connect fittings.

8. The method of claim 1 wherein connecting comprises manually connecting each of the fuel outlet fittings to a respective one of the one or more fuel inlet fittings.

9. The method of claim 1 wherein receiving at a vehicle fueling site comprises receiving the one or more fuel storage modules that are filled at a hydrogen supply source remote from the vehicle fueling site.

10. The method of claim 1 wherein the hydrogen fuel supply source is a hydrogen production facility.

11. The method of claim 1 wherein the one or more fuel storage modules have a size, shape, form factor, or configuration compatible with (i) equipment at the hydrogen supply source, (ii) one or more transport vehicles for transporting the fuel storage modules, and (iii) the one or more hydrogen fuel compatible vehicles.

12. The method of claim 1, further comprising monitoring health of the fuel storage modules via sensors on the fuel storage modules.

13. The method of claim 1, the fuel storage module comprising:
   a first material containing the hydrogen, the first material including a semi-permeable membrane;
   a second material carrying stress exerted on one or more inner walls of the fuel storage modules by the hydrogen, the second material including a carbon fiber weave;

a third material that provides thermal insulation for the hydrogen; and a fourth material that is abrasion resistant and impact resistant, the fourth material including a synthetic fiber.

* * * * *